(12) United States Patent
Olmstead

(10) Patent No.: US 8,608,076 B2
(45) Date of Patent: Dec. 17, 2013

(54) MONOLITHIC MIRROR STRUCTURE FOR USE IN A MULTI-PERSPECTIVE OPTICAL CODE READER

(75) Inventor: Bryan L. Olmstead, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 87 days.

(21) Appl. No.: 12/646,794

(22) Filed: Dec. 23, 2009

(65) Prior Publication Data

US 2010/0163622 A1    Jul. 1, 2010

Related U.S. Application Data

(63) Continuation-in-part of application No. 12/370,497, filed on Feb. 12, 2009, now Pat. No. 8,353,457.

(60) Provisional application No. 61/028,164, filed on Feb. 12, 2008, provisional application No. 61/140,930, filed on Dec. 26, 2008.

(51) Int. Cl.
*G06K 7/10* (2006.01)
*G06K 15/12* (2006.01)

(52) U.S. Cl.
USPC .................................................. 235/462.41

(58) Field of Classification Search
USPC .................................................. 235/462.41
See application file for complete search history.

(56) References Cited

U.S. PATENT DOCUMENTS

| | | |
|---|---|---|
| 3,826,562 A | 7/1974 | Baumgardner et al. |
| 5,019,714 A | 5/1991 | Knowles |
| 5,073,702 A | 12/1991 | Schuhmacher |
| 5,308,966 A | 5/1994 | Danielson et al. |
| 5,446,271 A | 8/1995 | Cherry et al. |
| 5,469,294 A | 11/1995 | Wilt et al. |
| 5,493,108 A | 2/1996 | Cherry et al. |
| 5,627,366 A | 5/1997 | Katz |

(Continued)

FOREIGN PATENT DOCUMENTS

| | | |
|---|---|---|
| CA | 2 457 022 A1 | 10/2003 |
| CN | 2529247 Y | 1/2003 |

(Continued)

OTHER PUBLICATIONS

Website—http://www.e2v.com/news/e2v-introduces-new-high-spec-1-3mp-cmos-image-sensor—with-embedded-features—for-industrial-imaging-/ (Sep. 14, 2009).

(Continued)

*Primary Examiner* — Thien M Le
*Assistant Examiner* — Toan Ly
(74) *Attorney, Agent, or Firm* — Stoel Rives LLP

(57) ABSTRACT

A monolithic compound mirror structure is used in an optical code reader employing an imager that captures images of items bearing optical codes in a viewing volume of the optical code reader. The monolithic compound mirror structure comprises a plurality of highly reflective surfaces positioned on the structure so that the structure can be positioned in a field of view of the imager in the optical code reader and oriented so that two or more of the plurality of highly reflective surfaces appear in the field of view of the imager, to thereby split the field of view of the imager into two or more different views into the viewing volume. The different views into the viewing volume may be direct off of the monolithic compound mirror structure or indirect off of one or more intermediate mirrors.

16 Claims, 43 Drawing Sheets

(56) References Cited

U.S. PATENT DOCUMENTS

| | | |
|---|---|---|
| 5,646,390 A | 7/1997 | Wang et al. |
| 5,677,522 A | 10/1997 | Rice et al. |
| 5,682,030 A | 10/1997 | Kubon |
| 5,717,195 A | 2/1998 | Feng et al. |
| 5,723,852 A | 3/1998 | Rando et al. |
| 5,737,122 A | 4/1998 | Wilt et al. |
| 5,801,370 A | 9/1998 | Katoh et al. |
| 5,804,805 A | 9/1998 | Koenck et al. |
| 5,814,803 A | 9/1998 | Olmstead et al. |
| 5,886,336 A | 3/1999 | Tang et al. |
| 5,894,530 A | 4/1999 | Wilt |
| 5,909,276 A | 6/1999 | Kinney et al. |
| 5,936,218 A | 8/1999 | Ohkawa et al. |
| 5,984,186 A | 11/1999 | Tafoya |
| 6,000,619 A | 12/1999 | Reddersen et al. |
| 6,019,286 A | 2/2000 | Li et al. |
| 6,053,408 A | 4/2000 | Stoner |
| 6,061,091 A | 5/2000 | Van de Poel et al. |
| 6,076,735 A | 6/2000 | Saegusa |
| 6,142,376 A | 11/2000 | Cherry et al. |
| 6,257,490 B1 | 7/2001 | Tafoya |
| 6,273,336 B1 | 8/2001 | Rudeen et al. |
| 6,295,077 B1 | 9/2001 | Suzuki |
| 6,296,187 B1 | 10/2001 | Shearer |
| 6,318,635 B1 | 11/2001 | Stoner |
| 6,318,637 B1 | 11/2001 | Stoner |
| 6,336,587 B1 | 1/2002 | He et al. |
| 6,365,907 B1 | 4/2002 | Staub et al. |
| 6,518,997 B1 | 2/2003 | Chow et al. |
| 6,559,448 B1 * | 5/2003 | Muller et al. ............... 250/342 |
| 6,609,660 B1 | 8/2003 | Stoner |
| 6,678,097 B2 * | 1/2004 | McKenney ................ 359/742 |
| 6,705,528 B2 | 3/2004 | Good et al. |
| 6,899,272 B2 | 5/2005 | Krichever et al. |
| 6,963,074 B2 | 11/2005 | McQueen |
| 6,971,580 B2 * | 12/2005 | Zhu et al. ................ 235/472.01 |
| 6,991,169 B2 | 1/2006 | Bobba et al. |
| 7,014,113 B1 | 3/2006 | Powell et al. |
| 7,128,266 B2 | 10/2006 | Zhu et al. |
| 7,188,770 B2 | 3/2007 | Zhu et al. |
| 7,198,195 B2 | 4/2007 | Bobba et al. |
| 7,201,322 B2 | 4/2007 | Olmstead et al. |
| 7,204,420 B2 | 4/2007 | Barkan et al. |
| 7,213,762 B2 | 5/2007 | Zhu et al. |
| 7,234,641 B2 | 6/2007 | Olmstead |
| 7,255,278 B2 * | 8/2007 | Acosta ................ 235/462.14 |
| 7,273,180 B2 | 9/2007 | Zhu et al. |
| 7,296,744 B2 | 11/2007 | He et al. |
| 7,398,927 B2 | 7/2008 | Olmstead et al. |
| 7,490,770 B2 | 2/2009 | Shearin |
| 7,499,090 B2 | 3/2009 | Olmstead |
| 7,533,819 B2 | 5/2009 | Barkan et al. |
| 7,757,955 B2 | 7/2010 | Barkan |
| 7,780,086 B2 | 8/2010 | Barkan et al. |
| 8,261,990 B2 | 9/2012 | Olmstead |
| 2001/0009508 A1 | 7/2001 | Umemoto et al. |
| 2001/0032884 A1 | 10/2001 | Ring et al. |
| 2001/0042789 A1 | 11/2001 | Krichever et al. |
| 2002/0043561 A1 | 4/2002 | Tsikos et al. |
| 2002/0088859 A1 | 7/2002 | Bengala |
| 2004/0031851 A1 | 2/2004 | Bianculli et al. |
| 2004/0051062 A1 | 3/2004 | Gehring et al. |
| 2004/0175038 A1 | 9/2004 | Bonner et al. |
| 2004/0223202 A1 | 11/2004 | Lippert et al. |
| 2005/0103857 A1 | 5/2005 | Zhu et al. |
| 2006/0022051 A1 | 2/2006 | Patel et al. |
| 2006/0032919 A1 | 2/2006 | Shearin |
| 2006/0151604 A1 | 7/2006 | Zhu et al. |
| 2006/0163355 A1 | 7/2006 | Olmstead et al. |
| 2006/0202036 A1 | 9/2006 | Wang et al. |
| 2006/0278708 A1 | 12/2006 | Olmstead |
| 2007/0201009 A1 * | 8/2007 | Suzuki et al. ............... 353/78 |
| 2007/0278309 A1 | 12/2007 | Knowles et al. |
| 2007/0297021 A1 | 12/2007 | Smith |
| 2008/0017715 A1 | 1/2008 | Knowles et al. |
| 2008/0017716 A1 | 1/2008 | Knowles et al. |
| 2008/0023558 A1 | 1/2008 | Knowles et al. |
| 2008/0029605 A1 | 2/2008 | Knowles et al. |
| 2008/0041954 A1 | 2/2008 | Gannon et al. |
| 2008/0110992 A1 | 5/2008 | Knowles et al. |
| 2008/0110994 A1 | 5/2008 | Knowles et al. |
| 2008/0128509 A1 | 6/2008 | Knowles et al. |
| 2008/0135619 A1 * | 6/2008 | Kwan ................ 235/462.39 |
| 2008/0142596 A1 | 6/2008 | Knowles et al. |
| 2008/0217201 A1 | 9/2008 | Keller et al. |
| 2009/0001166 A1 | 1/2009 | Barkan et al. |
| 2009/0020612 A1 | 1/2009 | Drzymala et al. |
| 2009/0062024 A1 * | 3/2009 | DeBoalt ................ 464/182 |
| 2009/0084847 A1 | 4/2009 | He et al. |
| 2009/0084854 A1 | 4/2009 | Carlson et al. |
| 2009/0206161 A1 | 8/2009 | Olmstead |
| 2010/0001075 A1 | 1/2010 | Barkan |
| 2010/0051695 A1 | 3/2010 | Yepez et al. |
| 2010/0147953 A1 | 6/2010 | Barkan |
| 2010/0163622 A1 | 7/2010 | Olmstead |
| 2010/0163626 A1 | 7/2010 | Olmstead |
| 2010/0163627 A1 | 7/2010 | Olmstead |
| 2010/0163628 A1 | 7/2010 | Olmstead |
| 2010/0165160 A1 | 7/2010 | Olmstead et al. |
| 2010/0219249 A1 | 9/2010 | Barkan et al. |
| 2010/0252633 A1 | 10/2010 | Barkan et al. |
| 2011/0127333 A1 | 6/2011 | Veksland et al. |

FOREIGN PATENT DOCUMENTS

| | | | |
|---|---|---|---|
| CN | 1511298 A | 7/2004 | |
| CN | 200997013 Y | 12/2007 | |
| EP | 1020810 | 7/2000 | |
| EP | 1380983 | 1/2004 | |
| EP | 1933254 | 6/2008 | |
| JP | 01181376 A * | 7/1989 | ............... H04N 1/04 |
| JP | 4251992 A | 9/1992 | |
| JP | 07-168905 | 7/1995 | |
| JP | 2005521164 | 7/2005 | |
| JP | 2007-521575 A | 8/2007 | |
| KR | 10-2001/0005875 A | 1/2001 | |
| WO | WO 98/44330 | 10/1998 | |
| WO | WO 03/081521 A1 | 10/2003 | |
| WO | WO 2007/149876 | 12/2007 | |

OTHER PUBLICATIONS

"Enhanced Laser Shutter Using a Hard Disk Drive Rotary Voice-Coil Actuator," http://rsi.aip.org/resource/1/rsinak/v78/i2/p026101_s1?isAuthorized=no See also http://scitation.aip.org/getabs/servlet/GetabsServlet?prog=normal&id=RSINAK00 . . . , published Feb. 9, 2007.

International Search Report and Written Opinion, PCT/US/2009/068680, Aug. 17, 2010.

Putting the "world" in Wincor World, http://www.retailcustomerexperience.com/article/4371/Putting-the-world-in-Wincor-World, visited Sep. 15, 2011, 3 pages.

Wincor World: 360-degree scanning will speed check-out, http://www.retailcustomerexperience.com/article/4374/WINCOR-WORLD-360-degree-scanning-will-speed-check-out, visited Aug. 24, 2011, 1 page.

Wincor World focuses on service, automated checkout, http://www.retailcustomerexperience.com/article/3626/Wincor-World-focuses-on-service-automated-checkout?rc_id=16, visited Sep. 15, 2011, 3 pages.

Why Retailers Invest in Self-Service in 2009, http://www.kioskeurope.com/print/1726, visited Sep. 15, 2011, 3 pages.

Search Report and Written Opinion dated Jun. 18, 2012 in EP application 09709958.4 corresponding to parent to present application.

U.S. Appl. No. 12/370,497, Bryan Olmstead, Systems and Methods for Forming a Composite Image of Multiple Portions of an Object From Multiple Perspectives, Items from prosecution history: Notice of Allowance dated Sep. 14, 2012; Amendment After Final dated Sep. 5, 2012 (and Rule 1.131 Declaration by inventor); and Final Rejection dated May 21, 2012.

(56) References Cited

OTHER PUBLICATIONS

U.S. Appl. No. 12/464,755, Bryan Olmstead, Imaged-Based Reader for Acquisition of Multiple Views of an Object and Methods for Employing Same, Items from prosecution history: Notice of Allowance dated Aug. 2, 2012; Amendment After Final dated Jul. 12, 2012; and Final Rejection dated Mar. 12, 2012.

International Search Report for PCT Patent Application No. PCT/US2007/071590, published Feb. 21, 2010.

European Search Report dated Feb. 15, 2010 for European Application No. 07798775.8.

Srinivasan, "A New Class of Mirrors for Wide-Angle Imaging," Centre for Visual Sciences, Research School of Biological Sciences, Australian National University, (date unknown, but circa 2000).

International Search Report and Written Opinion for PCT Patent Application No. PCT/US2009/033237, issued Jul. 31, 2009.

International Search Report and Written Opinion for PCT Patent Application No. PCT/US2009/069536, issued Jul. 30, 2010.

International Search Report and Written Opinion for PCT Patent Application No. PCT/US2009/069537, issued Jul. 30, 2010.

International Search Report and Written Opinion for PCT Patent Application No. PCT/US2009/069530, issued Aug. 16, 2010.

Website—http://www.e2v.com/news/e2v-introduces-new-high-spec-1-3mp-cmo . . . , Sep. 14, 2009.

Office Action (English translation only) dated Sep. 29, 2013 from China Patent Appl. No. 200980112937.5; Applicant Datalogic ADC, Inc. (the China application corresponds to the U.S. parent of the present application).

\* cited by examiner

400

| |
|---|
| 820-870A |
| 820-870B |
| 820-870C |
| 820-870D |
| 825-860A |
| 825-860B |
| 825-860C |
| 825-860D |
| 830-880A |
| 830-880B |
| 830-880C |
| 830-880D |
| 835-890A |
| 835-890B |
| 840-850A |
| 840-850B |

FIG. 7

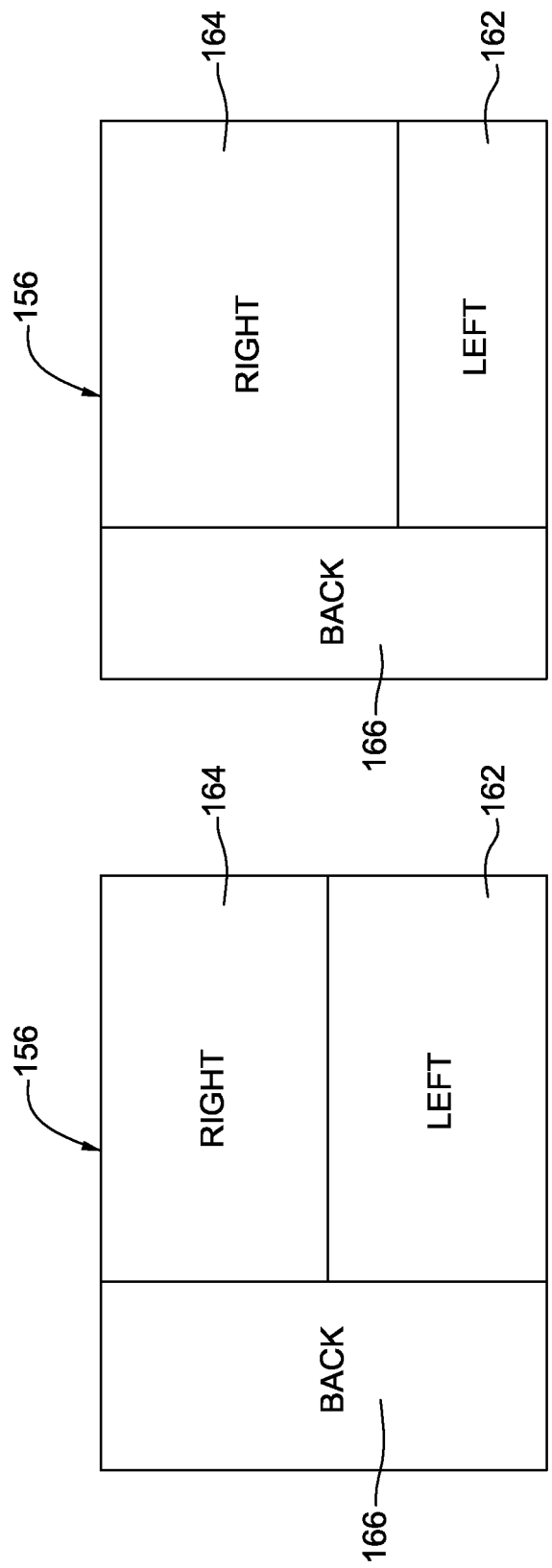
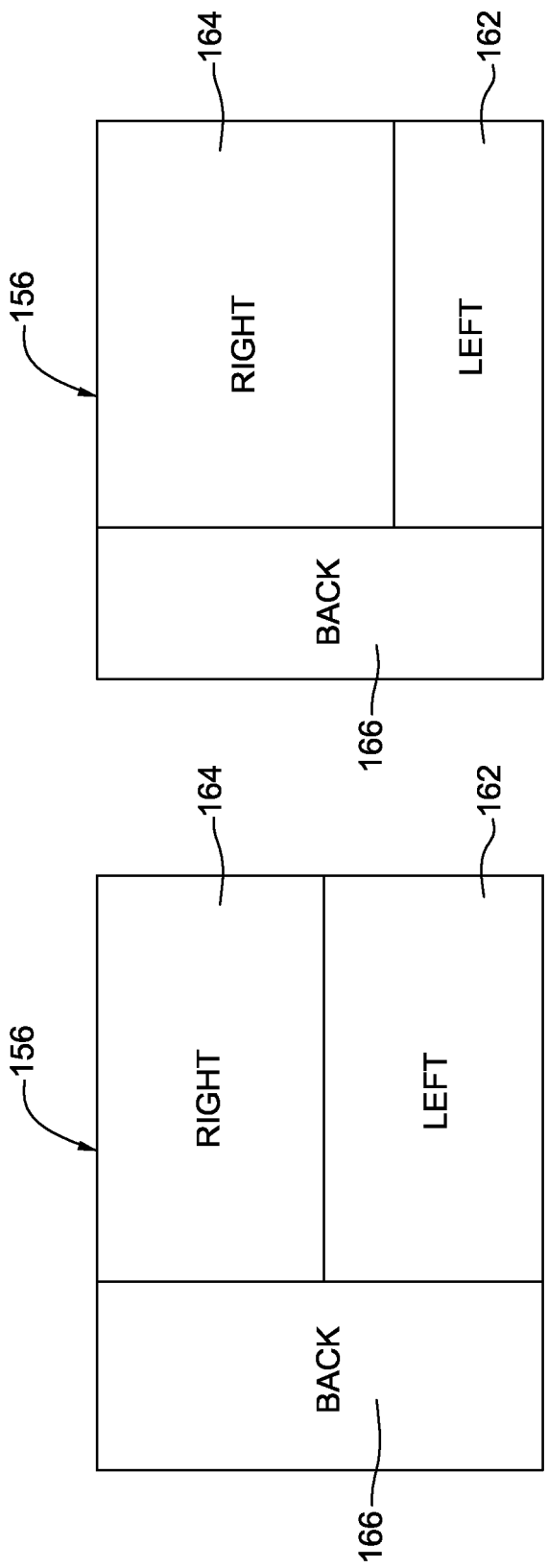

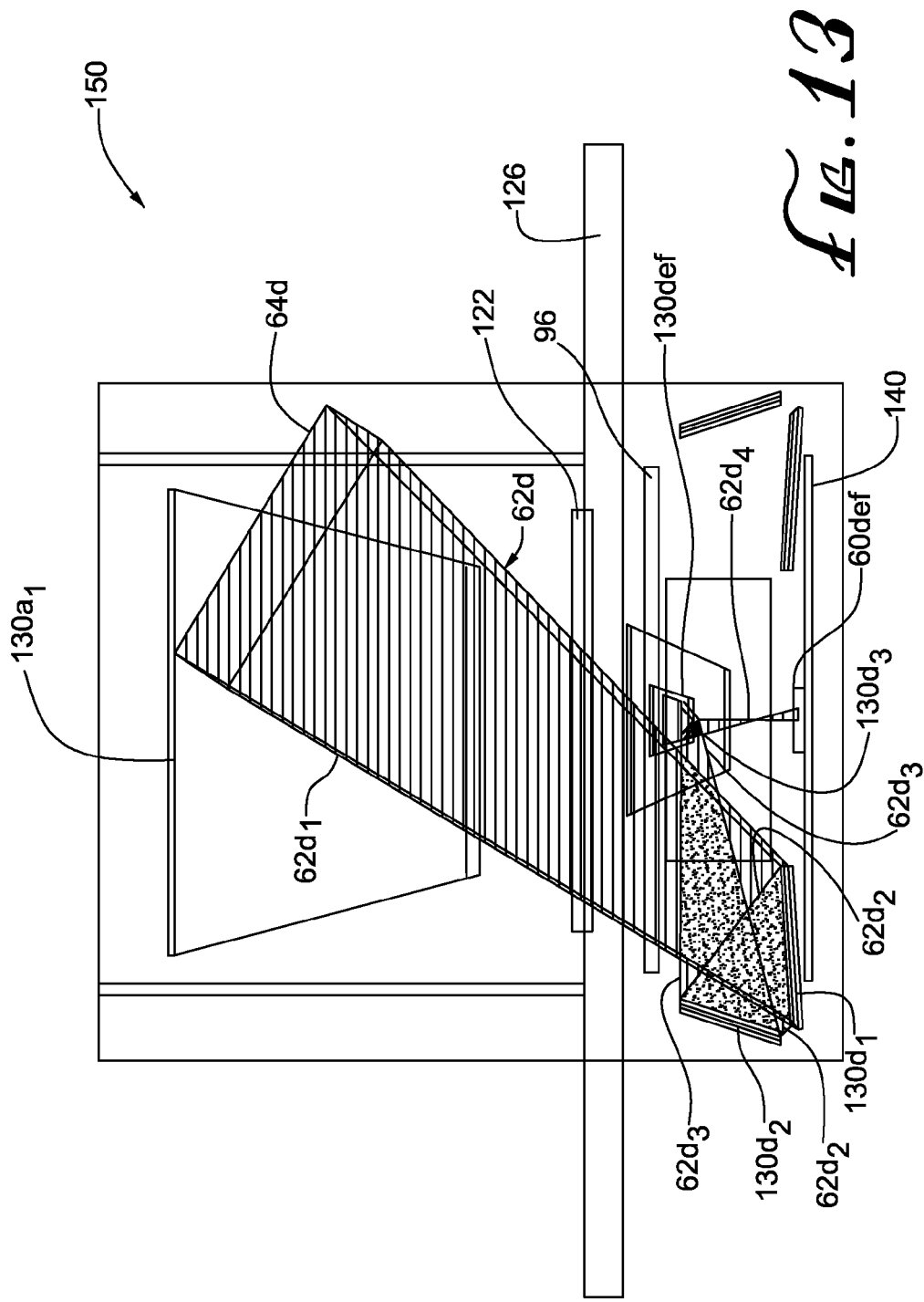

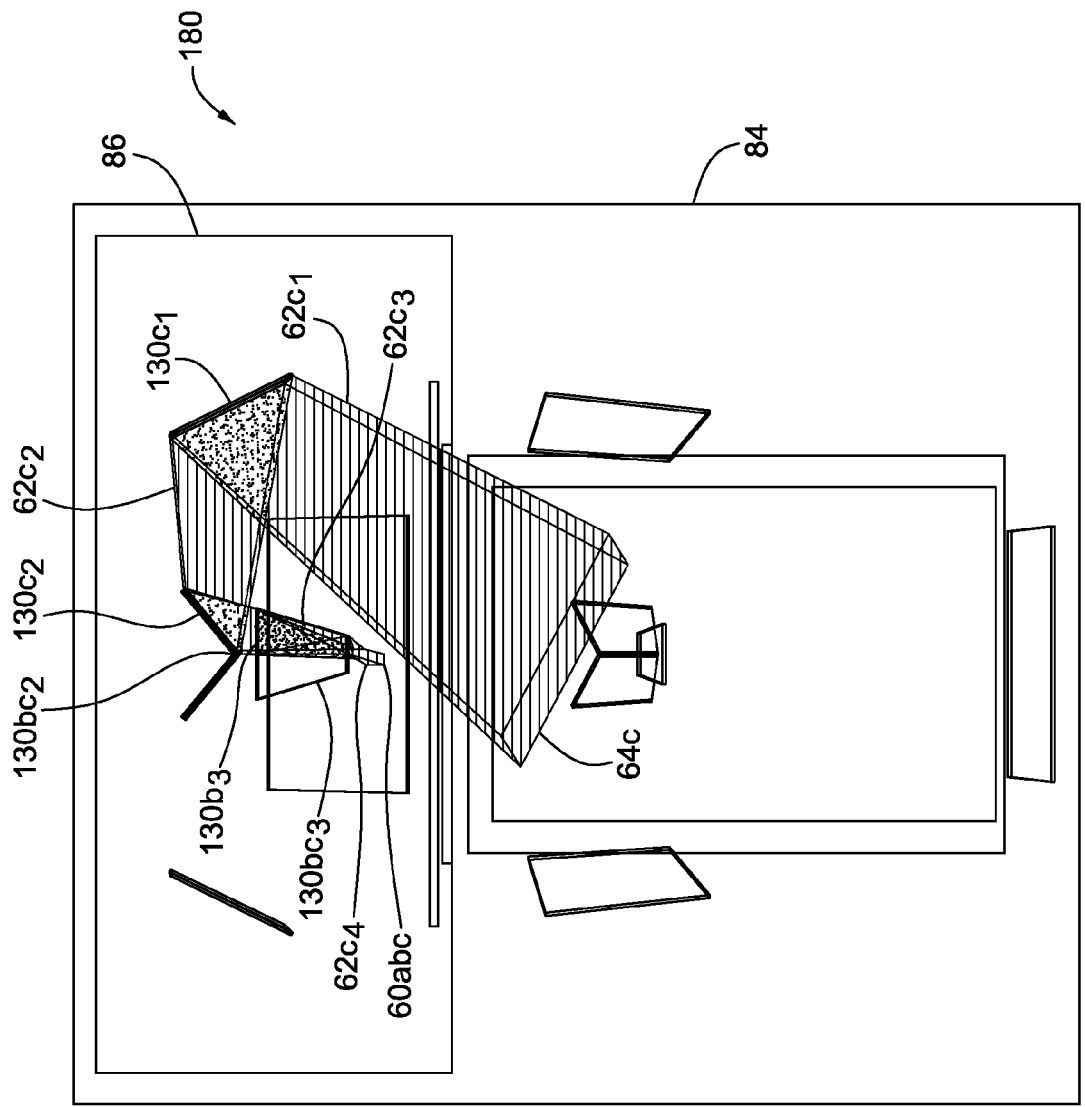

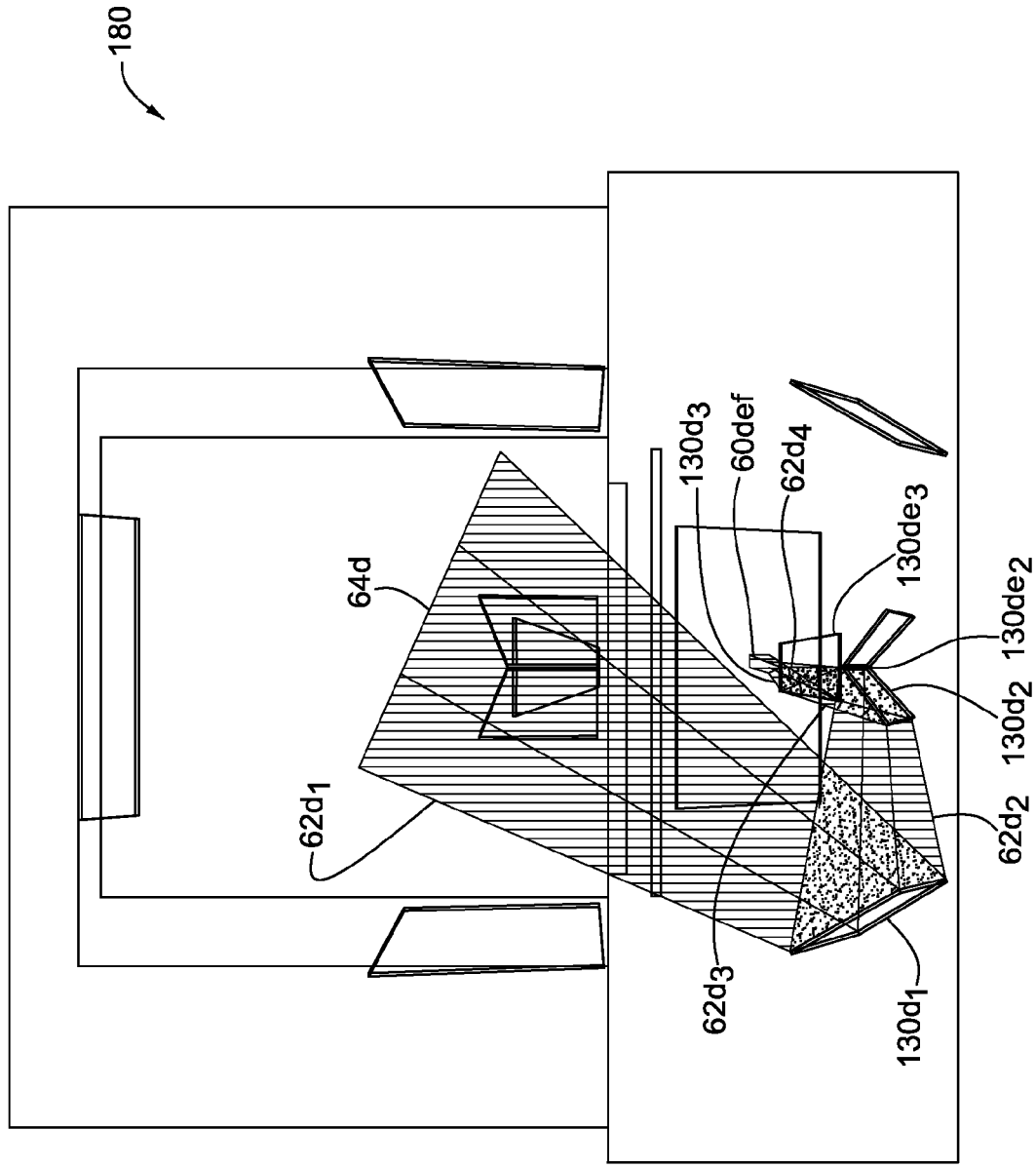

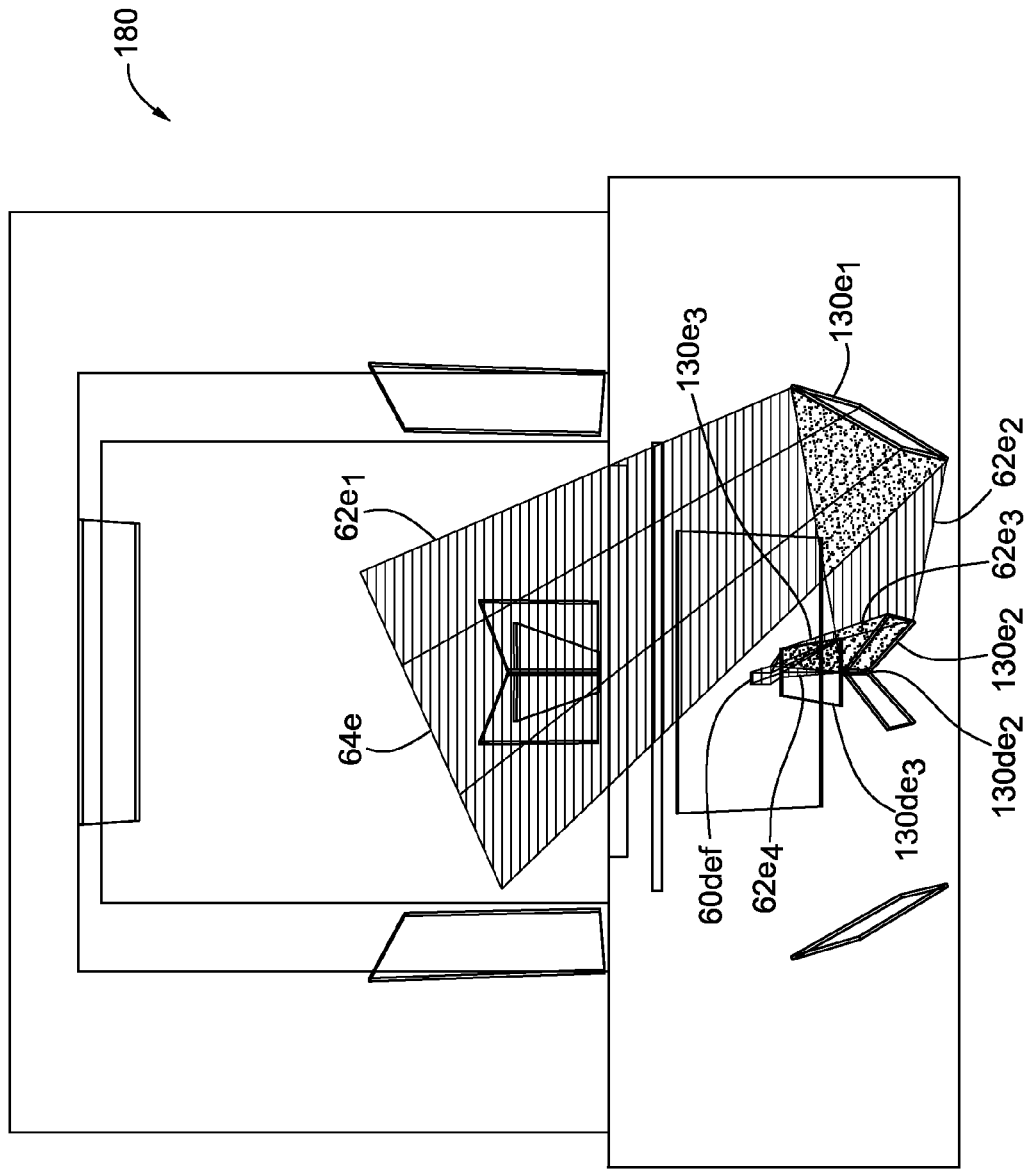

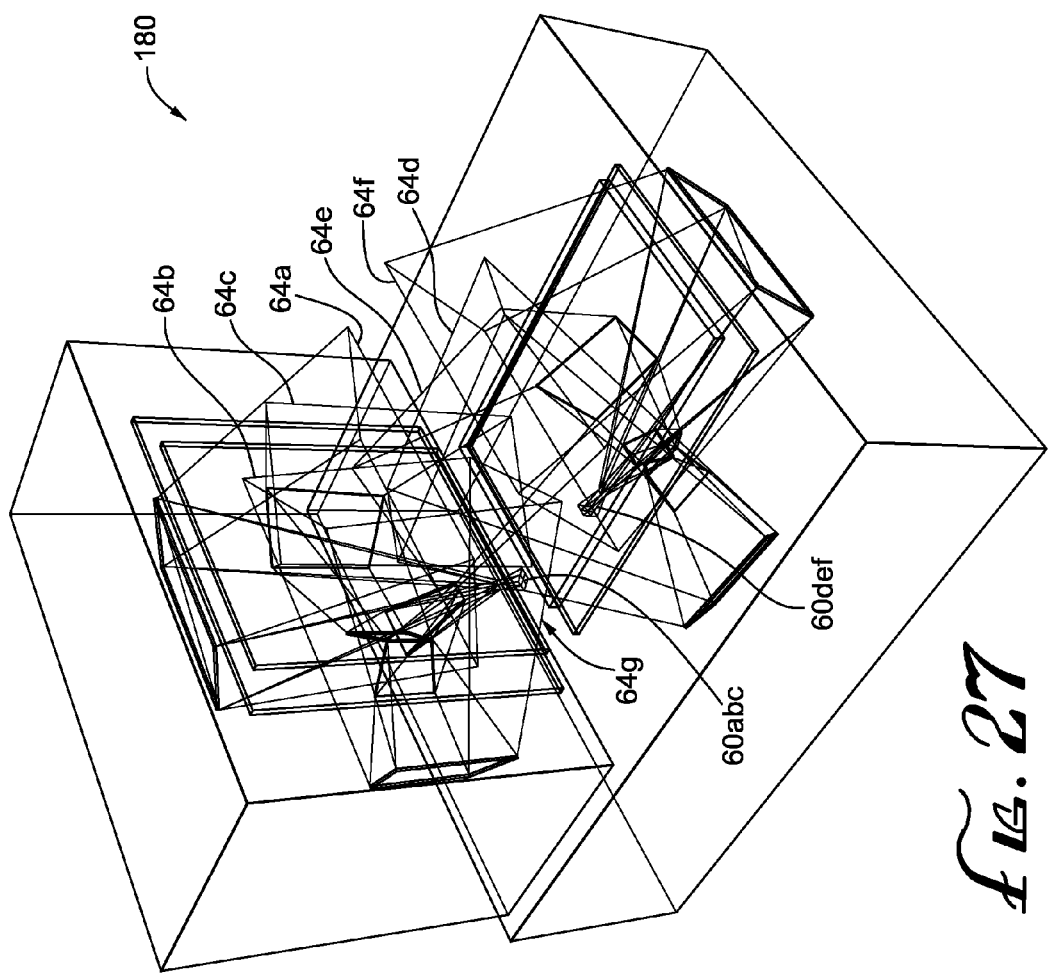

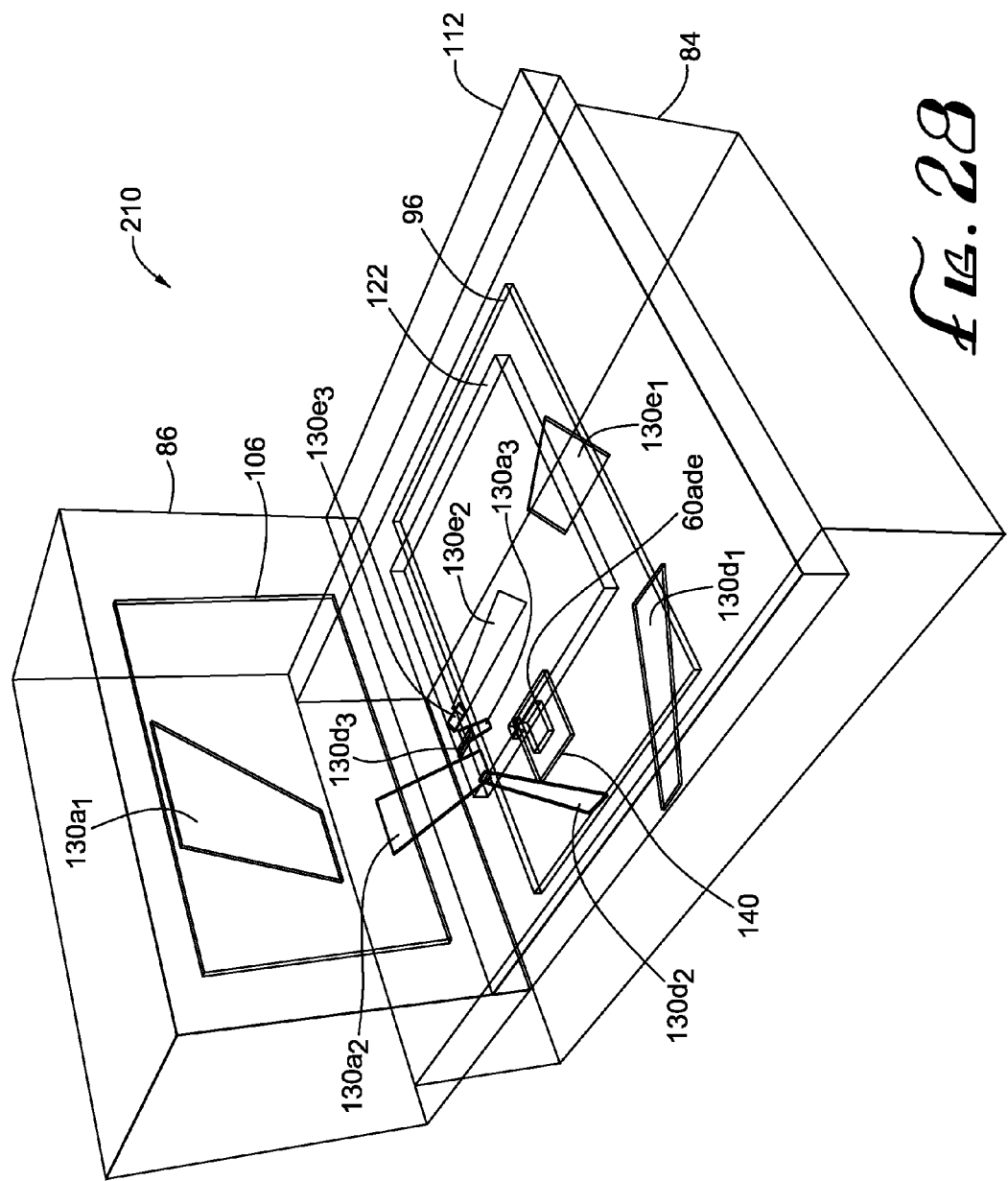

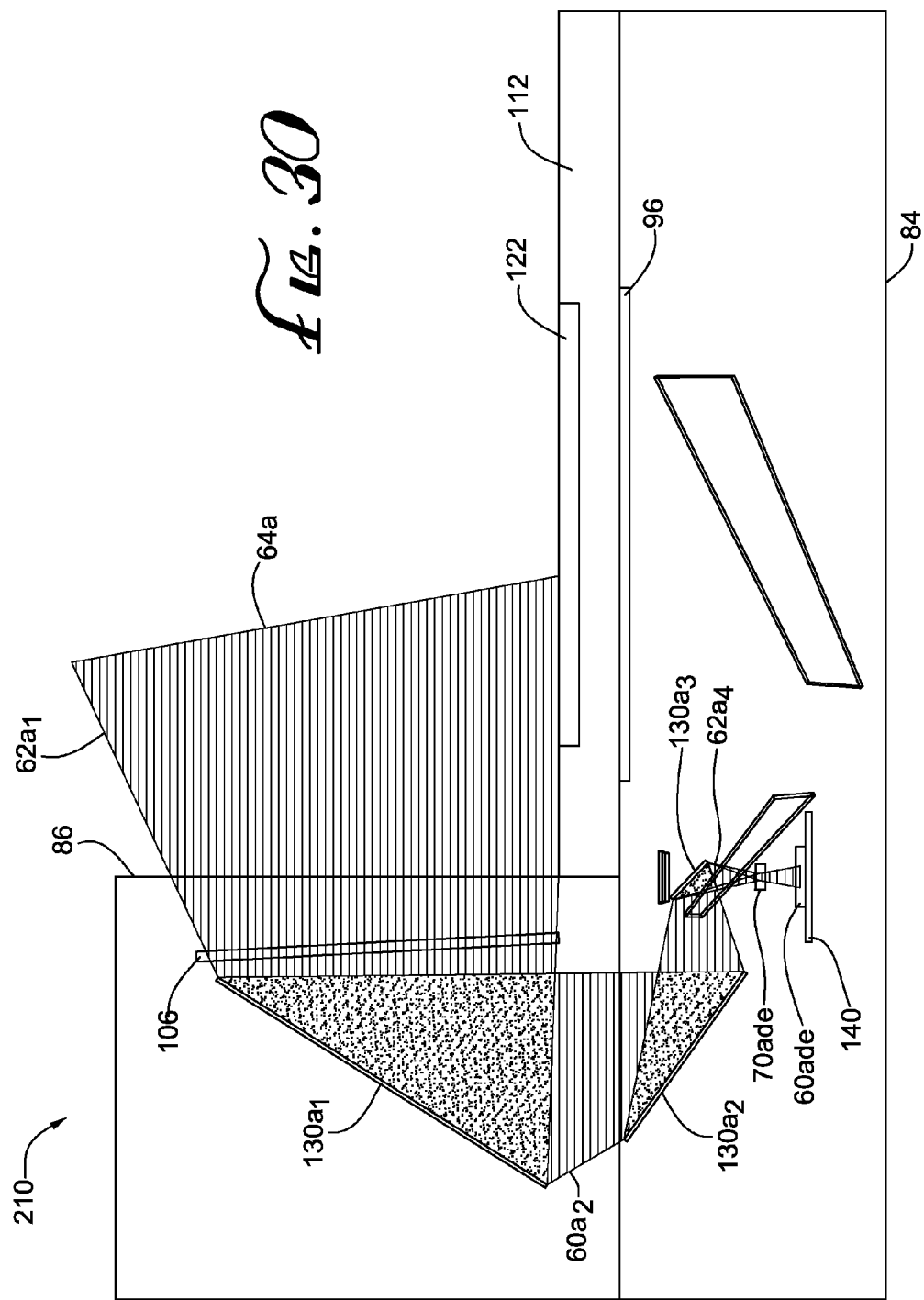

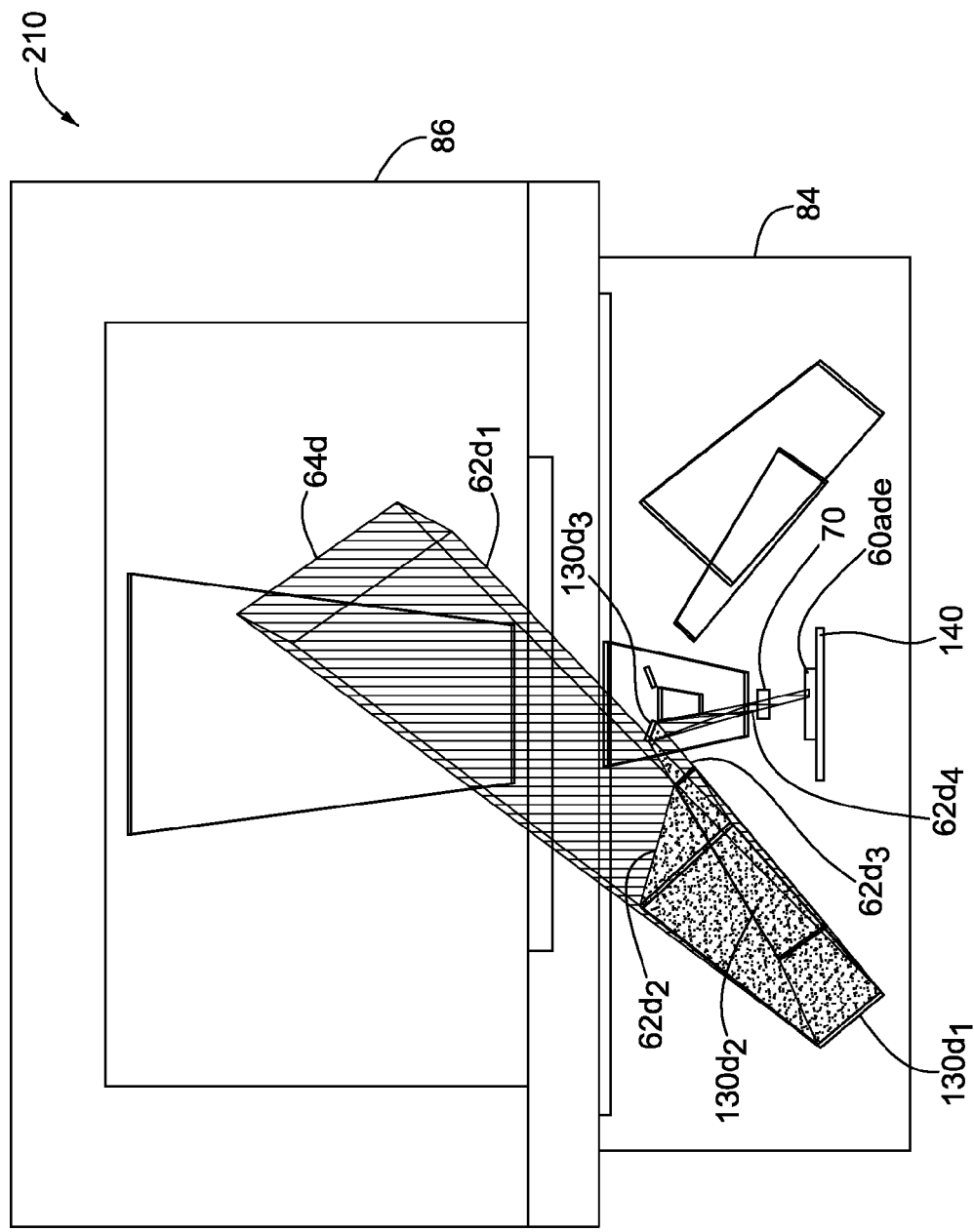

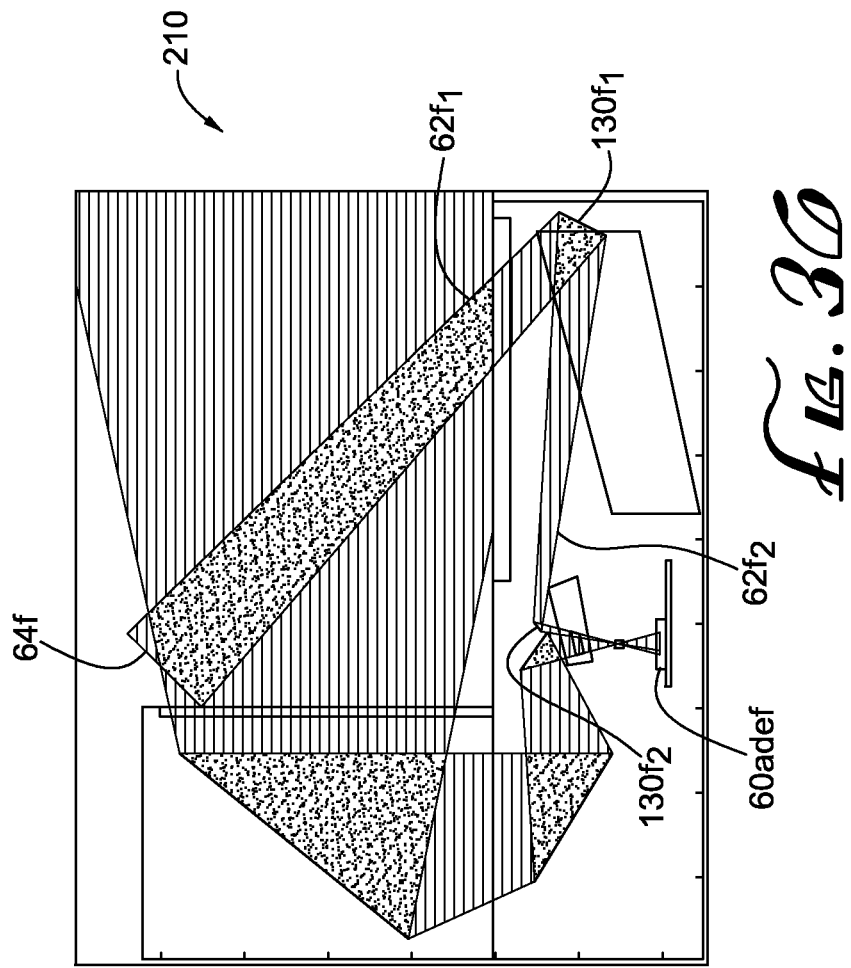

MONOLITHIC MIRROR STRUCTURE FOR USE IN A MULTI-PERSPECTIVE OPTICAL CODE READER

RELATED APPLICATIONS

This application is a continuation-in-part of U.S. application Ser. No. 12/370,497, filed Feb. 12, 2009, entitled "Systems and Methods for Forming a Composite Image of Multiple Portions of an Object From Multiple Perspectives," which claims priority under 35 U.S.C. §119 to (1) U.S. provisional application No. 61/028,164, filed Feb. 12, 2008, with the same title and (2) U.S. provisional application No. 61/140,930, filed Dec. 26, 2008, entitled "Optical Code Reader Having Compact Arrangement for Acquisition of Multiple Views of an Object." This application also claims priority under 35 U.S.C. §119 to U.S. provisional application No. 61/140,930. The entire disclosures of the foregoing applications are incorporated by reference herein.

The entire disclosures of the assignee's following U.S. patent applications filed on the same date as this application are also incorporated by reference herein: Ser. No. 12/646,755 entitled "Image-Based Code Reader for Acquisition of Multiple Views of an Object and Methods for Employing Same"; Ser. No. 12/646,829 entitled "Two-Plane Optical Code Reader for Acquisition of Multiple Views of an Object"; and Ser. No. 12/645,984 entitled "Data Reader Having Compact Arrangement for Acquisition of Multiple Views of an Object."

TECHNICAL FIELD

The field of this disclosure relates generally but not exclusively to reading of optical codes (e.g., bar codes), and more particularly to code readers utilizing an imager or camera.

BACKGROUND INFORMATION

Optical codes encode useful, optically-readable information about the items to which they are attached or otherwise associated. Perhaps the best example of an optical code is the bar code. Bar codes are ubiquitously found on or associated with objects of various types, such as the packaging of retail, wholesale, and inventory goods; retail product presentation fixtures (e.g., shelves); goods undergoing manufacturing; personal or company assets; and documents. By encoding information, a bar code typically serves as an identifier of an object, whether the identification be to a class of objects (e.g., containers of milk) or a unique item (e.g., U.S. Pat. No. 7,201,322). Bar codes consist of alternating bars (i.e., relatively dark areas) and spaces (i.e., relatively light areas). The pattern of alternating bars and spaces and the widths of those bars and spaces represent a string of binary ones and zeros, wherein the width of any particular bar or space is an integer multiple of a specified minimum width, which is called a "module" or "unit." Thus, to decode the information, a bar code reader must be able to reliably discern the pattern of bars and spaces, such as by determining the locations of edges demarking adjacent bars and spaces from one another, across the entire length of the bar code.

Bar codes are just one example of the many types of optical codes in use today. Bar codes are an example of a one-dimensional or linear optical code, as the information is encoded in one direction—the direction perpendicular to the bars and spaces. Higher-dimensional optical codes, such as, two-dimensional matrix codes (e.g., MaxiCode) or stacked codes (e.g., PDF 417), which are also sometimes referred to as "bar codes," are also used for various purposes.

Two of the more important types of devices that read optical codes are (1) flying-spot scanning readers and (2) imager-based readers. The first of these types historically has been the laser-based bar code reader (also called a "scanner"), which generates a spot from a laser beam and sweeps or scans the spot across a bar code label. A laser-based bar code reader detects reflected and/or refracted laser light from the bars and spaces in a bar code as the laser spot moves across the bar code. An optical detector measures the intensity of the returned light as a function of time or position and generates an electrical signal having an amplitude determined by the intensity of the detected light. As the bar code is scanned, positive-going transitions and negative-going transitions in the electrical signal occur, signifying transitions between bars and spaces in the bar code. The electrical signal can be processed to determine the arrangement of bars and spaces of the scanned bar code. The bar and space information can be provided to a decoding unit to determine whether the bar code is recognized and, if so, to decode the information contained in the bar code.

While scanning laser-based bar code readers have become the standard for many applications, particularly fixed scanners such as those found at high-volume retail checkout registers, laser-based scanners do have some disadvantages. In particular, the laser and motor of a laser-based scanner add to the complexity, cost, bulk, power consumption, and start-up time of the overall system, while decreasing reliability. In fact, the motor used for sweeping the laser spot tends to be one of the least reliable components of a scanner, followed by the laser illumination source.

Imager-based readers operate according to a different principle, compared to laser-based scanners. An imager-based reader utilizes a camera or imager to generate electronic image data (typically in digital form) of an optical code. The image data is then processed to find and decode the optical code. For example, virtual scan line techniques are known techniques for digitally processing an image containing a bar code by looking across an image along a plurality of lines, typically spaced apart and at various angles, somewhat like a laser beam's scan pattern in a laser-based scanner.

Imager-based readers typically can only form images from one perspective usually that of a normal vector out of the face of the imager. However, a few imager-based readers that generate multiple perspectives are known. One such reader is disclosed in the present assignee's U.S. Patent Application Publication No. 2006/0163355, published Jul. 27, 2006, in the names of inventors Olmstead et al., which discloses an embodiment having two cameras to collect two images from two different perspectives for the purpose of mitigating specular reflection. Similarly, U.S. Pat. No. 6,899,272, issued to Krichever et al. on May 31, 2005, discloses one embodiment that utilizes two independent sensor arrays pointed in different directions to collect two image data from two different perspectives. Another embodiment according to the '272 patent utilizes a single camera pointed at a moveable mirror that can switch between two positions to select one of two different imaging directions. Additionally, the present assignee's U.S. Pat. No. 5,814,803, issued to Olmstead et al. on Sep. 29, 1998, depicts in its FIG. 62 a kaleidoscope tunnel formed from two mirrored surfaces, resulting in eight different, rotated versions of the same object (bar code) on a single imager.

BRIEF DESCRIPTION OF THE DRAWINGS

FIG. 7 is a face-on view of the face of the imager (or an image generated by the imager) of the imager-based reader of FIGS. 1-4, labeled to show the sequence of mirrors "seen" by each section of the imager.

FIG. 11 is a diagram of an image field of the horizontal imager in the optical code reader of FIG. 10, divided into three regions to capture separate views.

FIG. 12 is a diagram of another image field of the horizontal imager in the optical code reader of FIG. 10, divided into three alternative regions to capture separate views.

FIG. 13 is a front view of mirrors reflecting a left lower perspective of a view volume along an image path of the optical code reader of FIG. 10, showing the image path and view volume with shading lines.

FIG. 21 is a top view of mirrors reflecting a right upper perspective of a view volume along an image path to an imager of the optical code reader of FIG. 18, showing the image path and view volume with shading lines.

FIG. 24 is a front view of mirrors reflecting a left lower perspective of a view volume along an image path to an imager of the optical code reader of FIG. 18, showing the image path and view volume with shading lines.

FIG. 25 is a front view of mirrors reflecting a right lower perspective of a view volume along an image path to an imager of the optical code reader of FIG. 18, showing the image path and view volume with shading lines.

FIG. 27 is an isometric view of multiple image paths and respective multiple perspective view volumes that form a cumulative view volume of the optical code reader of FIG. 18.

FIG. 28 is an isometric view of a bioptic optical code reader capable of capturing multiple views from different perspectives, according to another embodiment.

FIG. 30 is a side view of mirrors reflecting an upper perspective of a view volume along an image path to an imager of the optical code reader of FIG. 28, showing the image path and view volume with shading lines.

FIG. 31A is a front view of mirrors reflecting a left lower perspective of a view volume along an image path to an imager of the optical code reader of FIG. 28, showing the image path and view volume with shading lines.

FIG. 36 is a side view of mirrors reflecting a back perspective of a view volume along an image path to an imager of the optical code reader of FIG. 34, showing the image path and view volume with shading lines.

DETAILED DESCRIPTION OF EMBODIMENTS

Figure 1:
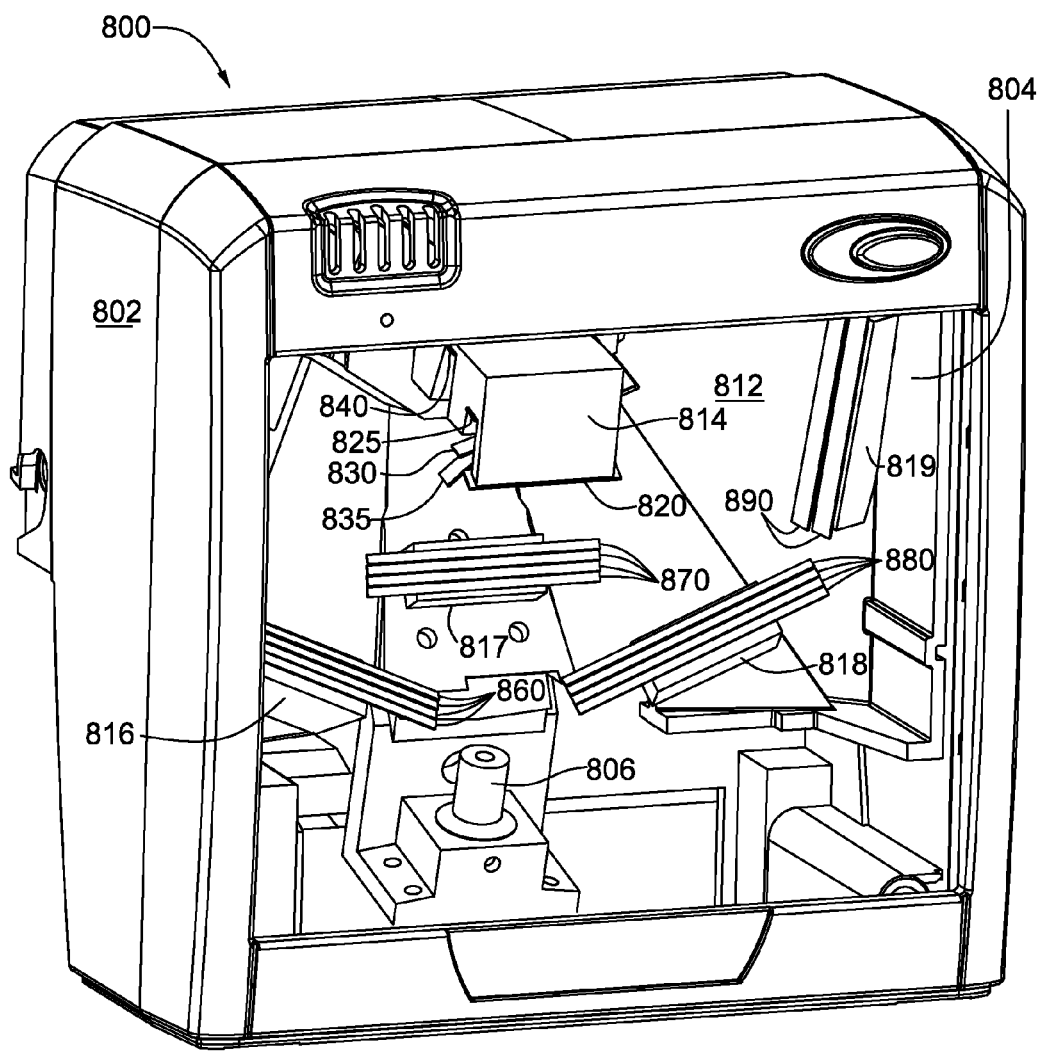
FIG. 1 is an isometric view of an imager-based reader, illustrating an optical layout within an enclosure, according to one embodiment.
Figure 2:
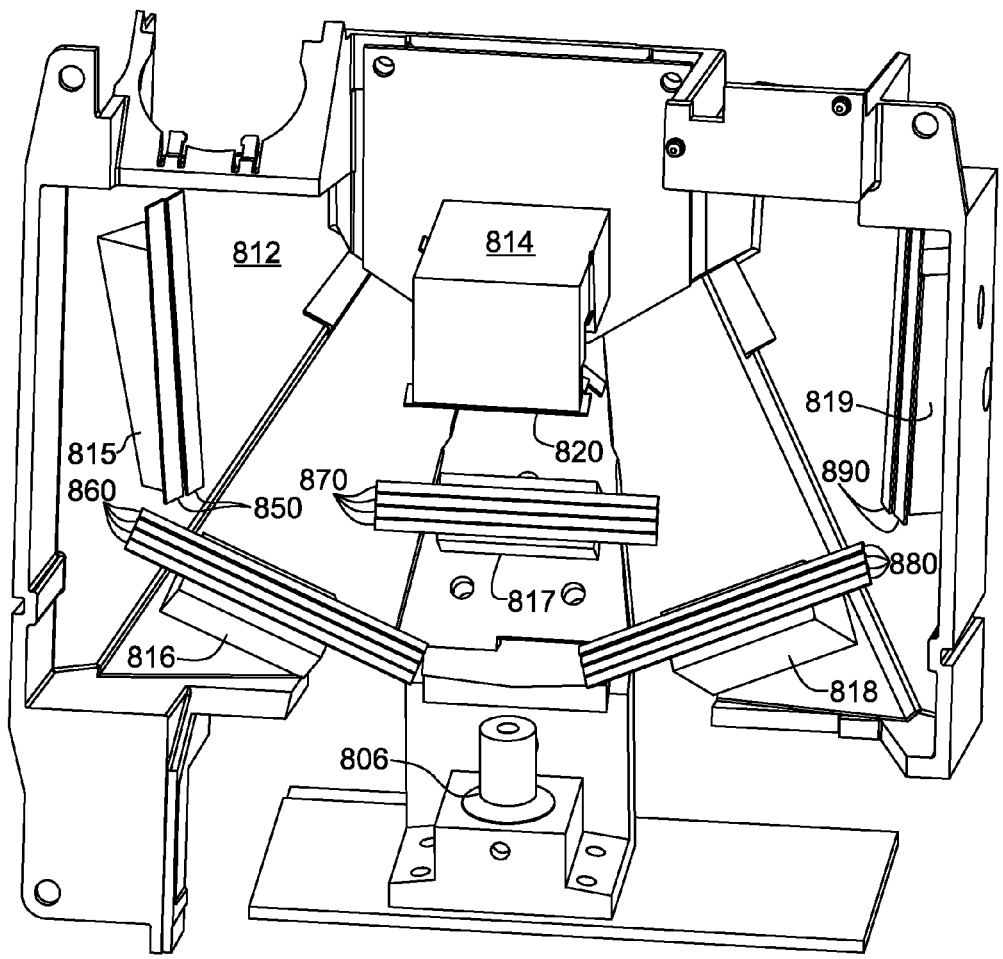
FIG. 2 is a an isometric view of the imager-based reader of FIG. 1 without the enclosure.
Figure 3:
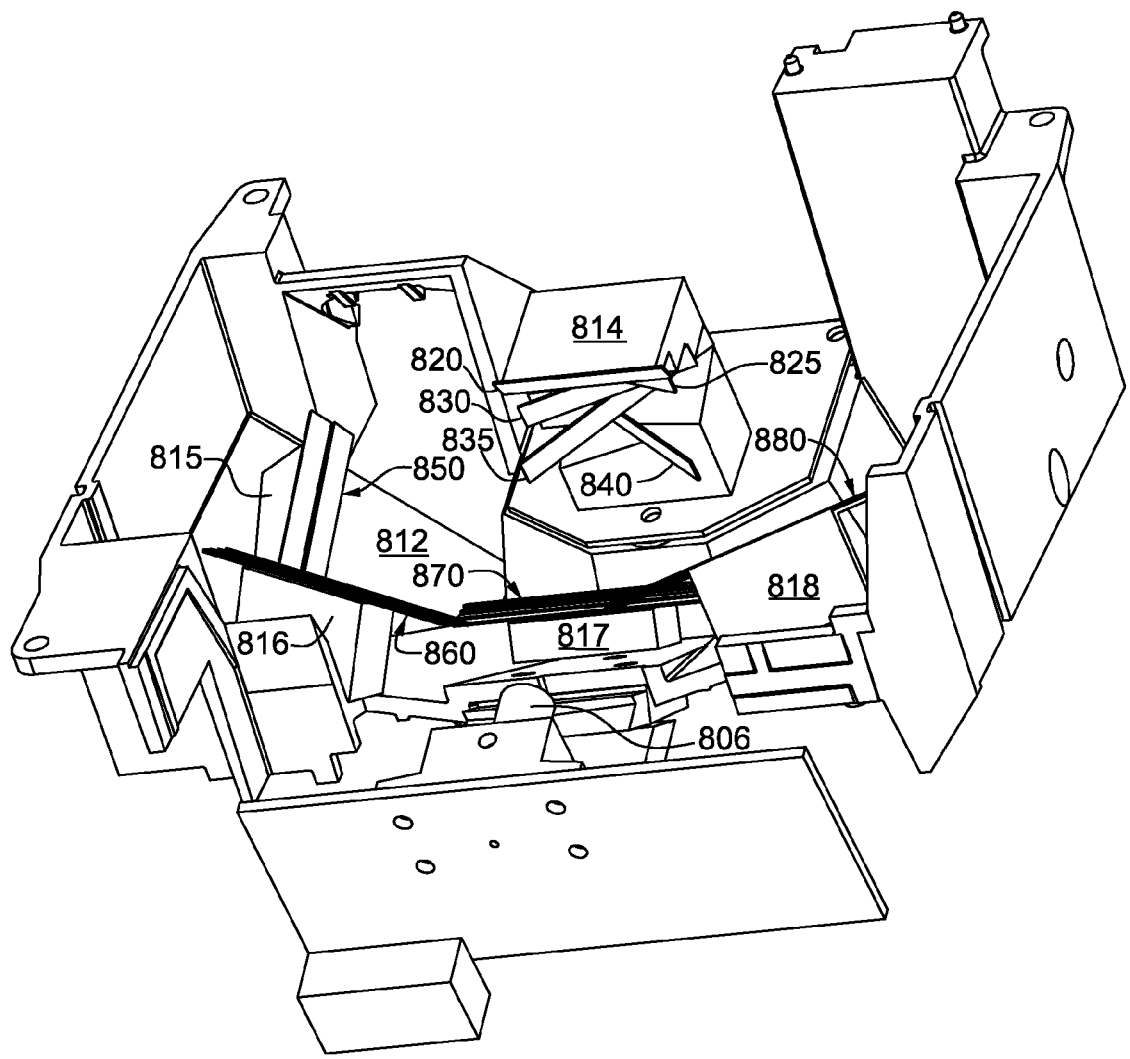
FIG. 3 is another isometric view of the imager-based reader of FIGS. 1-2 without its enclosure, from a different perspective.

With reference to the above-listed drawings, this section describes particular embodiments and their detailed construction and operation. The embodiments described herein are set forth by way of illustration only and not limitation. Those skilled in the art will recognize in light of the teachings herein that other embodiments are possible, variations can be made to the embodiments described herein, and there may be equivalents to the components, parts, or steps that make up the described embodiments. For example, while the example embodiments described herein are principally fixed scanners, the teachings herein are equally applicable to presentation or handheld scanners.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

I. Overview

According to one embodiment, a monolithic compound mirror structure is used in an optical code reader employing an imager that captures images of items bearing optical codes in a viewing volume of the optical code reader. The monolithic compound mirror structure comprises a plurality of highly reflective surfaces positioned on the structure so that the structure can be positioned in a field of view of the imager in the optical code reader and oriented so that two or more of the plurality of highly reflective surfaces appear in the field of view of the imager, to thereby split the field of view of the imager into two or more different views into the viewing volume. The different views into the viewing volume may be direct off of the monolithic compound mirror structure or indirect off of one or more intermediate mirrors.

As used herein, the phrase "highly reflective" means purposefully chosen to be reflective, but not necessarily 100% reflective or any particular percentage of reflectivity; a surface is "highly reflective" if it has sufficient reflectivity to direct enough light energy from the optical code onto the imager to enable processing of the image to decode the code.

Optionally, the monolithic compound mirror structure may comprise a core piece and a plurality of highly reflective plates attached to the core to form the plurality of highly reflective surfaces, and the plates may be attached to the core piece by an adhesive. Optionally, the monolithic compound mirror structure may be molded or machined. Optionally, the highly reflective surfaces are substantially planar and/or formed of metal-coated glass. Optionally, the structure comprises one or more surfaces, other than the plurality of highly reflective surfaces, that are highly nonreflective. Optionally, area between highly reflective surfaces are highly nonreflective. Optionally, at least some of the highly reflective surfaces constitute a Fresnel prism. Optionally, the number of highly reflective surfaces and the number of different views into the viewing volume are the same and are at least three. Optionally, each of the highly reflective surfaces on the compound mirror structure define a normal vector, and the set of all normal vectors so defined point into different directions in a common hemisphere. Optionally, the structure comprises plastic and may comprises at least one reflective metal coating.

According to another embodiment, an optical code reader comprises an imager and a monolithic compound mirror structure. The imager captures images of items bearing optical codes in a viewing volume of the optical code reader. The imager has a field of view. The monolithic compound mirror structure comprises a plurality of highly reflective surfaces on the structure. The structure is positioned in the optical code reader in a field of view of the imager and oriented so that two or more of the plurality of highly reflective surfaces appear in the field of view of the imager, to thereby split the field of view of the imager into two or more different views into the viewing volume.

Optionally, the optical code reader further comprises one or more intermediate mirrors positioned to reflect light from the viewing volume onto one or more of the plurality of highly reflective surfaces on the monolithic compound mirror structure. First and second such intermediate mirrors may be in the same optical path or different optical paths.

Optionally, the optical code reader may further comprises an first alignment feature on the monolithic mirror structure and a second alignment feature on the optical code reader. The second alignment feature may be positioned, shaped and oriented to mate with the first alignment feature on the monolithic mirror structure when the monolithic mirror structure is in a desired position and orientation in the optical code reader. Alternatively, the monolithic compound mirror structure may be integral to at least part of the optical code reader.

Optionally, the optical code reader may further comprise an illumination source that shines light into the viewing volume. The light from the illumination source reflects off the one or more of the plurality of highly reflective surfaces on the monolithic mirror structure to reach the viewing volume. Optionally, the imager is a CMOS imager. Optionally, at least two of the different views into the viewing volume have optical path axes that differ by at least approximately 15, 30, 45, 60 or 90 degrees. Optionally, at least one of the different views into the viewing volume has a field of view having a substantial nonoverlapping region with respect to other views in the viewing volume.

One example of the optical code reader according to claim 15, wherein the plurality of highly reflective surfaces on the monolithic mirror structure are strip-shaped and have respective lengthwise major axes, which are oriented in a common direction.

One example of the optical code reader is a bioptic reader, wherein the plurality of highly reflective surfaces on the monolithic compound mirror structure comprise a first highly reflective surface disposed in an image path for a view having a lower back perspective into the viewing volume, a second highly reflective surface disposed in an image path for a view having a lower left perspective into the viewing volume, and a third highly reflective surface disposed in an image path for a view having a lower right perspective into the viewing volume.

Another example of the optical code reader is a bioptic reader, wherein the plurality of highly reflective surfaces on the monolithic compound mirror structure comprise a first highly reflective surface disposed in an image path for a view having an upper perspective into the viewing volume, a second highly reflective surface disposed in an image path for a view having a lower left perspective into the viewing volume, and a third highly reflective surface disposed in an image path for a view having a lower right perspective into the viewing volume.

Yet another example of the optical code reader is a bioptic reader, wherein the plurality of highly reflective surfaces on the monolithic mirror structure comprise a first highly reflective surface disposed in an image path for a view having an upper perspective into the viewing volume, a second highly reflective surface disposed in an image path for a view having a lower left perspective into the viewing volume, a third highly reflective surface disposed in an image path for a view having a lower right perspective into the viewing volume, and a fourth highly reflective surface disposed in an image path for a view having a lower back perspective into the viewing volume.

Other examples of optical code readers include single-window and tunnel readers. In one example tunnel reader, the plurality of highly reflective surfaces on the monolithic compound mirror structure comprise a first set of highly reflective surfaces disposed in one or more image paths for one or more corresponding views into the viewing volume from a leading perspective, and a second set of highly reflective surfaces disposed in one or more image paths for one or more corresponding views into the viewing volume from a trailing perspective.

Certain embodiments of the monolithic compound mirror structure may be capable of achieving certain advantages, including some or all of the following: (1) enhanced manufacturability and repeatability as many similar or identical monolithic compound mirror structures can be made with little or no individual variation; (2) ease of installation; (3) elimination or minimization of manual alignment of individual mirrors; and (4) improved economy in terms of time and labor to construct an optical code reader.

II. Single-Plane Reader

This subsection describes, by way of example, details of one design of an imager-based reader 800. That design is generally illustrated in FIGS. 1-8. FIG. 1 is an isometric view of the imager-based reader 800 in an enclosure 802, which may be, for example, formed of plastic, metal, and/or any other suitable materials. The enclosure 802 comprises a transparent window 804, which may be, for example, glass. The window 804 may have light filtering properties so as to filter out certain light wavelengths from entering the system. A viewing volume (which may also be called a scanning or pseudo-scanning volume) is outside of the reader 800 and bounded on one side by or near the window 804. When an object bearing an optical code is in the viewing volume and the optical code is generally facing toward the window 804 to a sufficient degree, the reader 800 "sees" the object and ideally can decode an optical code thereon. The reader 800 may be conveniently positioned so that the window 804 is oriented vertically, horizontally, or in another orientation.

Behind the window 804, the reader 800 comprises a number of components, including a camera 806, which typically comprises an imager 808 and a lens 810. The camera 806 is described in greater detail later in this document.

Figure 9:
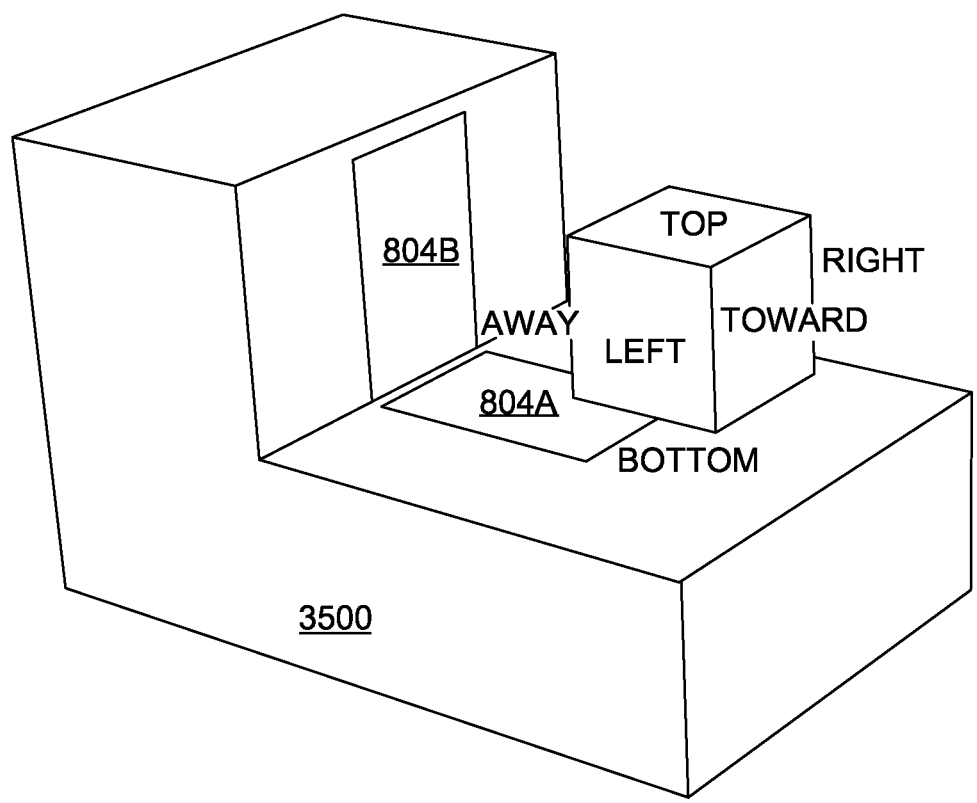
FIG. 9 is an isometric view of a bioptic reader according to one embodiment.
Figure 10:
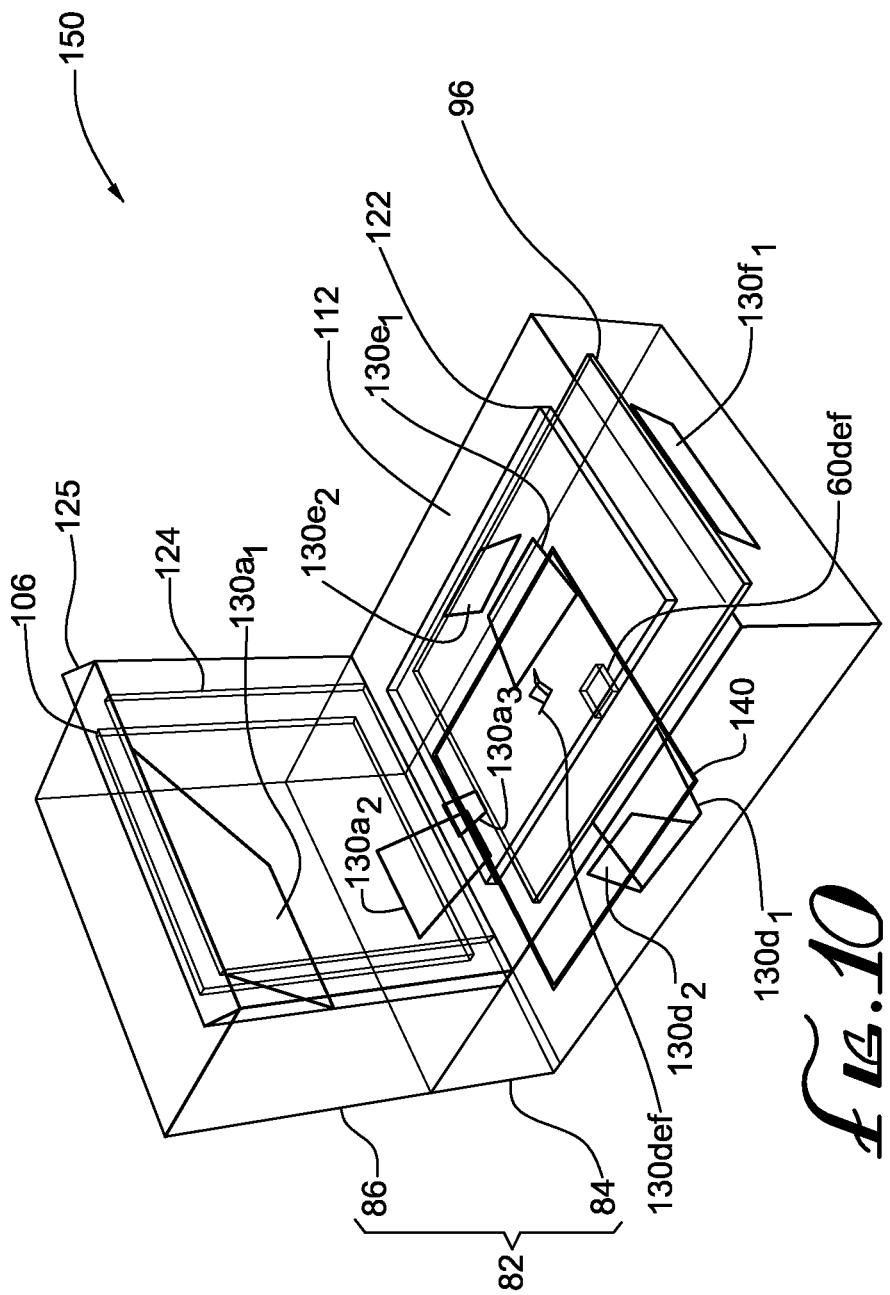
FIG. 10 is an isometric view of a bioptic optical code reader capable of capturing multiple views from different perspectives, according to one embodiment.

Also behind the window 804, the reader 800 further comprises a basket 812, which can be seen more clearly in FIGS. 9-10, which are two different isometric views of internal components of the reader 800, without the enclosure 802. Other internal components include a mounting block 814 for redirection mirrors, as well as mounting blocks 815-819 for pattern mirror sets. The mounting blocks 814-819 may be separable pieces connected or affixed to the basket 812 or may be integrally formed on or as part of the basket 812. The mounting blocks 814-819 are shaped, positioned, and oriented so as to position the mirrors in suitable locations to achieve desired operational characteristics.

Mounted to the mounting block 814 are redirection mirrors 820, 825, 830, 835 and 840. Each of the redirection mirrors 820, 825, 830, 835 and 840 is oriented to reflect one of the pattern mirror sets 850, 860, 870, 880 and 890 into a desired section of the camera's imaging plane. These mirrors may be constructed from any suitable mirrored or reflective material. For example, a reflective coating may be applied to the pertinent faces of the mirror block 814, or physically separate mirror pieces (made from, e.g., diced coated silicon wafer pieces) may be attached thereto. According to one example, the redirection mirrors 820-840 may be silicon mirrors having a rectangular shape having approximate dimensions 36 mm×4.2 mm. As shown, the redirection mirror 820 is directed at the pattern mirror set 870, the redirection mirror 825 is directed at the pattern mirror set 860, the redirection mirror 830 is directed at the pattern mirror set 880, the redirection mirror 835 is directed at the pattern mirror set 890, and the redirection mirror 840 is directed at the pattern mirror set 850. Other orderings or arrangements of the redirection mirror 820, 825, 830, 835 and 840 are possible, as are other pairings of the redirection mirrors with pattern mirror sets. A desirable arrangement of the redirection mirrors provides an unobstructed view of each set of pattern mirrors, as seen from the imager 808. In general, depending on the arrangement, it is possible that one or more redirection mirrors or its mount may occlude the view seen via another redirection mirror. Some partial occlusion may be tolerable, provided that enough of the partially occluded view comes through to the imager 808 to enable it sufficiently often enough to successfully decode an optical code seen from that point of view. A reader built as generally shown in FIGS. 1-4 should have acceptable self-occlusion caused by the mounting block 814 and the redirection mirrors 820, 825, 830, 835, and 840. Other designs may be more or less tolerant of self-occlusion.

Figure 4:
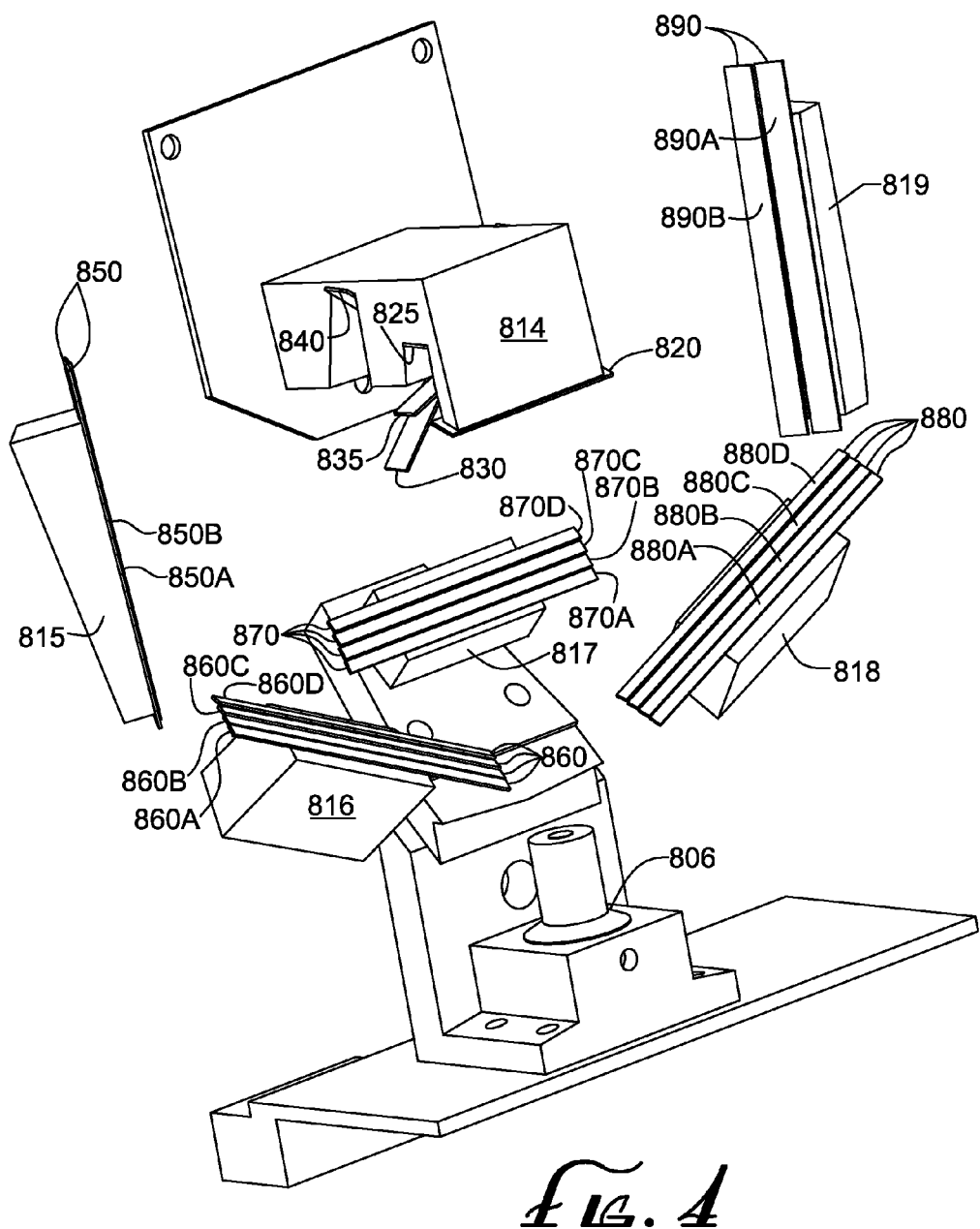
FIG. 4 is an isometric view of select internal parts of the imager-based reader of FIGS. 1-3 without the enclosure or support basket.

FIG. 4 is an isometric view of selected internal parts of the reader 800 without its enclosure 802 or basket 812. The pattern mirrors 850A and 850B; 860A, 860B, 860C, and 860D; 870A, 870B, 870C, and 870D; 880A, 880B, 880C and 880D; and 890A and 890B in the sets 850, 860, 870, 880 and 890, respectively, are individually labeled in FIG. 4. In this embodiment, each of the mirror sets 860, 870, and 880 has four pattern mirrors, while the sets 850 and 890 each has two pattern mirrors. The number of pattern mirrors per set is arbitrary within constraints such as acceptability or desirability of the resulting pseudo-scan line coverage pattern; occlusion issues; and minimum strip height to yield a decodable image section (e.g., sufficient height to fit a two-dimensional optical code, if that be the application). Decodability of image data may depend, in turn, on the camera's resolution, the decoding algorithm employed, as well as other factors. According to one example, the pattern mirrors may be silicon mirrors having a rectangular shape with approximate dimensions 43 mm×1.7 mm.

Figure 5A:
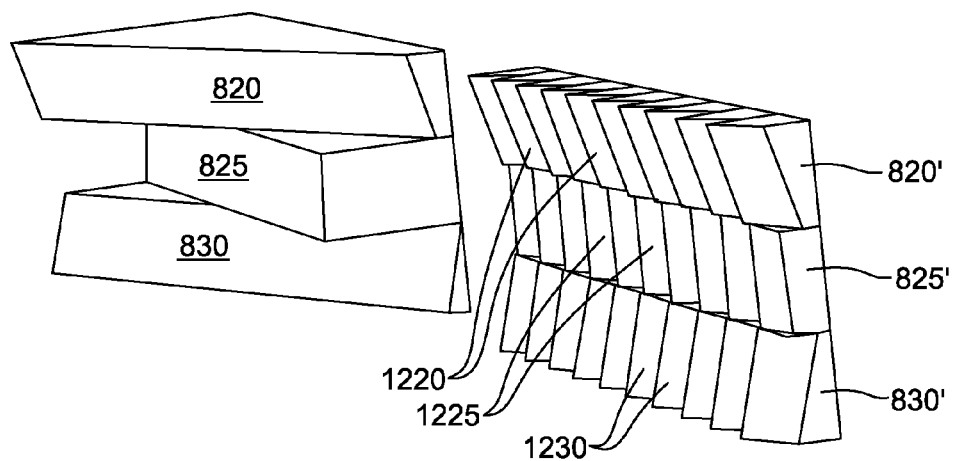
FIGS. 5A, 5B and 5C are isometric views of alternative redirection mirrors based on Fresnel prisms for use in the imager-based reader of FIGS. 1-4.
Figure 5B:
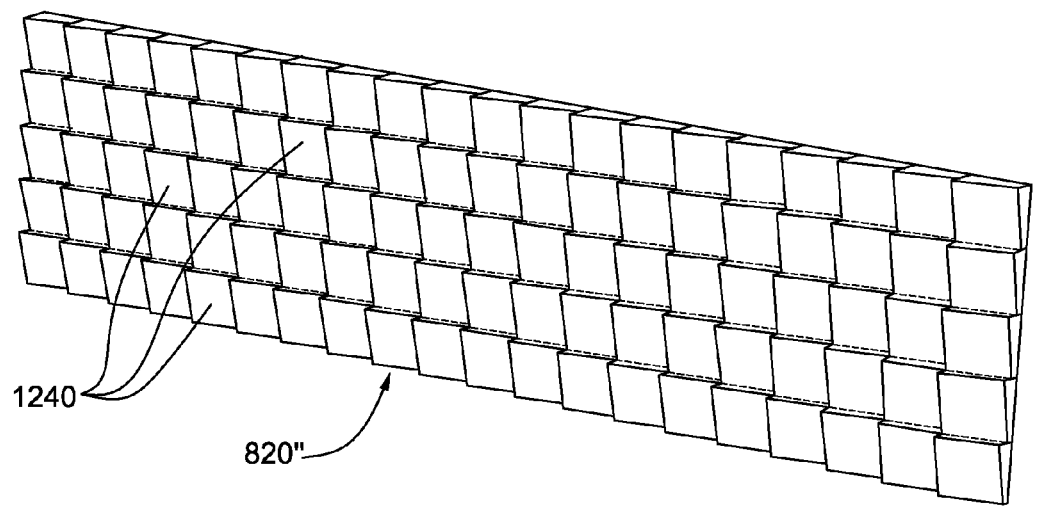
Figure 5C:
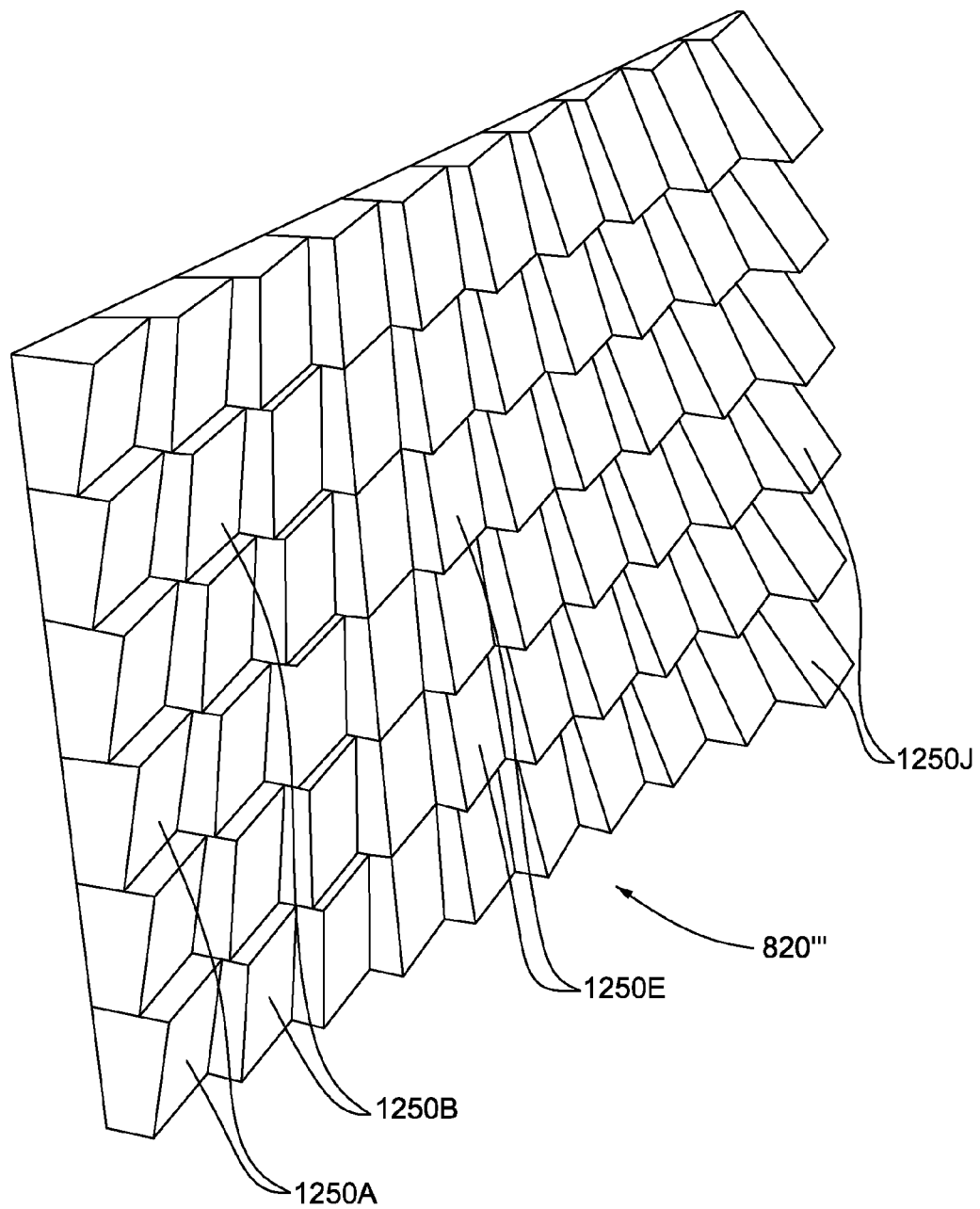

As an alternative to the flat planar redirection mirrors 820-840, it is possible to utilize Fresnel prisms instead, as generally illustrated in FIGS. 5A-5C. FIG. 5A shows three of the redirection mirrors 820, 825 and 830 on the left, and three respective alternative Fresnel prisms labeled 820', 825' and 830' on the right. A possible disadvantage associated with the flat planar redirection mirrors 820-840 is that they can occlude each other's fields of view. For example, the right portion of the redirection mirror 825, as shown, appears in a portion of the field of view of the redirection mirror 820 above it, as well as in a portion of the field of view of the redirection mirror 830 below it. Although such occlusion or shadowing might be minimized or avoided by careful design of the redirection mirror array, the occlusion problem can be significantly mitigated by use of Fresnel prisms. As illustrated on the right side of FIG. 5A, each Fresnel prism consists of a set of smaller mirrors 1210 lined up in a row and pointing in a common direction. In other words, the larger redirection mirror 820 is broken up into many facets 1220 that are facing the same direction; those facets 1220 together constitute the Fresnel prism 820', which approximately duplicates the function of the redirection mirror 820. Similarly, the Fresnel prism 825', consisting of the facets 1225, behaves like the redirection mirror 825, and the Fresnel prism 830', consisting of the facets 1230, behaves like the redirection mirror 830. The shadowing of each section is typically negligible, and any shadowing is common from facet to facet, leading to a reduction in total efficiency but not in a shadowing of a large section of an image. Furthermore, the Fresnel mirror array is thin and can lend itself to low-cost fabrication.

FIG. 5B illustrates another alternative Fresnel prism 820" for use in place of one of the redirection mirrors, such as, by way of example, the redirection mirror 820. Unlike the Fresnel prism 820', which is split horizontally only, the Fresnel prism 820" is fractured horizontally and vertically into facets 1240.

It is believed that the optimum size of facets for a Fresnel prism is about half the size of the projected imager pixel at the location of the mirror array. If the facet size is greater than the projected pixel size, then some of a facet will redirect the image from several pixels with high efficiency but then a pixel with low efficiency due to the step change at the edge of the facet. If the facet size is less than the projected pixel size, then each pixel will reflect at a lower efficiency, but the efficiency will be constant across the entire array. Constant efficiency is preferred. As the prism pitch (i.e., the size of the facets) becomes even smaller, the efficiency becomes worse and diffraction effects start to occur as well. As an example, a Fresnel prism placed in the camera's field of view where the image is 25.6 mm wide, and the resolution of the imager is 1280×1024 pixels will have a projected pixel size 20 µm wide. A prism spanning one-half of a pixel would be 10 µm×10 µm. Diffractive optics manufacturers can make features smaller than that. For example, MEMS Optical, Inc., Huntsville, Ala., can make 3 µm gray scale features, and Tessera (formerly known as Digital Optics Corp.), Charlotte, N.C., can achieve binary to 64 phase levels with 0.5 µm feature sizes.

Yet another alternative Fresnel prism 820''' is illustrated in FIG. 5C. The Fresnel prism 820''' comprises a column of vertically aligned facets 1250A pointed in a first common direction, another column of vertically aligned facets 1250B pointed in a second common direction slightly offset from the first direction, and so on, as shown. Unlike the Fresnel prisms 820' and 820", the Fresnel prism 820''' rotates the field of view. A horizontal slice of an image from a camera, imaged through the Fresnel prism 820''' looks out at diagonally oriented region. The Fresnel prism 820' performs image rotation without distortion, unlike a contiguous mirror, which would be shaped like a helix and would distort the image.

Figure 6A:
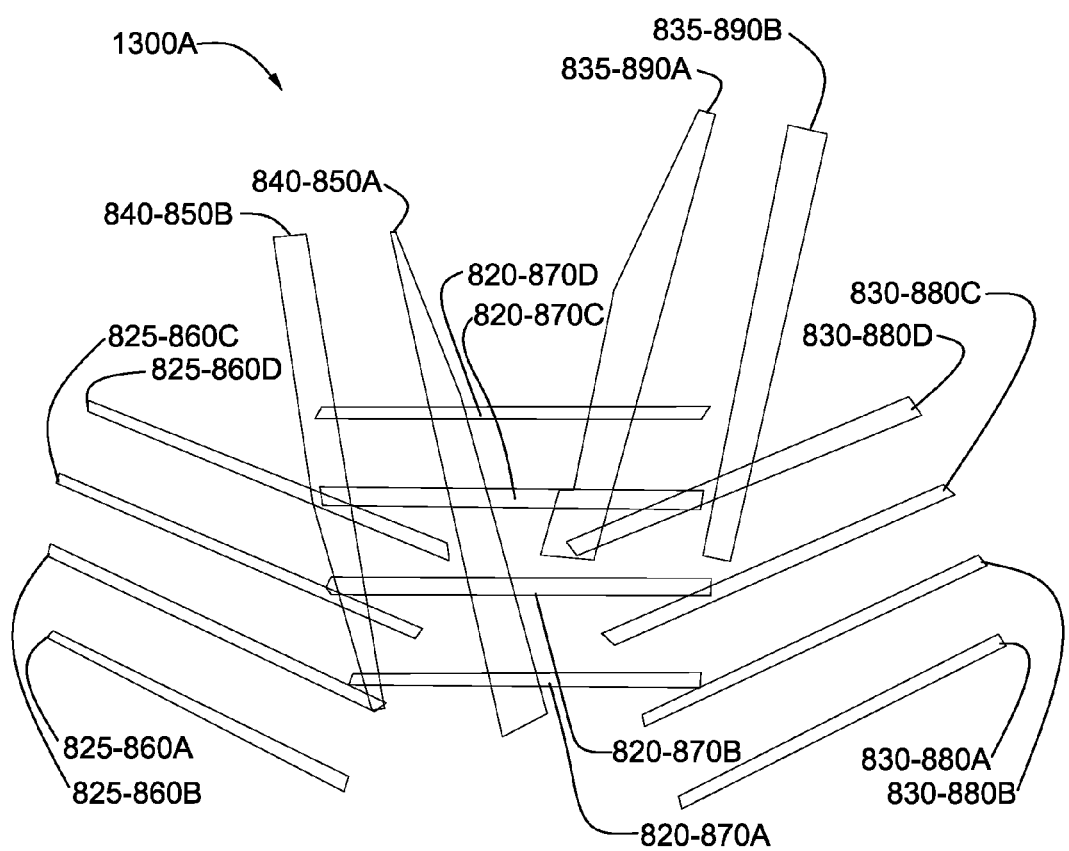
FIGS. 6A and 6B are depictions of the pseudo scan line pattern for the imager of FIGS. 1-4.
Figure 6B:
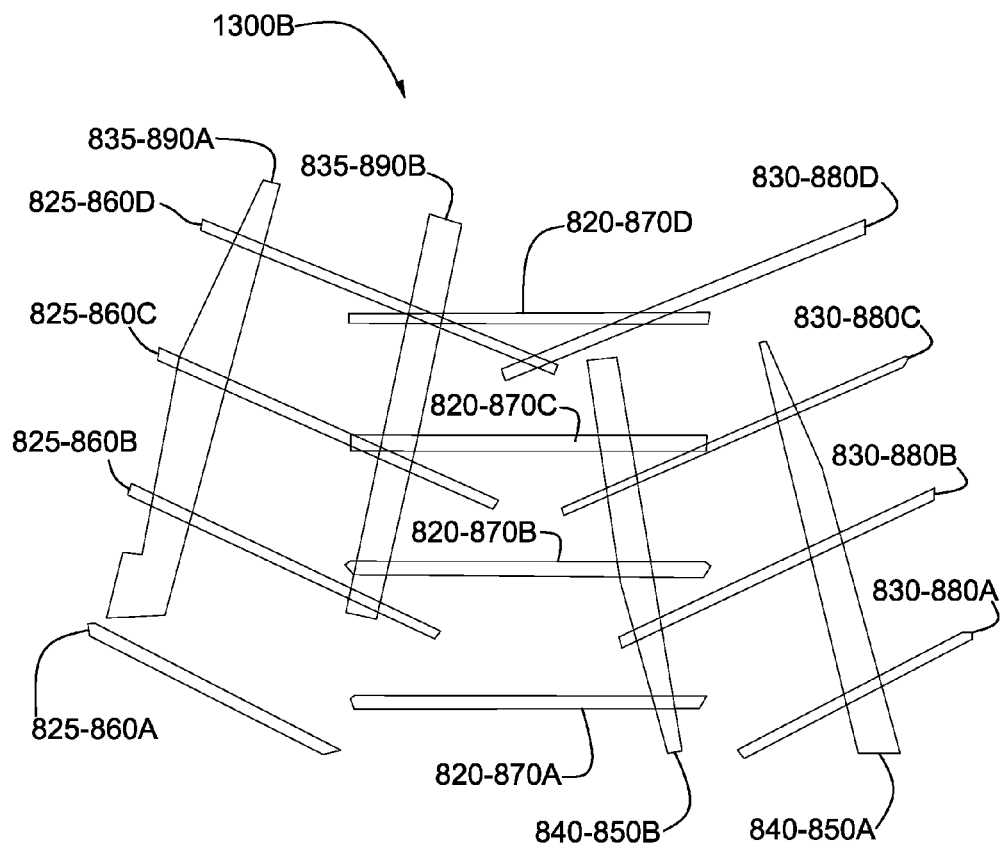

FIGS. 6A and 6B depict pseudo scan line patterns 1300A and 1300B, respectively, for the reader 800. The pseudo scan line pattern 1300A in FIG. 6A is at the window 804, while the pseudo scan line pattern 1300B in FIG. 6B is at a plane parallel to and four inches away from the window 804. Each pseudo scan line in FIGS. 6A and 6B is labeled with the sequence of mirrors for that viewing section, starting from the imager 808. For example, the pseudo scan line labeled "840-850B" is produced by redirection mirror 840 and pattern mirror 850B in series. As can be seen, the pseudo scan lines spread out from each other as the distance from the window 804 increases, due to the fact that views are taken at non-normal angles looking through the window 804. FIGS. 6A and 6B also show that the pseudo scan lines from the mirror 850 and the mirror 890 cross. This crossing is due to the fact that those two mirrors are pointed somewhat across the viewing volume from generally opposite sides of the reader.

FIG. 7 is a plan or face-on view of the imaging plane or face 400 of the imager 808, which is part of the camera 806 including the imager 808 and the lens 810 (or an image 400 generated by the camera 806). The imaging face 400 is divided into a number of strips, which in this case extend horizontally across the imaging face. Each strip in FIG. 7 is labeled with a reference number that denotes the sequence of mirrors "seen" by each section of the camera 806. For example, in the first (topmost as illustrated) strip, the camera 806 sees the redirection mirror 820 and its constituent reflections from the pattern mirror 870A in the first horizontal strip, and that strip is therefore labeled with the reference number "820-870A." The next three strips see the reflections of the pattern mirrors 870B, 870C, and 870D, respectively, in the lower three-fourths of the redirection mirror 820. Below that, in the next four strips, the camera 810 sees the redirection mirror 825 and the pattern mirrors 860A-860D therein. Below that, in the next four strips, the camera 806 sees the redirection mirror 830 and the pattern mirrors 880A-880D therein. Next, the reflections of the pattern mirrors 890A and 890B are projected via the redirection mirror 835 into the next two strips. Finally, the reflections of the pattern mirrors 850A and 850B, in that order, are redirected into the final two strips by the redirection mirror 840 on the bottom of the stack of redirection mirrors. The bottom four strips in FIG. 7 are larger in the vertical direction than the strips above them due primarily to the heights of those pattern mirrors. The distances between the lens 810 and a redirection mirror, as well as the distance between a redirection mirror and its pattern mirrors, can also affect the height of a strip on the face 400 of the imager 808.

Figure 8:
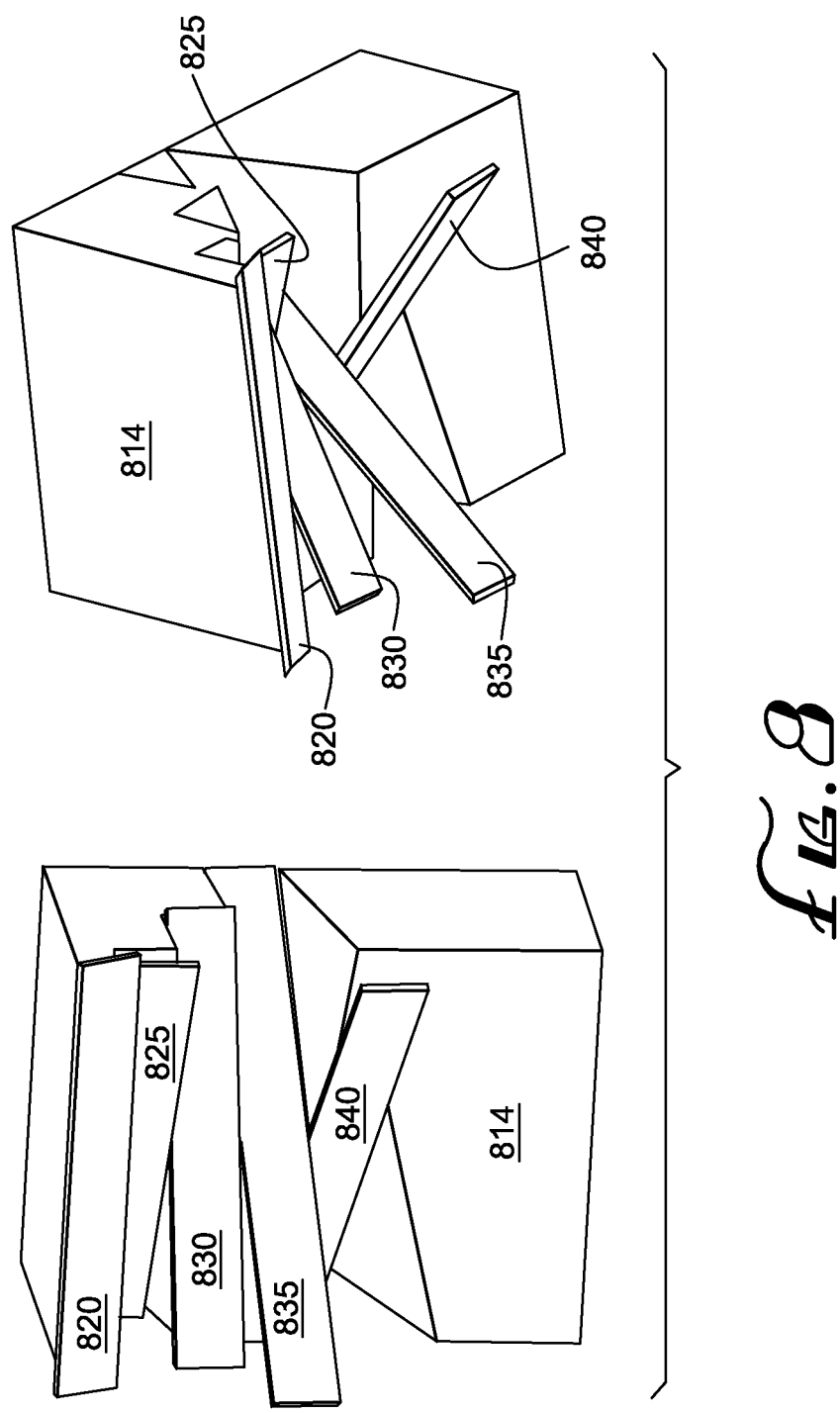
FIG. 8 is an isometric view of one example of a monolithic compound mirror structure used in the reader illustrated by FIGS. 1-4.

FIG. 8 is an isometric view of the mounting block 814 and redirection mirrors 820-840, together as one example of a monolithic compound mirror structure. As used herein, the term "monolithic" does not connote any particular size or material of the structure. The monolithic compound mirror structure has a single-piece or one-piece design, which may be uniform and indivisible. The monolithic compound mirror structure may be solid or hollow. In general, the monolithic compound mirror structure constitutes or acts as a single, rigid, uniform whole that is unchanging, unyielding, or unable or slow to change shape over time. The monolithic compound mirror structure preferably has no movable joints or seams and is unbroken or united, although it may be assembled from disparate pieces joined together. The monolithic compound mirror structure consists of or constitutes a single unit or undifferentiated whole. The monolithic compound mirror structure is characterized by rigidly fixed uniformity so that its parts maintain a positional relationship and do not move relative to each other. In other words, its parts are fixed, aligned or secured relative to each other. The monolithic compound mirror structure is a unitary, integral, contiguous piece.

A vignetting analysis for the imager-based reader 800 may involve the following considerations. As a starting point in the analysis, it can be assumed that a desired length of a horizontal pseudo-scan line (e.g., one of the pseudo-scan lines, such as 820-870A in FIG. 5B) is about 2.5" (inches) or 65 mm (millimeters or $10^{-3}$ meters). Based on rough estimates for the placement of the camera's imager 808 and lens 810, the redirection mirror 820, and the set 870 of pattern mirrors for a given form factor of the enclosure 802, the total path length from the window 804 to the lens 810 by way of those mirrors is approximately 7.2" or 180 mm. Using well-known trigonometric relations, that yields a 20° (degrees) full field angle. In the case in which the imager 808 has 1280 pixels×1024 pixels that are each 5.2 µm (micrometers or $10^{-6}$ meters) square, as is the case with the model MT9M001 CMOS imager, manufactured by Micron Tech., Inc., Boise, Id., the imaging area is 6.66 mm×5.32 mm. The back focal length would then be 18.4 mm to achieve this geometry. The camera's field of view on the plane of the redirection mirrors 820-840 would be 26 mm×21 mm, so the five redirection mirrors 820-840 would be 26 mm wide×4.2 mm tall each, corresponding to about 3.2° each. If tilted, a redirection mirror could be wider. Because having the redirection mirrors somewhat wider than needed is generally not problematic, the pattern mirrors can all be made the same approximate dimensions for simplicity. The pattern mirrors, in this case, can be made in sets of 4 narrow mirrors of approximate size of 43 mm×1.7 mm.

The lens 810 can be designed for maximum collection and for a 6" (or 150 mm) depth of field for 10 mil labels (i.e., the unit width being 10 mils or 10 thousandths of an inch) starting at a near field distance at the window 804, which is 180 mm from the lens 810. The lens 810 may be sharply focused or not (e.g., having spherical, chromatic or other aberration). Assuming a focus position at about 3" from the window (255 mm from the lens 810), the thin lens equation yields a 17.2 mm focal length for those conjugates (255 mm and 18.4 mm). According to a first order vignetting analysis, the limiting aperture is at the pattern mirror plane. A 4 mm lens aperture is approximately the maximum size that avoids vignetting, which is f/4.3, under the assumptions made herein. Different assumptions can alter the analysis and its results. A desirable range for the lens aperture (not considering vignetting) is between about f/4 and about f/8 in order to achieve the desired depth of field. One suitable lens that is commercially available is a model UKA227 lens, available from Universe Kogaku America, Oyster Bay, N.Y., having a focal length of f=17.65 mm and an aperture diameter of 3.16 mm, yielding an f-number of f/6 at the image conjugates to achieve the proper focus (19 mm and 250 mm). Better modulation can be achieved with an f/8 system (lens aperture being 2.375 mm), which also reduces vignetting effects but reduces the collected signal.

The reader 800 is just one example of the physical layout of a single-plane, single-window or monoptic imager-based reader. Other placements of the components are possible. The reader 800 has five redirection mirrors and four or two pattern mirrors per pattern mirror set, with each image section generated by reflection off two mirrors. In the reader 800, the five redirection mirrors 820-840 segment the imager's field of view into five orientations. The pattern mirrors 850-890 further segment the imager's field of view into two or four different orientations in an orthogonal direction for each redirection mirror. There are many different mirror arrangements that may achieve useful results. The imager's field of view can be segmented into fewer or more segments, as appropriate. Each segment may be created by a single mirror, or by multiple mirrors, or even no mirror at all (such as a gap between mirrors). Mirrors may reflect multiple segments, as shown with the redirection mirrors 820-840, or the entire field of view (as needed to make a more compact unit), or may reflect a single segment, such as mirrors the pattern mirrors 850-890. The reader 800 shows the redirection mirrors 820-840 directing the segments generally left and right of the imager's viewing direction. Alternatively, the mirrors could direct the segments generally up and down from the imager's viewing direction, perhaps preventing occlusion of other image segments. One could say that each redirection mirror corresponds to one viewing angle into the viewing volume, whereas each pattern mirror within a set produces a different, offset pseudo-scan line into the viewing volume at, about or near that viewing angle. In other words, each redirection mirror corresponds to a gross or large-scale viewing angle into the viewing volume, while the different pattern mirrors generally cause a divergence of a multitude of pseudo-scan lines from roughly the same gross viewing angle. The slightly different orientations of the pattern mirrors within a set causes some difference in viewing angle into the viewing volume. Regardless of those differences (which may or may not be negligible in a given design), the number of redirection mirrors may be more or less depending upon how many different gross viewing angles into the viewing volume are desired. Moreover, the number of pattern mirrors within a set can be varied to provide a desired number of pseudo-scan lines for a given gross viewing/imaging angle. Finally, the optical path from the viewing volume to the imager may contain additional intermediate mirrors, only a single mirror, or even no mirrors.

In some applications ambient light can be sufficient for imaging. In other applications, additional illumination can be added to enhance imaging and/or decoding performance. The wavelength or frequency of the induced illumination may be visible or non-visible and may be monochromatic, bi-chromatic, or polychromatic. For example, the dual-frequency illumination technique taught in U.S. Pat. No. 7,224,540 can be utilized with the imager-based readers disclosed herein. Added or artificial illumination can have various directionality properties. For example, added illumination may be broad-field into all or a substantial portion of the viewing volume or focused into some subset of the entire viewing volume, such as only the pseudo scan line regions where views are taken or specific row lines therein. It may be desirable to synchronize the timing of the added illumination with the imager, so that the illumination is strobed at approximately the same time as when the pertinent pixels of the imager are exposing. In the case of a global-reset imager, the entire viewing volume or all pseudo scan line regions can be illuminated together when the imager is exposing. In the case of a rolling-reset imager, illumination can be flashed into or in the vicinity of only those portions of the viewing volume from which a view is being directed into the particular portion of the imager being exposed at the time of the flash. One way of directing illumination into selected areas of the viewing volume where images are captures is to direct the illumination via the same mirrors used to take the views. For example, one or more illumination sources near the imager 808 can be directed onto the redirection mirrors 820-840 and then onto their respective pattern mirrors and then into the viewing volume.

The imager 800 may comprise or be interfaced to electronic circuitry to process the image data. The electronic circuitry may include a processor, such as a DSP (digital signal processor), interfaced to the imager 800 in such a way as to read image data from the imager and process the image data so as to attempt to decode a readable bar code image in any one the imager's sections. For example, a DMA scheme can be employed to capture pertinent rows or entire frames of image data from the imager 808 into a memory buffer, which may be a on-chip cache memory in the processor or an external memory. The processor may additionally or alternatively perform or facilitate other functions, such as control of illumination.

Software in the processor can generate one or more virtual scan line for each section of the image. One virtual scan line per section may be sufficient. Virtual scan lines can be passed to a decoder module, which may be of any type suitable for decoding barcodes in linear array images. One example of a decoder technique involves equalization filtering for deblurring, edge detection, low level decoding and high level decoding.

III. Two-Plane Readers

This section describes, by way of example, details of several embodiments of two-plane, two-window or bioptic imager-based optical code readers. For example, two or more of the single-window imager-based imagers described herein, such as the reader 800 illustrated in FIGS. 1-8, can be combined and utilized together to make a multiplane (e.g., bioptic or two-window) reader. A typical bioptic arrangement has the two windows arranged with one edge of one window in proximity to one edge of the other window, and with a desired angular relation (e.g., 90°) of the windows about that approximate common edge.

FIG. 9 illustrates a bioptic reader 3500 having a horizontal viewing window 804A and a vertical viewing window 804B to introduce a frame of reference for ease of description. With reference to FIG. 9, a general example object to be passed through the viewing volume of the bioptic reader 3500 is indicated as having sides labeled top, left, bottom, right, away and toward. Assume for the sake of discussion that the object moves from right to left through the viewing volume. Then, the left and right sides can be referred to as the leading and trailing sides, respectively. The toward and away sides can also be referred to as the customer and checker sides, respectively. The checker side is also sometimes called the back side. Other terminology may be used in other contexts to refer to the sides of the object.

A. Single Horizontal Imager Split into Three Perspectives & Separate Unsplit Vertical Imager This subsection describes, by way of example, details of one type of embodiment of a bioptic imager-based optical code reader 150. FIG. 10 is an isometric view of an optical code reader 150 capable of capturing multiple views of an object 20 (not shown) from different perspectives.

With reference to FIG. 10, the optical code reader 150 has two imagers that capture one view and three views respectively. A first set of mirrors 130a (mirrors $130a_1$, $130a_2$ and $130a_3$) reflect an upper perspective of the view volume 64a along an image path to a single-view imager (not shown), which may be supported on the printed circuit board (PCB) 140 located in the lower housing portion 84 of the housing 82.

FIG. 11 is a map of an image field 156 of an imager 60def divided into three regions to capture separate views, and FIG. 12 shows an alternative division of the image field 156 into three alternative regions to capture the separate views, to demonstrate that the left and right views need not be symmetrical. In general, the sizes of the different regions can be set by the designer subject to constraints such as possible mirror placement and form factors for the reader 150.

With reference to FIG. 13, an image of an object (not shown) in the view volume 64d, captured from the left lower perspective and propagated through the lower transparent plate 96 along the image path segment $62d_1$, is reflected upward and outward away from the center of the reader 150 by the primary mirror $130d_1$ along the image path segment $62d_2$ to the secondary mirror $130d_2$ which reflects the image sideward toward the center of the reader 150 along the image path segment $62d_3$ to a tertiary mirror $130d_3$ on a compound mirror structure 130def which reflects the image downward along an image path segment $62d_3$ to the imager 60def that may be supported on the PCB 140 located in the lower housing portion 84 of the housing 82. The image path segments $62d_1$, $62d_2$ and $62d_3$ overlap spatially in a volume between the mirrors $130d_1$ and $130d_2$.

The mirrors $130d_1$ and $130d_2$ may be separated as shown, or they may be abutting, or they may be integrated into a single split mirror or other monolithic mirror structure, with or without nonreflective regions in proximity to their intersection.

Figure 14:
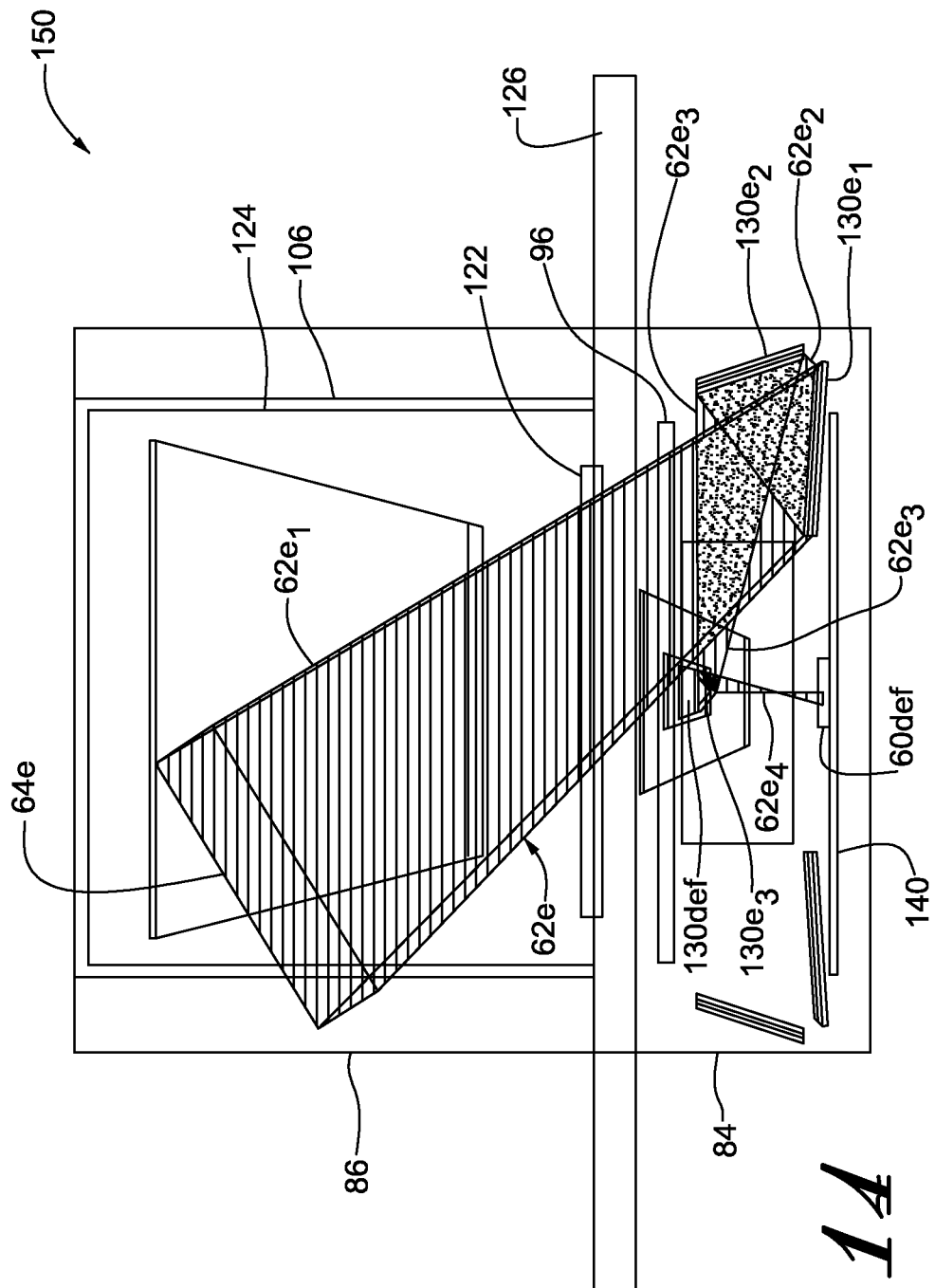
FIG. 14 is a front view of mirrors reflecting a right lower perspective of a view volume along an image path to an imager of an the optical code reader of FIG. 10, showing the image path and view volume with shading lines.

FIG. 14 is a front view of a third set of mirrors 130e (mirrors $130e_1$, $130e_2$ and $130e_3$) reflecting a right lower perspective of the view volume 64e along the image path 62e to the imager 60def of the optical code reader 150. With reference to FIG. 14, an image of an object (not shown) in the view volume 64e, captured from the right lower perspective and propagated through the lower transparent plate 96 along the image path segment $62e_1$, is reflected upward and outward away from the center of the reader 150 by the primary mirror $130e_1$ along the image path segment $62e_2$ to the secondary mirror $130e_2$ which reflects the image sideward toward the center of the reader 150 along the image path segment $62e_3$ to a tertiary mirror $130e_3$ on the compound mirror structure 130def which reflects the image downward along an image path segment $62e_3$ to the imager 60def, which may be supported on the PCB 140. The image path segments $62e_1$, $62e_2$ and $62e_3$ overlap spatially in a volume between the mirrors $130e_1$ and $130e_2$.

The mirrors $130e_1$ and $130e_2$ may be separated as shown, or they may be abutting, or they may be integrated into a single split mirror or other monolithic mirror structure, with or without nonreflective regions in proximity to their intersection.

The perspective associated with the image path 62e in FIG. 14 may be arranged so that it is bilaterally symmetrical with the image path 62d. However, in some embodiments, the image path 62e may be arranged to be asymmetrical with the image path 62d.

Figure 15:
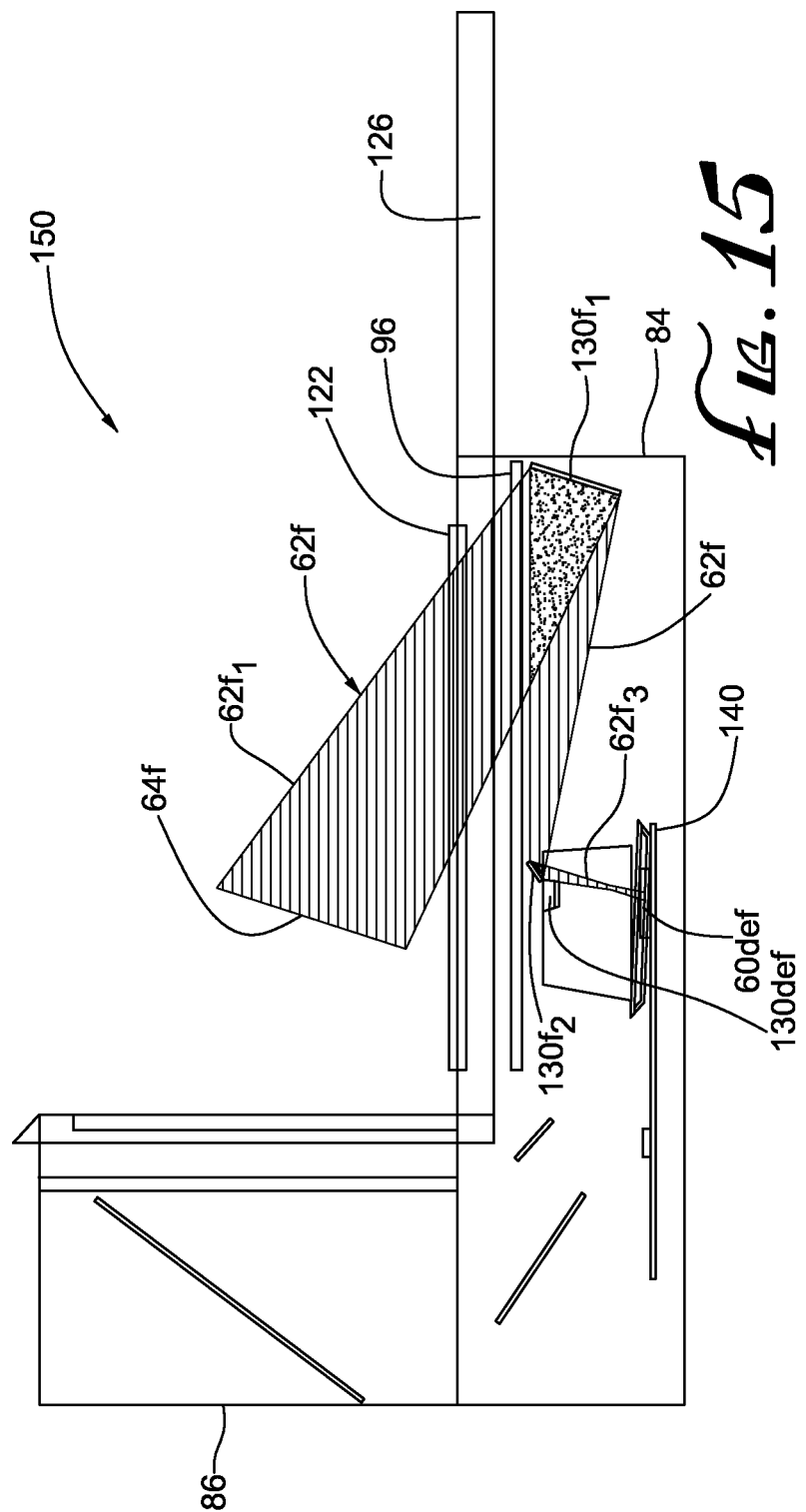
FIG. 15 is a side view of mirrors reflecting a back lower perspective of a view volume along an image path to an imager of the optical code reader of FIG. 10, showing the image path and view volume with shading lines.

FIG. 15 is a side view of a fourth set of mirrors 130f (mirrors $130f_1$ and $130f_2$) reflecting a back lower perspective of a view volume 64f along an image path 62f to an imager 60def of the optical code reader 150. With reference to FIG. 15, an image of an object (not shown) in the view volume 64f, captured from the back lower perspective and propagated generally downward and horizontally through the lower transparent plate 96 along an image path segment $62f_1$, is reflected generally horizontally away from the checker side by a primary mirror $130f_1$ along an image path segment $62f_2$ to a secondary mirror $130f_2$ in the compound mirror structure 130def, which reflects the image generally downward along an image path segment $62f_3$ to the imager 60def.

Figure 16:
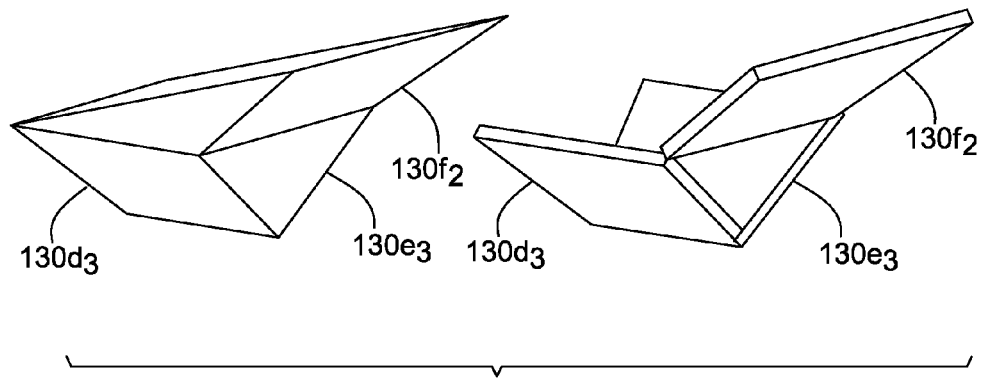
FIG. 16 is an isometric view of a compound mirror structure used with the horizontal imager in the optical code reader of FIG. 10.

FIG. 16 is an isometric view of different embodiments of the mirror 130def used with the horizontal imager 60def in the optical code reader of FIGS. 13-15. The mirror 130def is preferably an integrated, monolithic, or single-piece split mirror or compound mirror that includes mirror components $130d_3$, $130e_3$, and $130f_2$ of the respective image paths 62d, 62e, and 62f. The mirror components $130d_3$, $130e_3$, and $130f_2$ of the compound mirror structure 130def may be arranged at different angles with respect to the horizontal or vertical planes (and with respect to each other) to accommodate the orientations of the different image paths $62d$, $62e$, and $62f$. The mirror components $130d_3$, $130e_3$, and $130f_2$ may employ any of the variations used for any of the mirrors 130 as previously described. The mirror $130def$ may be formed by molding, bending, and/or welding a single monolithic piece or substrate, such as a metal or plastic, and then applying reflective coatings. Any desired nonreflective regions could be covered in advance by masking or subsequently covered by a nonreflective coating. Alternatively, the mirror $130def$ may be assembled from separate mirrored components. In some embodiments, the mirror components $130d_3$, $130e_3$, and $130f_2$ may have nonreflective regions in proximity to their intersections. In some embodiments, some image processing advantages may be gained by not capturing images reflected from near the intersection of the mirror components $130d_3$, $130e_3$, and $130f_2$ of the split mirror $130def$. In some alternative embodiments, the mirror components $130d_3$, $130e_3$, and $130f_2$ may be separated into two or three separate mirrors. In some embodiments, the mirror components $130d_3$, $130e_3$, and $130f_2$ direct the respective image paths 62 to separate imagers that may be closely spaced.

With reference to FIG. 11 or 12, the image field 156 of the imager $60def$ may be split into three image field regions, such as a left region 162, a right region 164, and a back region 166, that may be adapted to capture images from the corresponding left lower perspective, right lower perspective, and back lower perspective, respectively. Thus, the mirror component $130d_3$ reflects the image along the image path $62d_4$ onto the left region 162 of the image field 156 of the imager $130def$; the mirror component $130e_3$ reflects the image along the image path $62e_4$ onto the right region 164 of the image field 156 of the imager $130def$; and the mirror component $130f_2$ reflects the image along the image path $62f_3$ onto the back region 166 of the image field 156 of the imager $130def$. Exemplary imagers that may be used for this embodiment include wide VGA imagers (CMOS or CCD) with a resolution of 752×480 pixels and megapixel imagers with a resolution of 1280×1024 pixels. However, any other suitable type of imager of various resolutions may be employed.

The image field 156 need not be square or rectangular and may, for example, be circular or have a profile of any suitable geometric shape. Similarly, the image filed regions need not be square or rectangular and may, for example, have one or more curved edges. The image field regions may have the same or different sizes. For example, all three regions 162, 164, and 166 may have the same areas and perhaps even the same dimensions. In some embodiments, the left region 162 and right region 164 have the same areas dimensions, and the back region 166 has different dimensions (with the same area or different area) such as shown in FIG. 11. In some embodiments, all three regions 162, 164, and 166 may have the different areas and different dimensions such as shown, by way of example and not limitation, in FIG. 12.

The image captured by the image field 156 may be processed as a single image; preferably however, the image captured by each image field region is processed independently. The images from the different perspectives of an object may reach the image field regions with the object being in the same orientation or in different orientations. Furthermore, the same enantiomorphic image of an object (not shown) from the different perspectives of the object may reach the different image field regions or different enantiomorphic images of the object may reach the different image fields. The different image field regions may have the same photosensitivities or be receptive to different intensities or wavelengths of light.

Figure 17:
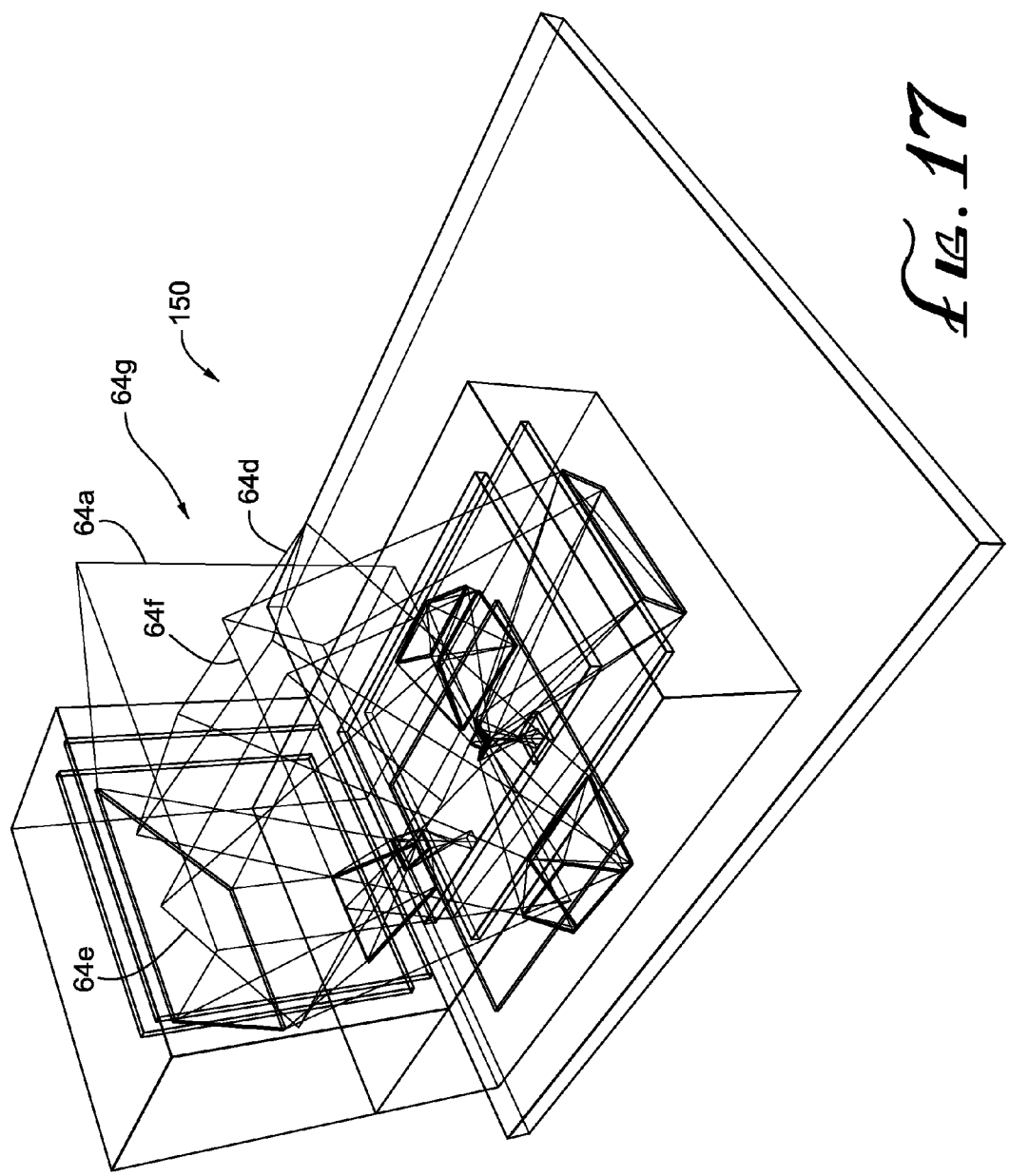
FIG. 17 is an isometric view of multiple image paths and respective multiple perspective view volumes that form a cumulative view volume of the optical code reader of FIG. 10.

FIG. 17 is an isometric view of multiple image paths 62 and respective multiple perspective view volumes 64 that form a cumulative view volume $64g$ of the optical code reader 150.

As with the previous embodiments and figures, the same or different filters, lenses, or other optical components may be optionally placed in some or all of the image paths 62. In some embodiments, the image reflected by each mirror component can be captured by the entire image field 156 when pulsed lighting and/or different wavelengths are used to separate the images obtained by the different perspectives.

In an alternative embodiment, the upper perspective and the back lower perspective may be reflected to a common imager, and the left and right perspectives may be reflected to a common imager. These common imagers may have split imaging fields divided equally. These imagers may be located in the same housing portion or different housing portions, and they may share a common PCB 140 or be supported by different PCBs 140. The mirrors 130 used for reflecting images onto these imagers may be split mirrors or independent mirrors.

Figure 18:
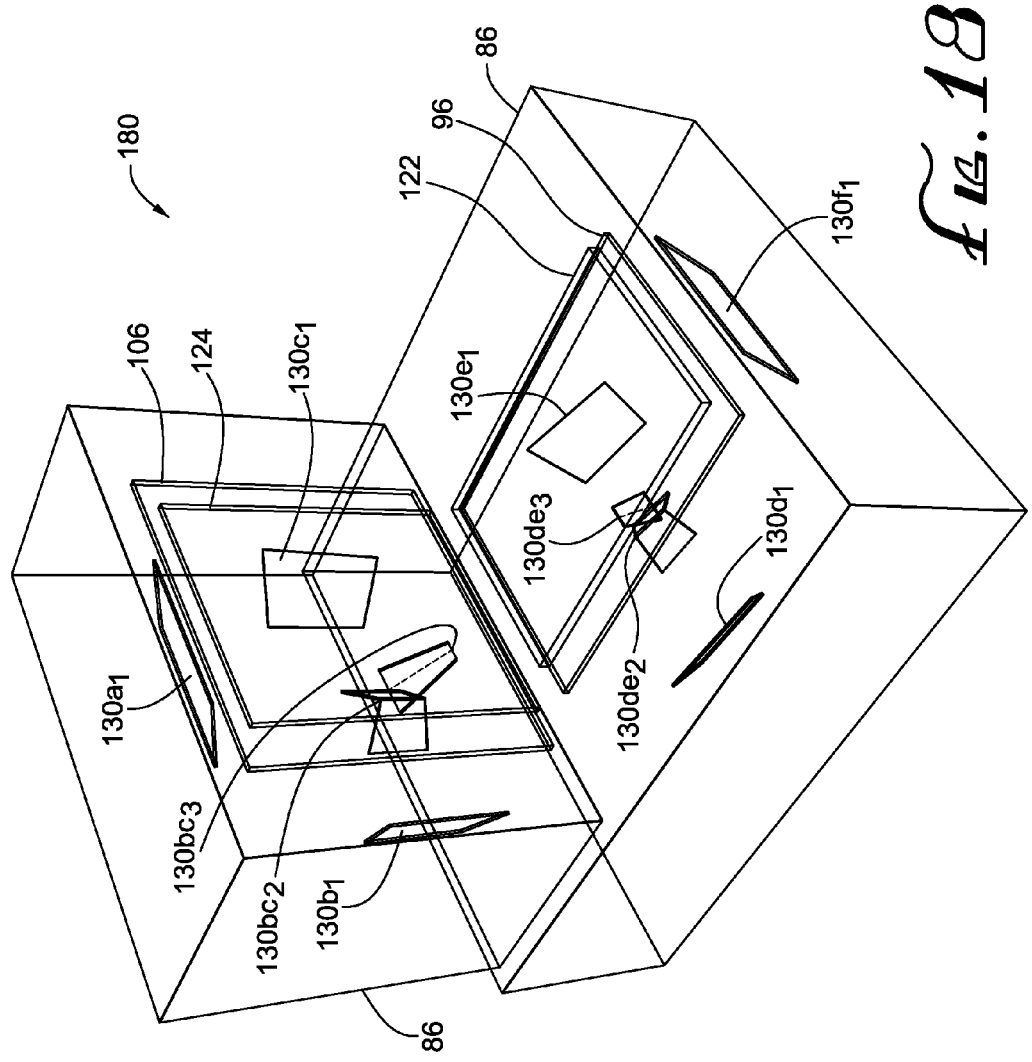
FIG. 18 is an isometric view of a bioptic optical code reader capable of capturing multiple views from different perspectives, according to another embodiment.

B. Single Horizontal and Vertical Imagers, Each With Three-Way Split of Perspectives This subsection describes, by way of example, details of a bioptic imager-based optical code reader 180, according to another embodiment, as depicted in FIG. 18, which is an isometric view. The optical code reader 180 is capable of capturing multiple views of an object from different perspectives. For convenience, the optical code reader 180 will be described to a large extent using similar reference numerals to those used to describe FIGS. 10-15 even though the dimensions of the housing 82, viewing windows, and/or transparent plates may be different; the perspectives, orientations, and/or sizes of the mirrors 130 may be different; the image paths 62 may have different angles; and/or the positioning, orientation, and/or dimensions of other components may be different.

Figure 19:
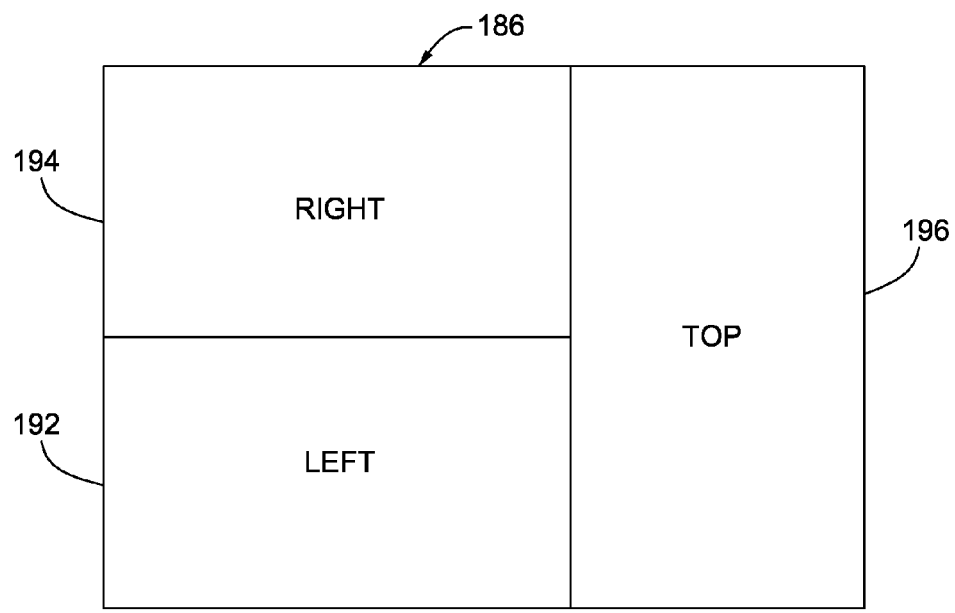
FIG. 19 is a map of an image field of the vertical imager in the optical code reader of FIG. 18, divided into three regions to capture separate views.

The optical code reader 180 has two imagers $60abc$ and $60def$ that each capture three views. The imager $60abc$ captures three views through the upper transparent plate 106 in the vertical housing portion 86. Those three views are from upper top, upper left and upper right perspectives, as described in greater detail below. The imager $60def$ captures three views through the lower transparent plate 96 in the horizontal housing portion 84. Those three views are from lower left, lower right and back perspectives, as described in greater detail below FIG. 19 is a map of an image field 186 of an imager divided into three regions to capture separate views at the imager $60abc$. The image field 186 of the imager $60abc$ may be split into three image field regions, such as a left region 192, a right region 194, and a top region 196, that may be adapted to capture images from the corresponding left upper perspective, right upper perspective, and top upper perspective, respectively. Thus, the mirror component $130b_2$ reflects the image along an image path onto the left region 192 of the image field 186 of the imager $60abc$; the mirror component $130c_2$ reflects the image along an image path onto the right region 164 of the image field 156 of the imager $60abc$; and the mirror component $130a_1$ reflects the image along an image path onto the top region 196 of the image field 186 of the imager $60abc$. One or more of image field variations previously discussed with respect to the image field 156 of FIGS. 11-12 may optionally employed in any combination with respect to the image field 186 except where such combinations are mutually exclusive.

Figure 20:
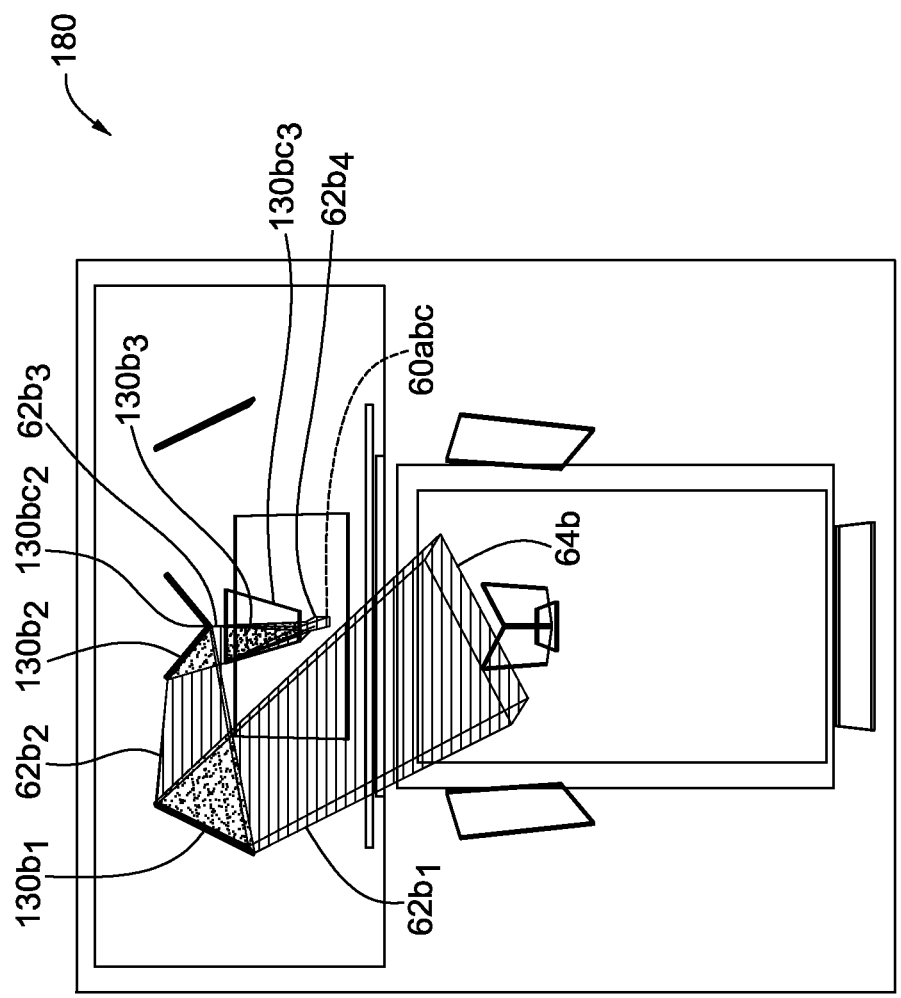
FIG. 20 is a top view of mirrors reflecting a left upper perspective of a view volume along an image path to an imager of the optical code reader of FIG. 18, showing the image path and view volume with shading lines.

FIG. 20 is a top view of a set of mirrors 130b (mirrors 130b$_1$, 130b$_2$ and 130b$_3$) reflecting a left upper perspective of the view volume 64b along the image path 62b to the imager 60abc of the optical code reader 180. With reference to FIG. 20, an image of an object (not shown) in the view volume 64b, captured from the left upper perspective and propagated through the upper transparent plate 106 along the image path segment 62b$_1$, is reflected sideward toward the center of the reader 180 by the primary mirror 130b$_1$ along the image path segment 62b$_2$ to a secondary mirror 130b$_2$ in the mirror structure 130bc$_2$ which reflects the image along the image path segment 62b$_3$ to a tertiary mirror 130b$_3$ in the split mirror 130bc$_3$ which reflects the image downward along the image path segment 62b$_4$ to the imager 60abc. The image path segments 62b$_1$ and 62b$_2$ have respective lengthwise axes that intersect one another at an acute angle.

FIG. 21 is a top view of a set of mirrors 130c (mirrors 130c$_1$, 130c$_2$ and 130c$_3$) reflecting a right upper perspective of the view volume 64c along the image path 62c to the imager 60abc of the optical code reader 180. With reference to FIG. 21, an image of an object (not shown) in the view volume 64c, captured from the right upper perspective and propagated through the upper transparent plate 106 along the image path segment 62c$_1$, is reflected sideward toward the center of the reader 180 by the primary mirror 130c$_1$ along the image path segment 62c$_2$ to a secondary mirror 130c$_2$ in the mirror structure 130bc$_2$ which reflects the image along the image path segment 62c$_3$ to a tertiary mirror 130c$_3$ in a region of the two-region mirror 130bc$_3$ which reflects the image downward along the image path segment 62c$_4$ to the imager 60abc. The image path segments 62c$_1$ and 62c$_2$ have respective lengthwise axes that intersect one another at an acute angle.

Figure 22:
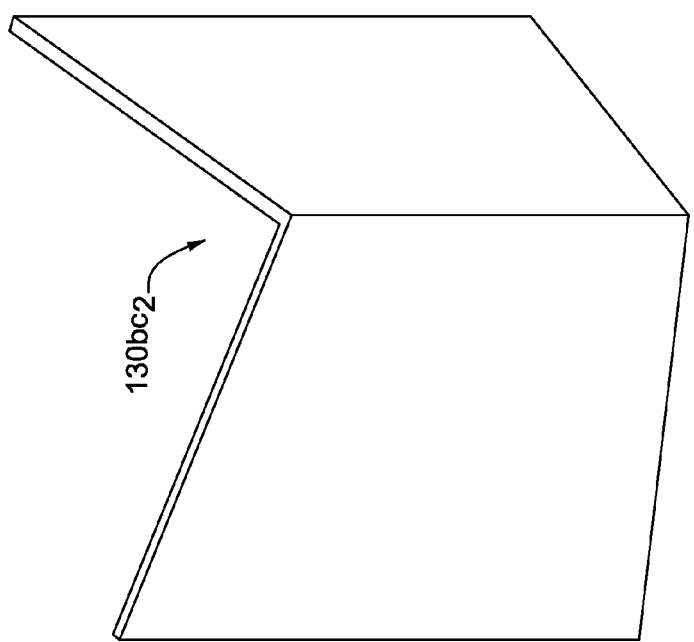
FIG. 22 is an isometric view of a compound mirror structure used with the vertical imager in the optical code reader of FIG. 18.

The mirror 130bc$_2$ is preferably a split or monolithic compound mirror that includes mirror components or surfaces 130b$_2$ and 130c$_2$ of the respective image paths 62b and 62c, and the mirror 130bc$_3$ is preferably a single planar mirror surface that has two sections 130b$_3$ and 130c$_3$ in the respective image paths 62b and 62c. The mirror components 130b$_2$ and 130c$_2$ and 130b$_3$ and 130c$_3$ of the respective split mirrors 130bc$_2$ and 130bc$_2$ may be arranged at different angles with respect to the horizontal or vertical planes (and with respect to each other) to accommodate the orientations of the different image paths 62b and 62c. The compound mirror structure 130bc$_2$ and its mirror components 130b$_2$ and 130c$_2$ may employ any of the variations discussed with respect to any of the other compound mirror structures and parts thereof described herein. FIG. 22 illustrates an example embodiment of the compound mirror structures 130bc$_2$.

Figure 23:
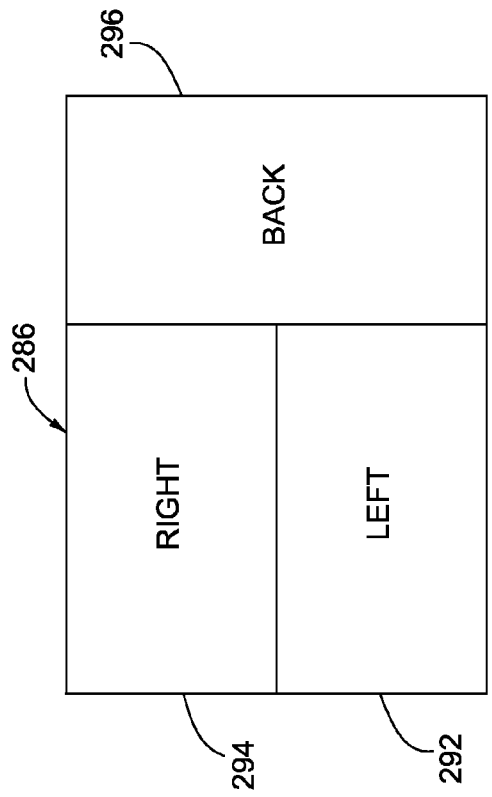
FIG. 23 is a map of an image field of the horizontal imager in the optical code reader of FIG. 18, divided into three regions to capture separate views.

FIG. 23 is a map of an image field 286 of an imager divided into three regions to capture separate views at the imager 60def. The image field 286 of the imager 60def may be split into three image field regions, such as a left region 292, a right region 294, and a top region 296, that may be adapted to capture images from the corresponding left lower perspective, right lower perspective, and back lower perspective, respectively. Thus, the mirror component 130d$_3$ reflects the image along an image path onto the left region 292 of the image field 286 of the imager 60def; the mirror component 130e$_2$ reflects the image along an image path onto the right region 294 of the image field 256; and the mirror component 130f$_1$ reflects the image along an image path onto the top region 296. One or more of image field variations previously discussed with respect to the image field 156 of FIGS. 11-12 may optionally employed in any combination with respect to the image field 286 except where such combinations are mutually exclusive.

FIG. 24 is a front view of a set of mirrors 130d (mirrors 130d$_1$, 130d$_2$ and 130d$_3$) reflecting a left lower perspective of the view volume 64d along the image path 62d to an imager 60def of the optical code reader 180. With reference to FIG. 24, an image of an object (not shown) in the view volume 64d, captured from the left lower perspective and propagated through the lower transparent plate 96 along the image path segment 62d$_1$, is reflected sideward toward the center of the imager 180 by the primary mirror 130d$_1$ along an image path segment 62d$_2$ to a secondary mirror 130d$_2$ in a mirror structure 130de$_2$ which reflects the image along an image path segment 62d$_3$ to a tertiary mirror 130d$_3$ in a mirror structure 130de$_3$ which reflects the image along an image path segment 62d$_4$ to the imager 60def, which may be supported on a PCB (not shown). The imager 60def may be supported on a different PCB than the one that may be used to support the imager 60abc. The image path segments 62d$_1$ and 62d$_2$ have respective lengthwise axes that intersect one another at an acute angle.

FIG. 25 is a front view of a set of mirrors 130e (mirrors 130e$_1$, 130e$_2$ and 130e$_3$) reflecting a right lower perspective of the view volume 64e along an image path 62e to the imager 60def of the optical code reader 180. With reference to FIG. 25, an image of an object (not shown) in the view volume 64e, captured from the right lower perspective and propagated through the lower transparent plate 96 along an image path segment 62e$_1$, is reflected sideward toward the center of the imager 180 by a primary mirror 130e$_1$ along an image path segment 62e$_2$ to the secondary mirror 130e$_2$ in the mirror structure 130de$_2$ which reflects the image along an image path segment 62e$_3$ to the tertiary mirror 130e3 in a mirror structure 130de$_3$ which reflects the image along an image path segment 62e$_4$ to the imager 60def. The image path segments 62e$_1$ and 62e$_2$ have respective lengthwise axes that intersect one another at an acute angle.

Figure 26:
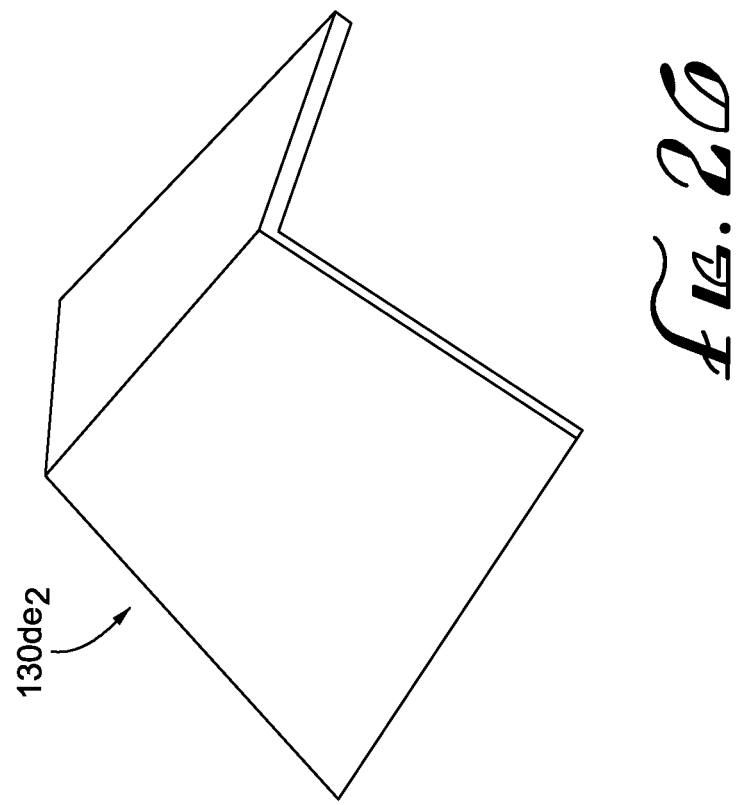
FIG. 26 is an isometric view of a compound mirror structure used with the horizontal imager in the optical code reader of FIG. 18.

The mirror 130de$_2$ is preferably a compound monolithic or split mirror that includes mirror surfaces or components 130d$_2$ and 130e$_2$ of the respective image paths 62d and 62e, and the mirror 130de$_3$ is preferably a single planar mirror that includes mirror components or sections 130d$_3$ and 130e$_3$ in the respective image paths 62d and 62e. The mirror components 130d$_2$ and 130e$_2$ and 130d$_3$ and 130e$_3$ of the respective split mirrors 130de$_2$ and 130de$_2$ may be arranged at different angles with respect to the horizontal or vertical planes (and with respect to each other) to accommodate the orientations of the different image paths 62d and 62e. The compound mirror structures 130de$_2$ and its components 130d$_2$ and 130e$_2$ may employ any of the variations discussed with respect to any of the other compound mirror structures and parts thereof described herein. FIG. 26 illustrates an example embodiment of the compound mirror structures 130de$_2$.

FIG. 27 is an isometric view of multiple image paths 62 and respective multiple perspective view volumes 64 that form a cumulative view volume 64g of the optical code reader 180. An advantage of this embodiment is that two imagers 60 can capture six views from different perspectives. The image paths 62 can be alternatively arranged so that the imagers 60abc and 60def can be located in different housing portions or so that they can be supported by the same PCB. As with the previous embodiments and figures, any previously discussed variations or combinations thereof that are not mutually exclusive may be employed.

C. Single Imager Split for One Vertical and Multiple Horizontal Views

This subsection describes, by way of example, details of another embodiment of a bioptic imager-based optical code reader 210. FIG. 28 is an isometric view of an optical code reader 210 capable of capturing multiple views of an object (not shown) from different perspectives. For convenience, the optical code reader 210 will be described to a large extent using similar reference numerals to those used to describe previously described bioptic imager-based optical code reader, even though the dimensions of the housing, viewing windows, and/or transparent plates may be different; the perspectives, orientations, and/or sizes of the mirrors 130 may be different; the image paths 62 may have different angles; and/or the positioning, orientation, and/or dimensions of other components may be different.

With reference to FIG. 28, the optical code reader 210 has one imager 60$ade$ that capture three views, including at least one view from the upper perspective and one view from the lower perspective.

Figure 29:
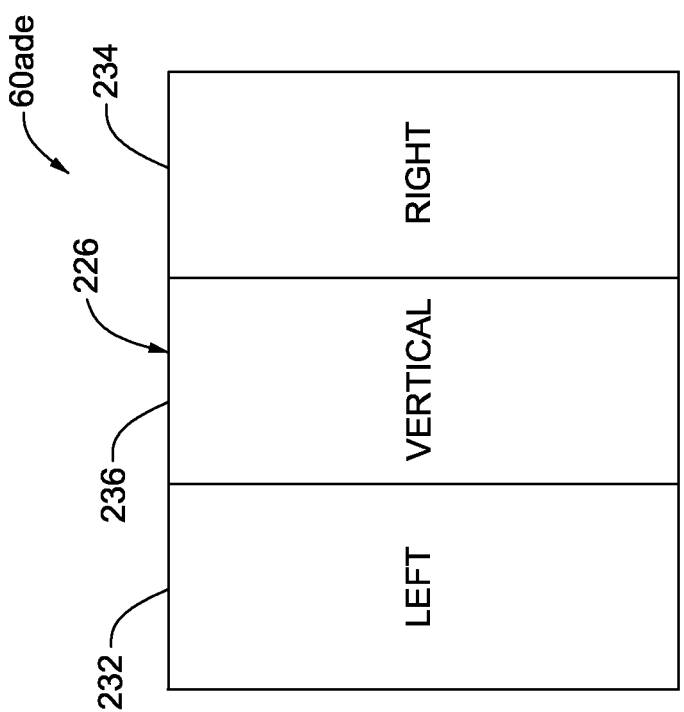
FIG. 29 is a map of an image field of the imager in the optical code reader of FIG. 28, divided into three regions to capture separate views.

FIG. 29 is a map of an image field 226 of the imager 60$ade$ divided into three image field regions such as a left region 232, a right region 234, and a vertical region 236, that may be adapted to capture images from the corresponding left upper perspective, right upper perspective, and top upper perspective, respectively. Thus, with reference to the following FIGS. 30-32 (described in greater detail in subsequent paragraphs), the mirror 130$d_3$ reflects the image along an image path onto the left region 232 of the image field 226 of the imager 60$ade$; the mirror 130$e_3$ reflects the image along an image path onto the right region 234 of the image field 226; and the mirror 130$a_3$ reflects the image along an image path 62$a_4$. One or more of image field variations previously discussed with respect to the image fields 156 or 186 may optionally employed in any combination with respect to the image field 226 except where such combinations are mutually exclusive.

FIG. 30 is a side view of a first set of mirrors 130$a$ (mirrors 130$a_1$, 130$a_2$ and 130$a_3$) reflecting an upper perspective of the view volume 64$a$ along the image path 62$a$ to the imager 60$ade$ of the optical code reader 210. With reference to FIG. 30, an image of the object 20 (not shown) in the view volume 64$a$, captured generally horizontally from the upper perspective and propagated through the upper transparent plate 106 along the image path segment 62$a_1$, is reflected downward by the primary mirror 130$a_1$ along the image path segment 62$a_2$ to a secondary mirror 130$a_2$ which reflects the image horizontally toward the checker side along an image path segment 62$a_3$ to a tertiary mirror 130$a_3$ which reflects the image downward along an image path segment 62$a_4$ through a lens 70$ade$ to the imager 60$ade$, which may be supported on the PCB 140 located in the lower housing portion 84 of the housing.

FIG. 31A is a front view of a set of mirrors 130$d$ (mirrors 130$d_1$, 130$d_2$ and 130$d_3$) reflecting a left lower perspective of the view volume 64$d$ along the image path 62$d$ to the imager 60$ade$ of the optical code reader 210. With reference to FIG. 30, an image of an object (not shown) in the view volume 64$d$, captured from the left lower perspective and propagated through the lower transparent plate 96 along the image path segment 62$d_1$, is reflected by the primary mirror 130$d_1$ along an image path segment 62$d_2$ to a secondary mirror 130$d_2$ which reflects the image along an image path segment 62$d_3$ to a tertiary mirror 130$d_3$ which reflects the image along an image path segment 62$d_4$ through the lens 70 to the imager 60$ade$.

Figure 31B:
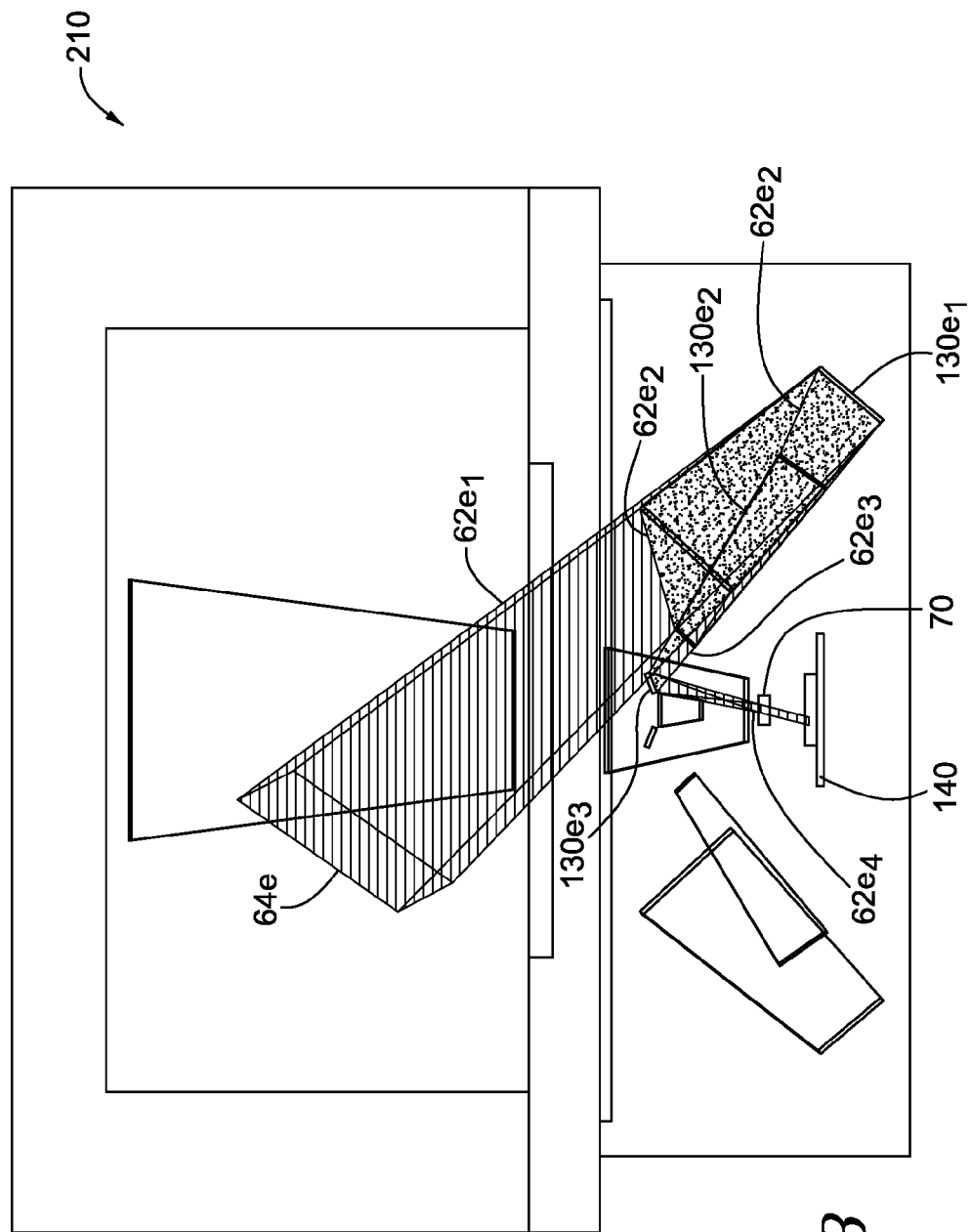
FIG. 31B is a front view of mirrors reflecting a right lower perspective of a view volume along an image path to an imager of the optical code reader of FIG. 28, showing the image path and view volume with shading lines.

FIG. 31B is a front view of a set of mirrors 130$e$ (mirrors 130$e_1$, 130$e_2$ and 130$e_3$) reflecting a right lower perspective of the view volume 64$e$ along an image path 62$e$ to the imager 60$ade$ of the optical code reader 210. With reference to FIG. 31, an image of an object (not shown) in the view volume 64$e$, captured from the right lower perspective and propagated through the lower transparent plate 96 along an image path segment 62$e_1$, is reflected by a primary mirror 130$e_1$ along an image path segment 62$e_2$ to a secondary mirror 130$e_2$ which reflects the image along an image path segment 62$e_3$ to a tertiary mirror 130$e_3$ which reflects the image along an image path segment 62$e_4$ through the lens 70 to the imager 60$ade$.

Figure 32:
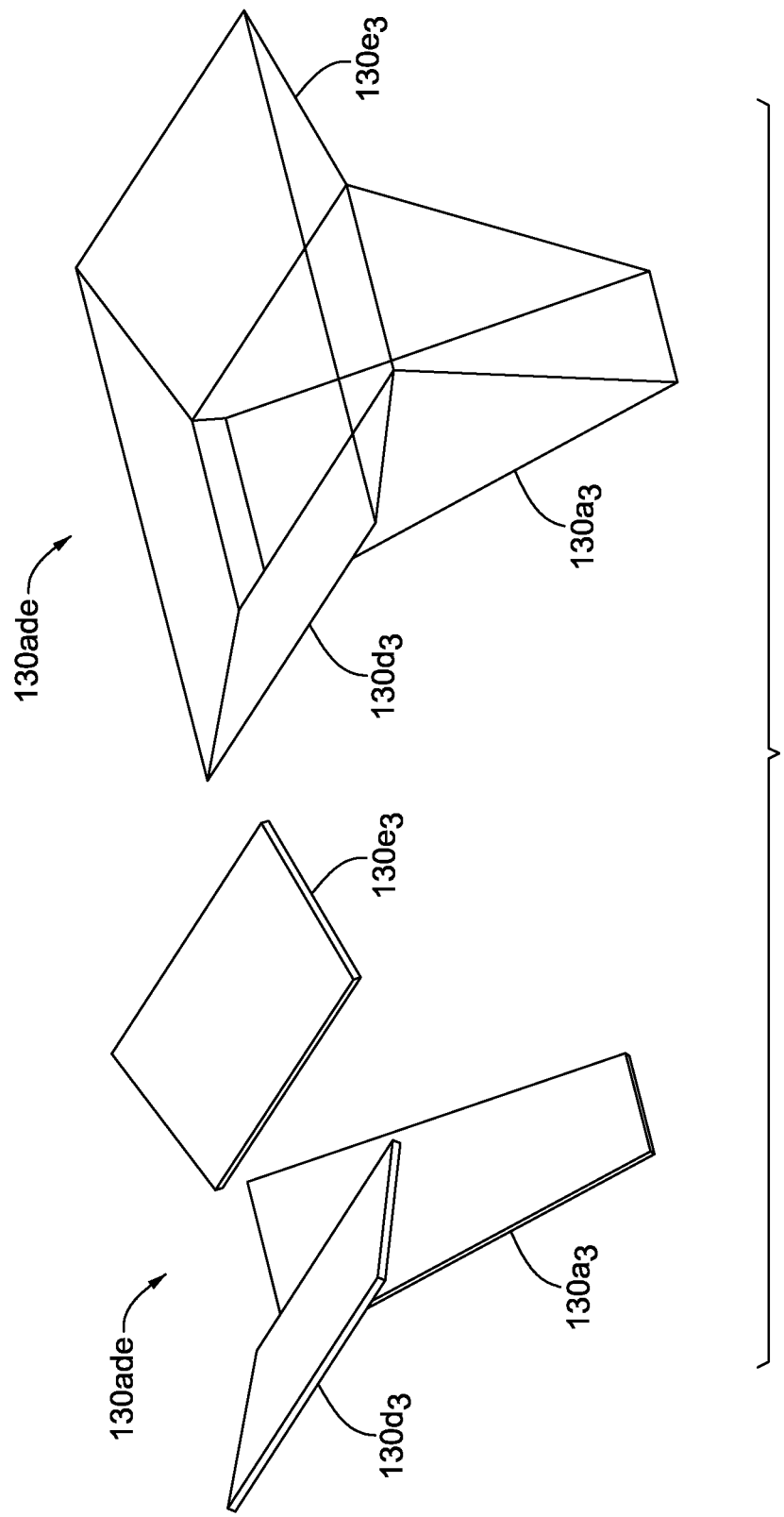
FIG. 32 is an isometric view of a compound mirror structure used in the optical code reader of FIG. 28.

FIG. 32 is an isometric view of a compound monolithic mirror structure 130$ade$ used in the optical code reader of FIG. 28. The compound monolithic mirror structure 130$ade$ has three highly reflective surfaces that constitute mirrors 130$a_3$, 130$d_3$ and 130$e_3$. The mirrors may be separate mirrors attached together in any manner, or preferably they are reflective coatings on a molded plastic piece, as shown on the right.

Figure 33:
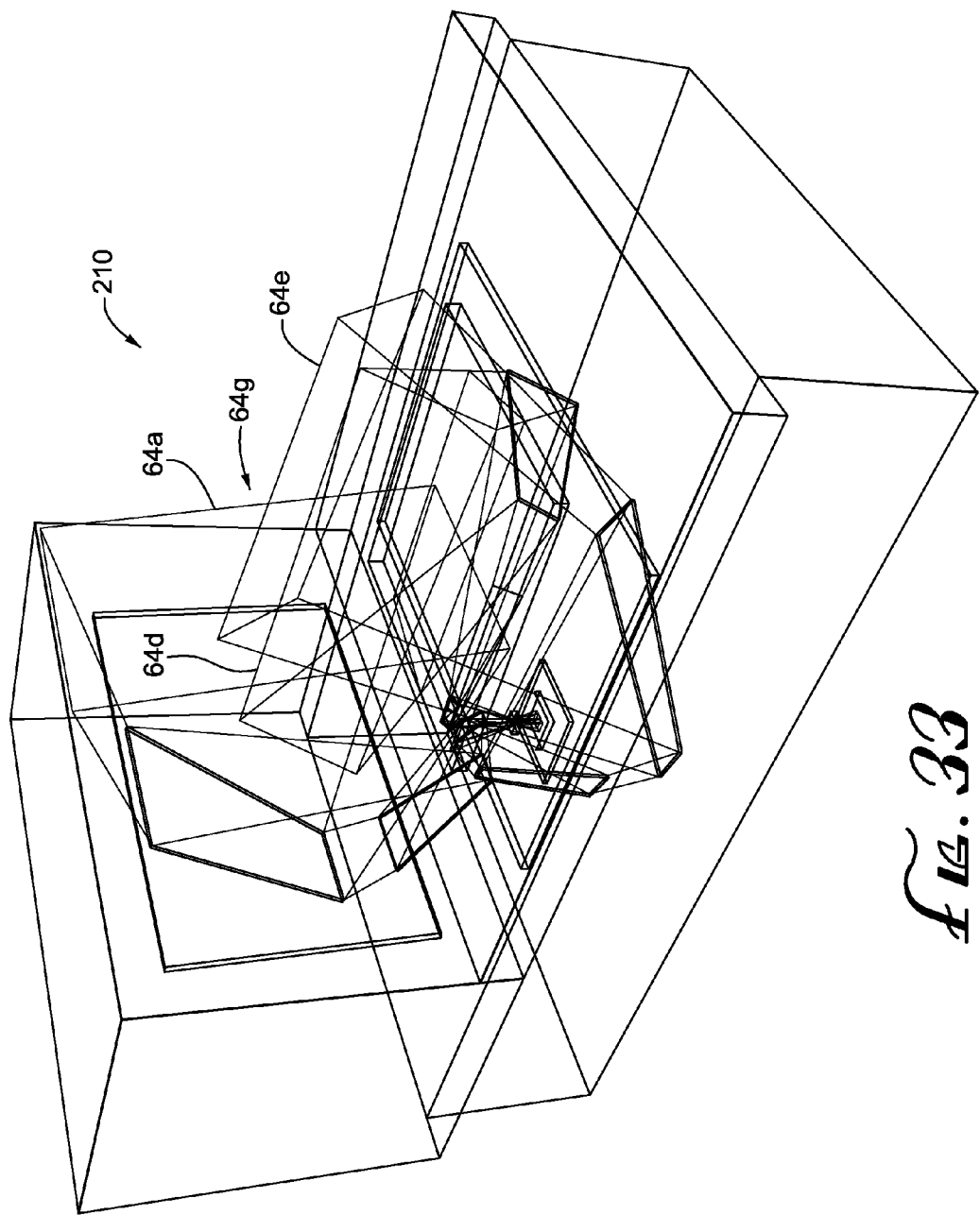
FIG. 33 is an isometric view of multiple image paths and respective multiple perspective view volumes that form a cumulative view volume of the optical code reader of FIG. 28.

FIG. 33 is an isometric view of multiple image paths 62 and respective multiple perspective view volumes 64 that form a cumulative view volume 64$g$ of the optical code reader 210. An advantage of these embodiments is that one imager 60 can capture either three or four views, with at least one view from the upper perspective and at least one view from the lower perspective. As with the previous embodiments and figures, any previously discussed variations or combinations thereof that are not mutually exclusive may be employed.

The preceding FIGS. 28-33 depict an embodiment of the optical code reader 210 that does not facilitate the capture of an image from the back side of an object 20. However, some embodiments of the optical code reader 210 can be adapted to capture back side images where the imager 60$ade$ is split into four image field regions and is thus labeled imager 60$adef$, as in FIG. 34, which is an isometric view of one example of an alternative embodiment of the optical code reader 210 modified to capture a back side image on the imager 60$adef$ via mirrors 130$f$, which comprise individual mirrors 130$f_1$ and 130$f_2$ in this example embodiment.

Figure 35:
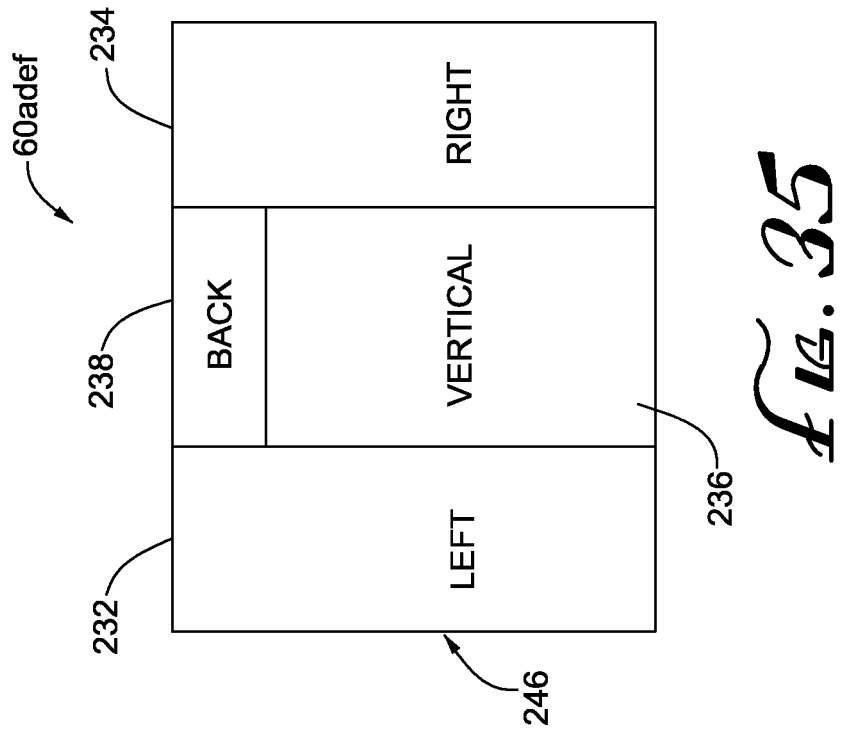
FIG. 35 is a map of an image field of the imager of FIG. 34, divided into four regions to capture separate views.

FIG. 35 is a diagram of an image field 246 of the imager 60$adef$ divided into four image field regions to capture separate views. The image field 246 may be in many respects similar to the image field 226; however, a portion of the image field region 236 of the image field 226 is employed to capture the back lower perspective. Thus, the mirror 130$f_2$ reflects the image along an image path onto a back region 238 of the image field 246 of the imager 60$adef$. One or more of image field variations previously discussed with respect to the image fields 156, 186, or 286 may optionally employed in any combination with respect to the image field 246 except where such combinations are mutually exclusive.

FIG. 36 is a side view of mirrors 130$f$ reflecting a back lower perspective of a view volume 64$f$ along an image path 62$f$ to imager 60$adef$ of the optical code reader 210. An image of an object (not shown) in the view volume 64$f$, captured from the back lower perspective and propagated through the lower transparent plate 96 along an image path segment 62$f_1$, is reflected by a mirror 130$f_1$ along an image path segment 62$f_2$ to the mirror 130$f_2$ which reflects the image along an image path segment 62$f_3$ through the lens 70 to the imager 60$adef$. The perspective associated with the image path 62$f$ in FIG. 36 may be oriented similarly to or differently from the back lower perspective associated with the image path 62$f$ in FIGS. 17-18.

Figure 34:
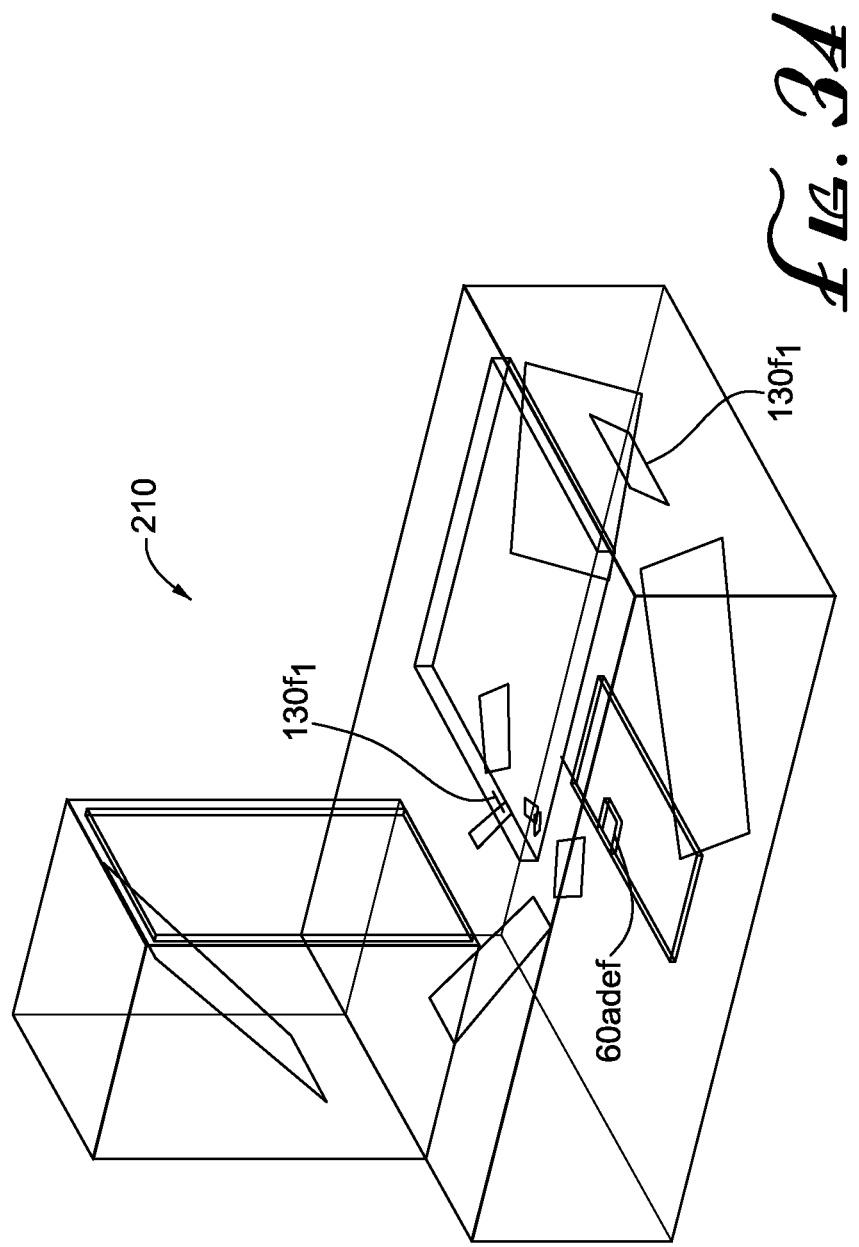
FIG. 34 is an isometric view of an optical code reader capable of capturing views from different perspectives, according to an alternative embodiments.
Figure 37:
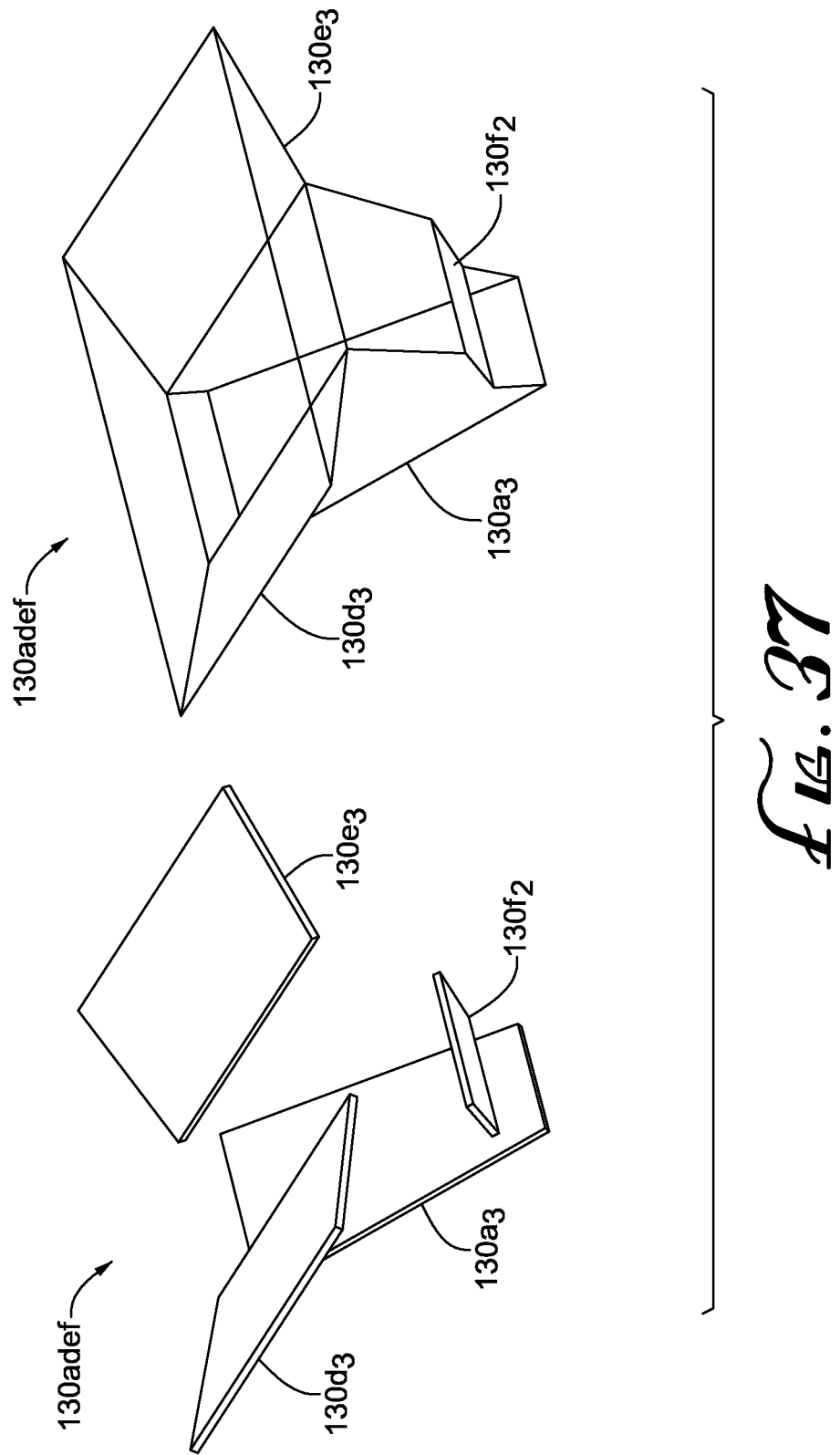
FIG. 37 is an isometric view of a compound mirror structure in the optical code reader of FIG. 34.

FIG. 37 is an isometric view of a compound mirror structure in the optical code reader of FIG. 34. The compound monolithic mirror structure 130$adef$ is like the compound monolithic mirror structure 130$ade$ but additionally comprises a fourth highly reflective surfaces 130$f_2$. The mirrors may be separate mirrors attached together in any manner, or preferably they are reflective coatings on a molded plastic piece, as shown on the right.

IV. Tunnel Reader

Figure 38:
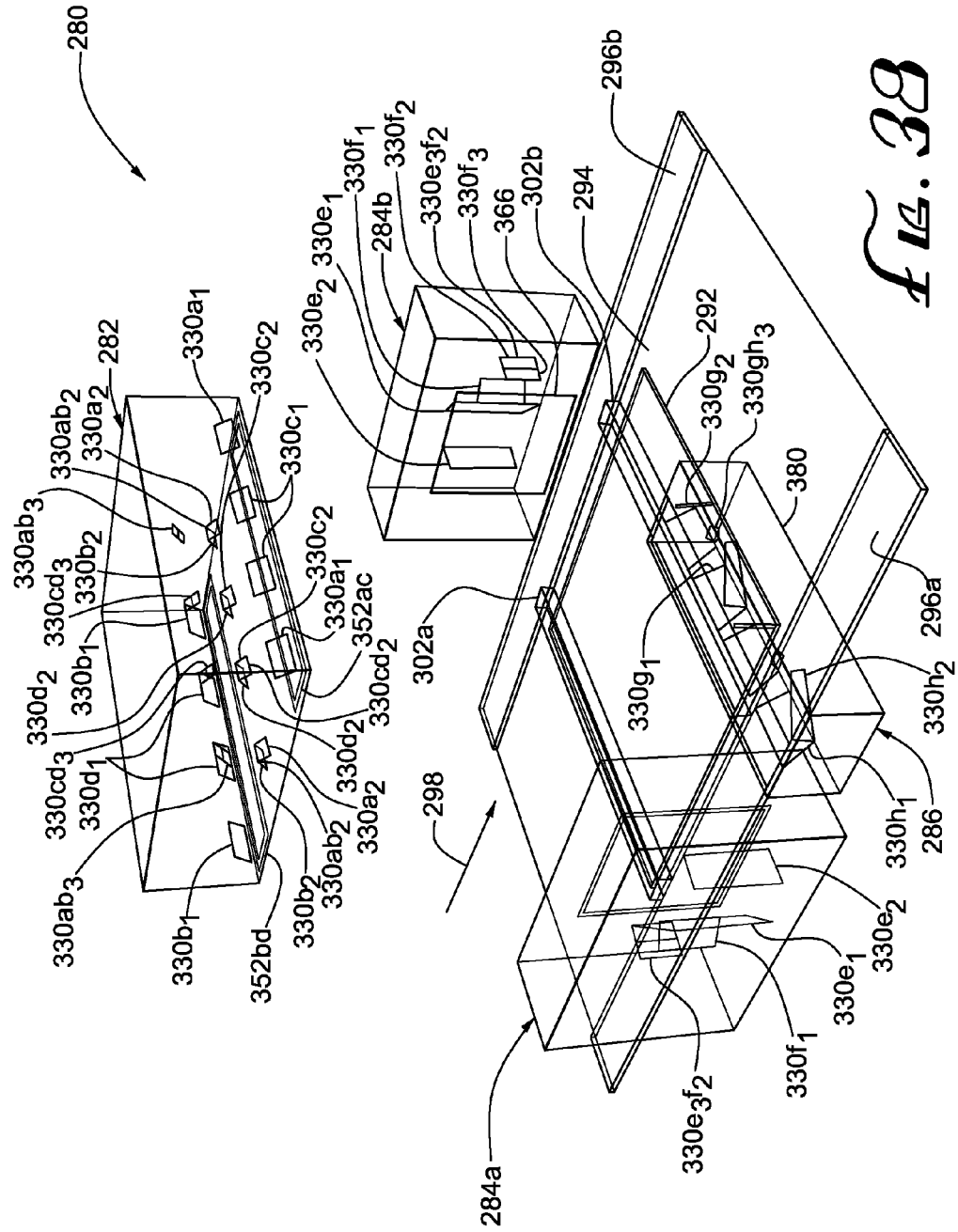
FIG. 38 is an isometric view of a tunnel embodiment of an optical code reader capable of capturing multiple views from different perspectives.

This subsection describes, by way of example, details of a tunnel type of imager-based optical code reader 280. FIG. 38 is an isometric view of a tunnel embodiment of the optical code reader 280 capable of capturing multiple views of an object 20 (not shown) from different perspectives as it passes through a composite view volume. The optical code reader 280 includes a top imaging unit 282, two side imaging units 284a and 284b (generically or collectively, side imaging unit 284), and a bottom imaging unit 286. Each of the imaging units includes one or more sets of imagers having respective field of views and being positioned to capture different perspective views of an object in the composite view volume, which includes all of the individual view volumes formed from respective perspectives. The optical code reader 280 may provide improved performance in terms of FPRR regardless of the placement or orientation of an object to be read. Many of the imagers are placed along folded image paths to reduce the size of the optical code reader 280 with respect to an optical code reader using direct-perspective imagers that would need to be relatively far away from the object to produce a similarly sized composite view volume, thereby requiring such a direct-perspective optical code reader to have an optical reader housing of an impractically large design.

Figure 39:
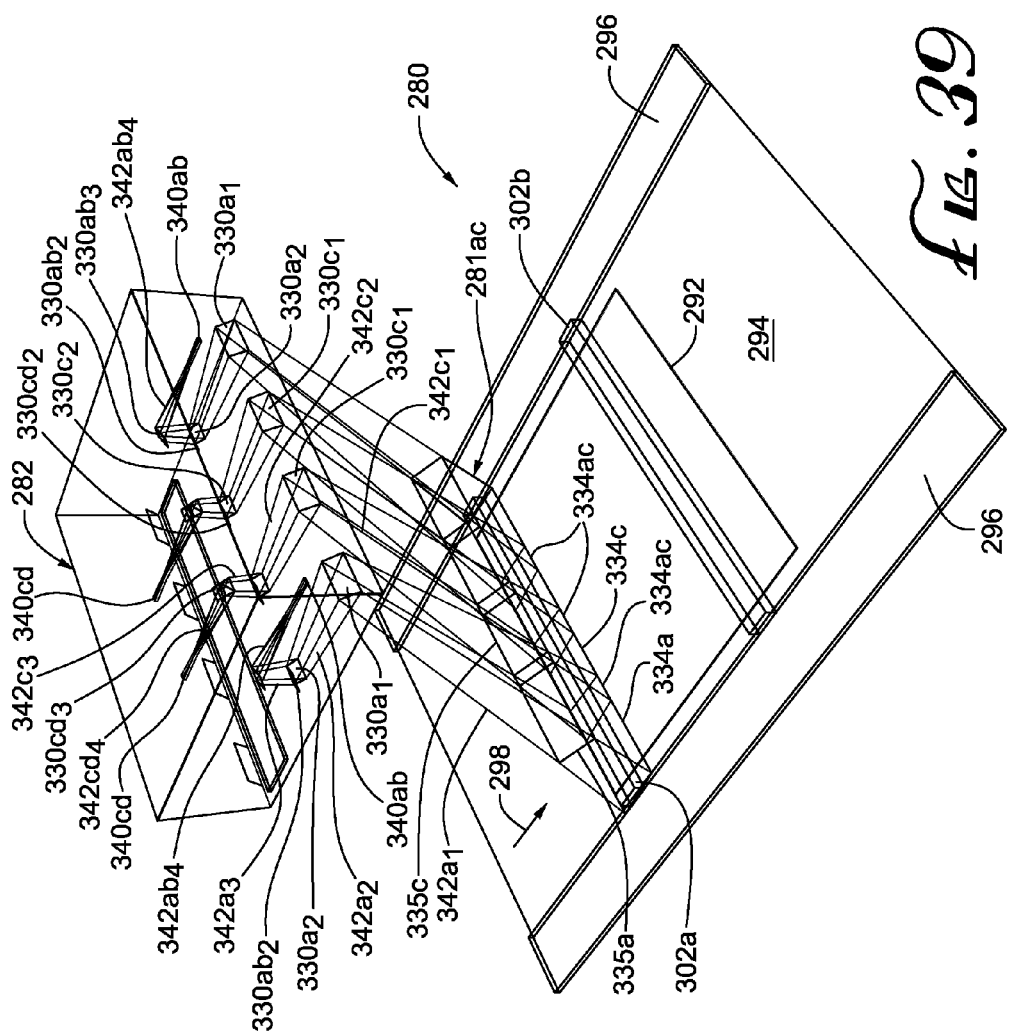
FIG. 39 is an isometric view of mirrors reflecting top leading perspectives of view volumes along image paths to top imagers of the optical code reader of FIG. 38.
Figure 40:
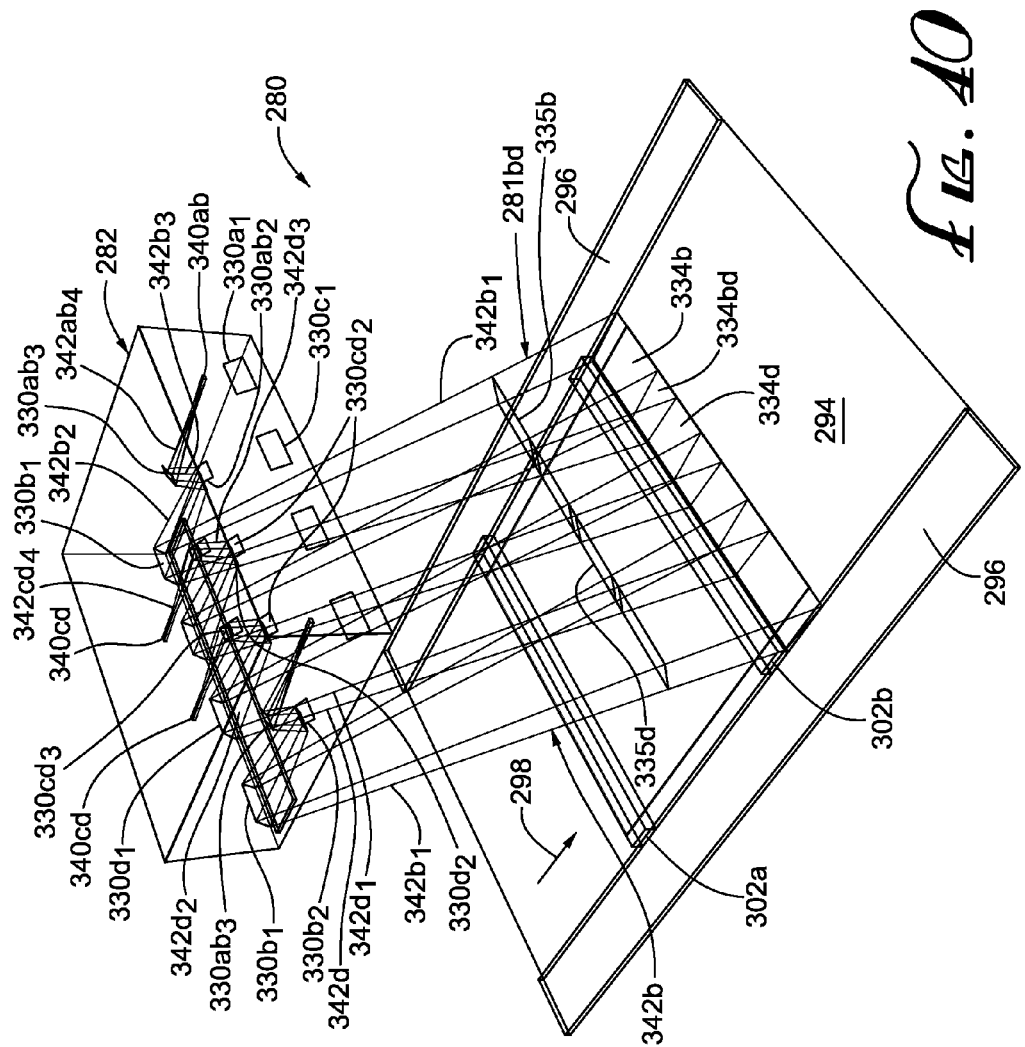
FIG. 40 is an isometric view of mirrors reflecting top trailing perspectives of view volumes along image paths to top imagers of the optical code reader of FIG. 38.
Figure 41:
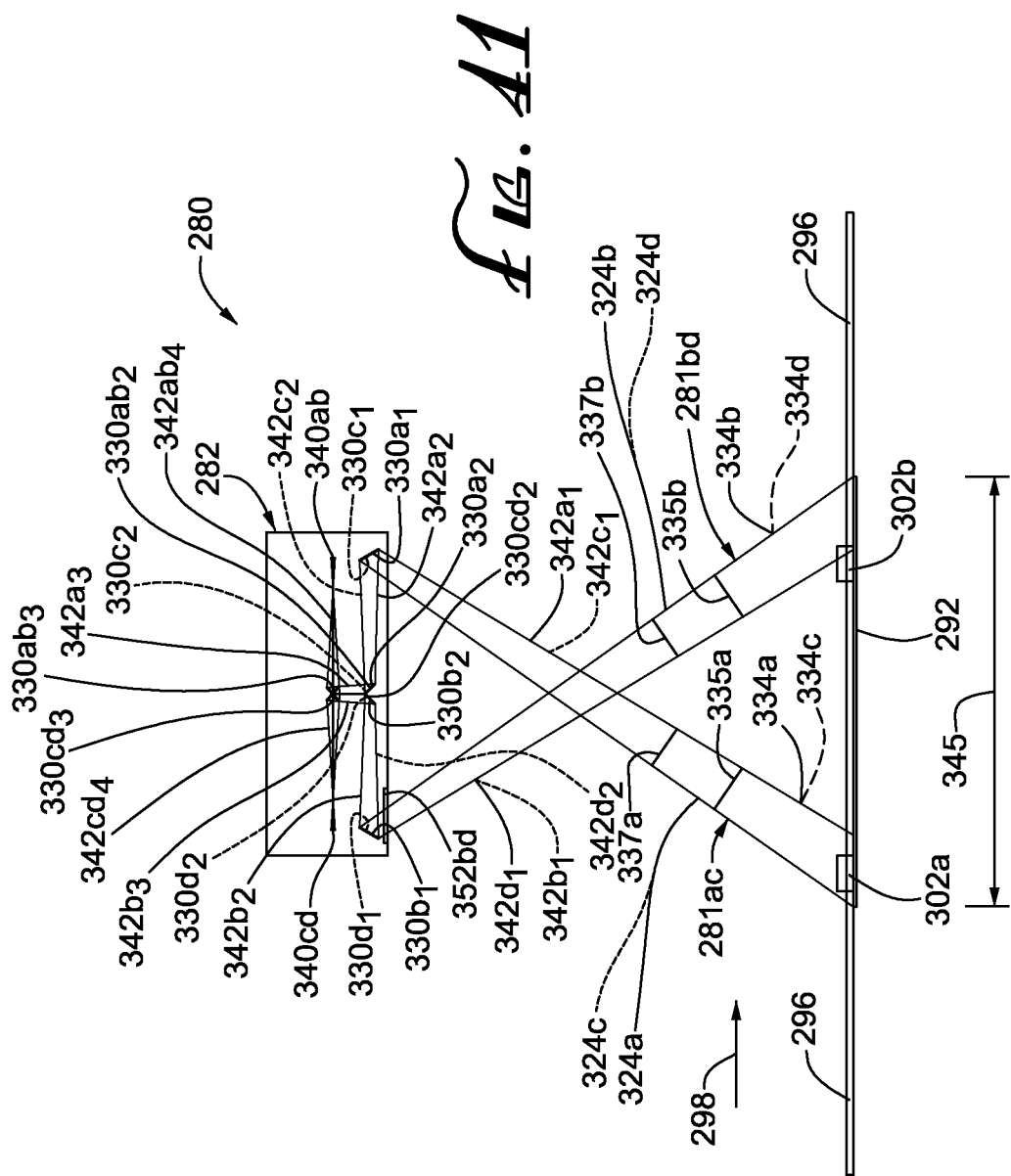
FIG. 41 is a side view of mirrors reflecting top leading and trailing perspectives of view volumes along image paths to top imagers of the optical code reader of FIG. 38.

FIGS. 39 and 40 are isometric views of the top imaging unit 282 showing respective leading and trailing view volumes, and FIG. 41 is a side view of the top imaging unit 282. The top imaging unit 282 may contain one or more imagers 340ab and corresponding image paths 342a and 342b. The top imaging unit 282 may also contain one or more imagers 340cd and corresponding image paths 342c and 342d. The top imagers 340ab and 340cd are oriented in opposite directions. The top imagers 340ab and 340cd may be used in any numerical combination. The top imagers 340ab and 340cd may be positioned in an alternating arrangement, or a set of two or more of either of the top imagers 340ab or 340cd may be located next to each other so that adjacent imagers 340 can be supported by a common circuit board. In one embodiment (depicted in FIG. 39), two top imagers 340cd are adjacent and bilaterally central while two top imagers 340ab are toward opposite ends of the top imaging unit 282. In such embodiment, the imagers 340cd can be supported by a common circuit board.

With reference to FIG. 39-41, an image of an object (not shown) in the view volume 334a, captured from the top perspective and propagated through a window or a top transparent plate 352ac along a first image path segment $342a_1$, is reflected by a primary mirror $330a_1$ along a second image path segment $342a_2$ to a secondary mirror component $330a_2$ of a compound mirror structure $330ab_2$ which reflects the image along a third image path segment $342a_3$ to a tertiary two-region mirror $330ab_3$ which reflects the image along a fourth image path segment $342ab_4$ to the imager 340ab that may be supported on or integrated with a PCB (not shown) located in a housing of the top imaging unit 282.

On the other hand, an image of an object (not shown) in the view volume 334c, captured from the top perspective and propagated through a window or the top transparent plate 352ac along a first image path segment $342c_1$, is reflected by a primary mirror $330c_1$ along a second image path segment $342c_2$ to a secondary mirror component $330c_2$ of a compound mirror structure $330cd_2$ which reflects the image along a third image path segment $342c_3$ to a tertiary two-region mirror $330cd_3$ which reflects the image along a fourth image path segment $342cd_4$ to the imager 340cd that may be supported on or integrated with a PCB located in a housing of the top imaging unit 282.

In some embodiments, the components along image paths 342a and 342c may be adapted and/or positioned to avoid overlap of view volumes 334a and 334c. However, in some embodiments, the components along image paths 342a and 342c may be adapted or positioned to intentionally overlap the view volumes 334a and 334c so that they form overlapping view volume regions 334ac. The longest dimension of the overlapping view volume regions 334ac may be chosen to be wide enough to fit the widest optical code intended for viewing so that stitching together portions of an optical code can be either avoided or facilitated.

The compound mirror structure $330ab_2$ may be a split mirror or monolithic structure formed by molding, bending, and/or welding a single substrate, such as a metal or plastic, and then applying a reflective coating. Any desired nonreflective regions could be covered in advance by masking or subsequently covered by a nonreflective coating.

Alternatively, the compound mirror structure $330ab_2$ may be assembled from separate mirrored components $330a_2$ and $330b_2$ that are subsequently connected. In some alternative embodiments, the mirror components $330a_2$ and $330b_2$ may be employed as two unconnected mirrors 330. In some embodiments, the mirror components $330a_2$ and $330b_2$ direct the respective image paths 342 to separate imagers 340 that may be closely spaced. In some embodiments, the mirror components $330a_2$, and $330b_2$ may have nonreflective regions in proximity to their intersections. In some embodiments, some image processing advantages may be gained by not capturing images reflected from near the intersection of the mirror components $330a_2$ and $330b_2$ of the compound mirror structure $330ab_2$. Any of the variations and combinations concerning split mirrors $330ab_2$ can be applied to the two-region mirror $330ab_3$. In particular, the split mirrors $330ab_3$ may benefit from having nonreflective regions in proximity to the intersections of mirror components $330a_3$ and $330b_3$ which, if not well-aligned, might otherwise reflect a portion of a leading view to a trailing view image field region or reflect a portion of a trailing view to a leading view image field region.

Moreover, each mirror $330ab_2$ is divided into a mirror component $330a_2$, which reflects images captured from the top leading perspective, and a mirror component $330b_2$, which reflects images captured from the top trailing perspective. The mirror components $330a_2$ and $330b_2$ are angled with respect to each other. Similarly, each two-region mirror $330ab_3$ is divided into a mirror component or region $330a_3$, which reflects images captured from the top leading perspective, and a mirror component or region $330b_3$, which reflects images captured from the top trailing perspective. The mirror components $330a_3$ and $330b_3$ may also be angled with respect to each other or may lie in the same plane. If in they are in the same plane, the mirrors $330a_3$ and $330b_3$ are preferably a single mirror 330.

With reference again to FIG. 39, the a leading-view imaging subunit may facilitate capture of images of the leading side as well as the top side of an object (not shown). The top imagers 340ab and 340cd may be oriented so that the horizontal aspects of their perspectives have an axis that runs generally parallel to the direction of travel 298. Nevertheless, the top imagers 340ab and 340cd may facilitate capture of images of either left or right sides of the object positioned such that its edges are not parallel or orthogonal to the direction of travel 298. Alternatively, the top imagers 340ab and 340cd may be oriented so that the horizontal aspects of their perspectives have an axis that is angled with respect to the direction of travel 298. In an angled orientation, the top imagers 340ab and 340cd may also facilitate the capture of images of either lateral side of the object positioned such that its edges are either parallel to or orthogonal to the direction of travel 298.

With reference to FIG. 40 the top trailing-view imaging subunit may facilitate capture of images of the trailing side as well as the top side of an object (not shown). As with the top leading view subunit, the top imagers 340$ab$ and 340$cd$ may be oriented so that the horizontal aspects of their perspectives have an axis that runs generally parallel to the direction of travel 298, or the top imagers 340$ab$ and 340$cd$ may be oriented so that the horizontal aspects of their perspectives have an axis that is angled with respect to the direction of travel 298.

In some embodiments, the top leading-view and trailing-view imaging subunits may be identical except for their position and perspective with respect to the direction of travel 298. Alternatively, they may have identical components but different altitudes with respect to the conveyor belt, or their perspectives may have different angles with respect to the conveyor belt (either with respect to the horizontal and/or vertical planes of the direction of travel 298). The top leading-view and trailing-view imaging subunits may remain coupled to the same imagers 340 through the use of additional mirrors 330 in one of the image paths 342 to accommodate differences; or, the imagers 340, split mirrors, or other components may be decoupled. Furthermore, the top leading-view and trailing-view imaging subunits 283 may employ different components (such as different types of imagers, mirror shapes, or mirror coatings) regardless of whether or not their positions and orientations are symmetrical with respect to the conveyor belt.

With reference again to FIGS. 39-41, an image of an object (not shown) in the view volume 334$b$, captured from the top perspective and propagated through a window or a top transparent plate 352$bd$ along a first image path segment 342$b_1$, is reflected by a primary mirror 330$b_1$ along a second image path segment 342$b_2$ to a secondary mirror component 330$b_2$ of a compound mirror structure 330$ab_2$ which reflects the image along a third image path segment 342$b_3$ to a tertiary two-region mirror 330$ab_3$ which reflects the image along a fourth image path segment 342$ab_4$ to the imager 340$ab$.

On the other hand, an image of an object (not shown) in the view volume 334$d$, captured from the top perspective and propagated through a window or a top transparent plate 352$bd$ along a first image path segment 342$d_1$, is reflected by a primary mirror 330$d_1$ along a second image path segment 342$d_2$ to a secondary mirror component 330$d_2$ of a compound mirror structure 330$cd_2$ which reflects the image along a third image path segment 342$d_3$ to a tertiary mirror region of a two-region mirror 330$cd_3$ which reflects the image along a fourth image path segment 342$cd_4$ to the imager 340$cd$. The prior variations and combinations concerning compound mirror structure 330$ab_2$ and 330$ab_3$ may apply to the two-region mirrors 330$cd_2$ and 330$cd_3$.

Moreover, each mirror 330$cd_2$ is divided into a mirror component 330$c_2$, which reflects images captured from the top leading perspective, and a mirror component 330$d_2$, which reflects images captured from the top trailing perspective. The mirror components 330$c_2$ and 330$d_2$ are angled with respect to each other. The compound mirror structure 330$ab_2$ and 330$cd_2$ may be identical except that they are placed in different image paths. In some embodiment, the split mirrors 330$ab_2$ and 330$cd_2$ may all be formed on or supported by a common substrate. Similarly, each two-region mirror 330$cd_3$ is divided into a mirror component or region 330$c_3$, which reflects images captured from the top leading perspective, and a mirror component or region 330$d_3$, which reflects images captured from the top trailing perspective. The mirror components 330$c_3$ and 330$d_3$ may also angled with respect to each other or may lie in the same plane. The mirrors 330$ab_3$ and 330$cd_3$ may be identical except that they are placed in different image paths.

In some embodiments, the components along image paths 342$b$ and 342$d$ may be adapted or positioned to avoid overlap of view volumes 334$b$ and 334$d$. However, in some embodiments, the components along image paths 342$b$ and 342$d$ may be adapted and/or positioned to intentionally overlap of view volumes 334$b$ and 334$d$ so that they form overlapping view volume regions 334$bd$. The longest dimension of the overlapping view volume regions 334$bd$ may be chosen to be wide enough to fit the widest optical code intended for viewing so that stitching together portions of an optical code can be either avoided or facilitated.

Figure 42:
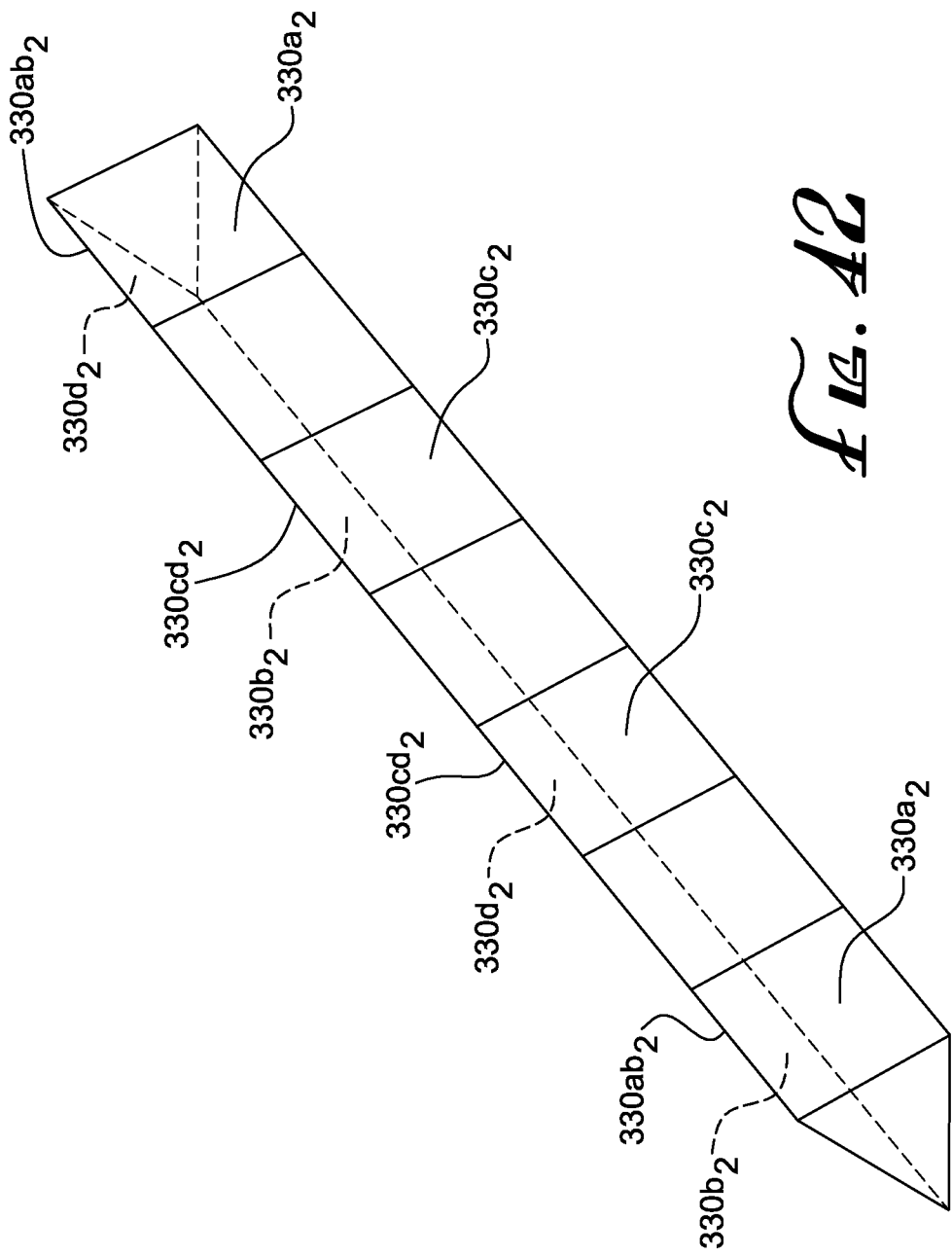
FIG. 42 is an isometric view of a compound mirror structure in the top unit of the optical code reader of FIG. 38.

In some embodiment, the mirrors 330$a_1$ and 330$c_1$, which are typically coplanar, may all be formed on or supported by a common substrate or monolithic structure. Likewise, the mirrors 330$_b$1 and 330$_d$1, which are typically coplanar, may all be formed on or supported by a common substrate or monolithic structure. Also, the mirrors 330$ab_3$ and 330$cd_3$ may all be formed on or supported by a common substrate or monolithic structure FIG. 42 shows a compound mirror structure for the four splits mirrors 330$ab_2$ (far left and far right) and 330$cd_2$ (two center positions). The compound mirror structure may be formed of a core piece, such as molded plastic, to which reflective coatings are applied to form the highly reflective mirror surfaces 330$a_2$, 330$b_2$, 330$c_2$ and 330$d_2$. Alternatively, the compound mirror structure may be formed by joining together two planar pieces along the center ridge and applying reflective or nonreflective coatings to formed the highly reflective mirror surfaces 330$a_2$, 330$b_2$, 330$c_2$ and 330$d_2$.

Figure 43:
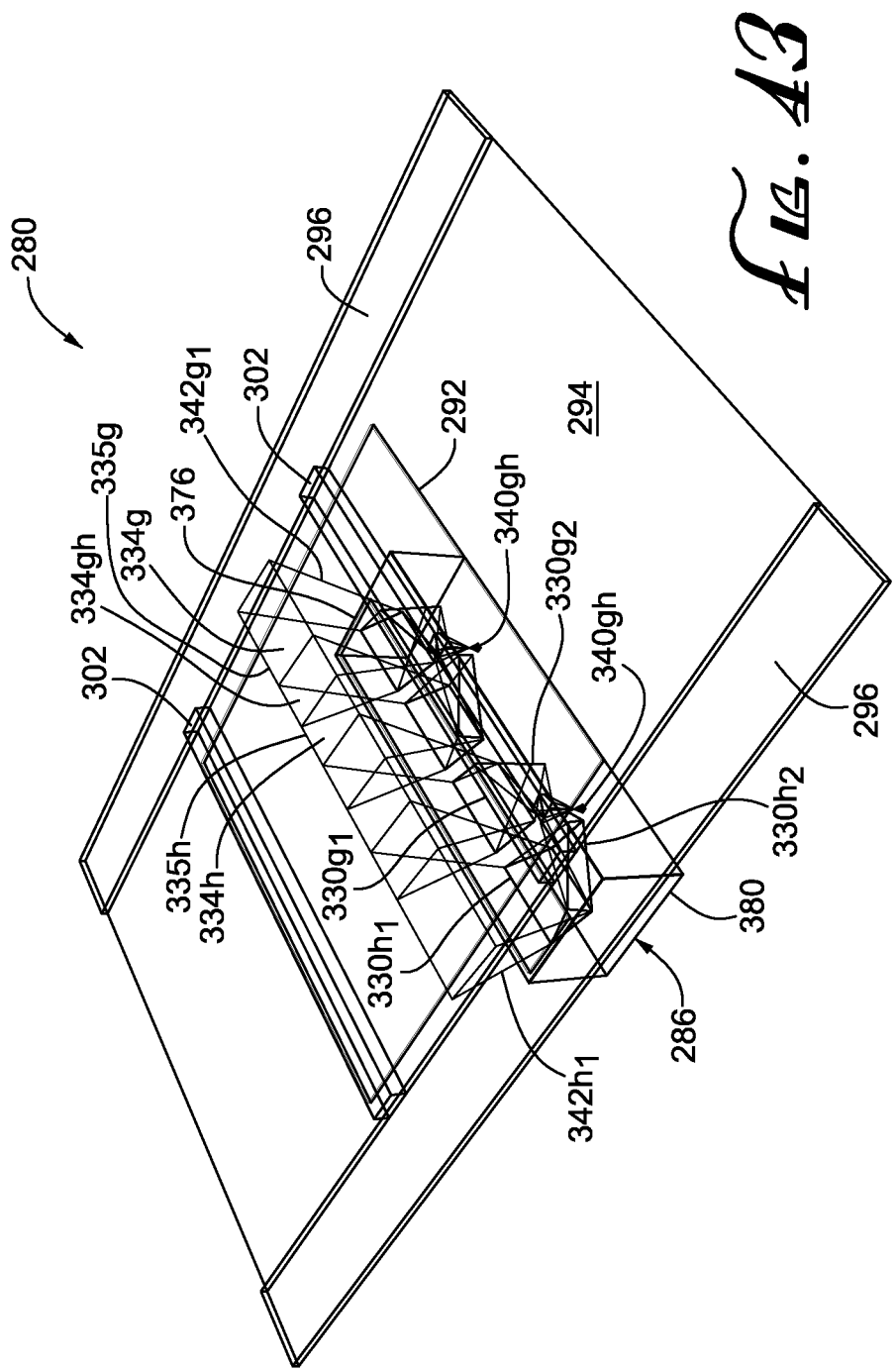
FIG. 43 is an isometric view of mirrors reflecting bottom perspectives of view volumes along image paths to bottom imagers of the optical code reader of FIG. 38.
Figure 44:
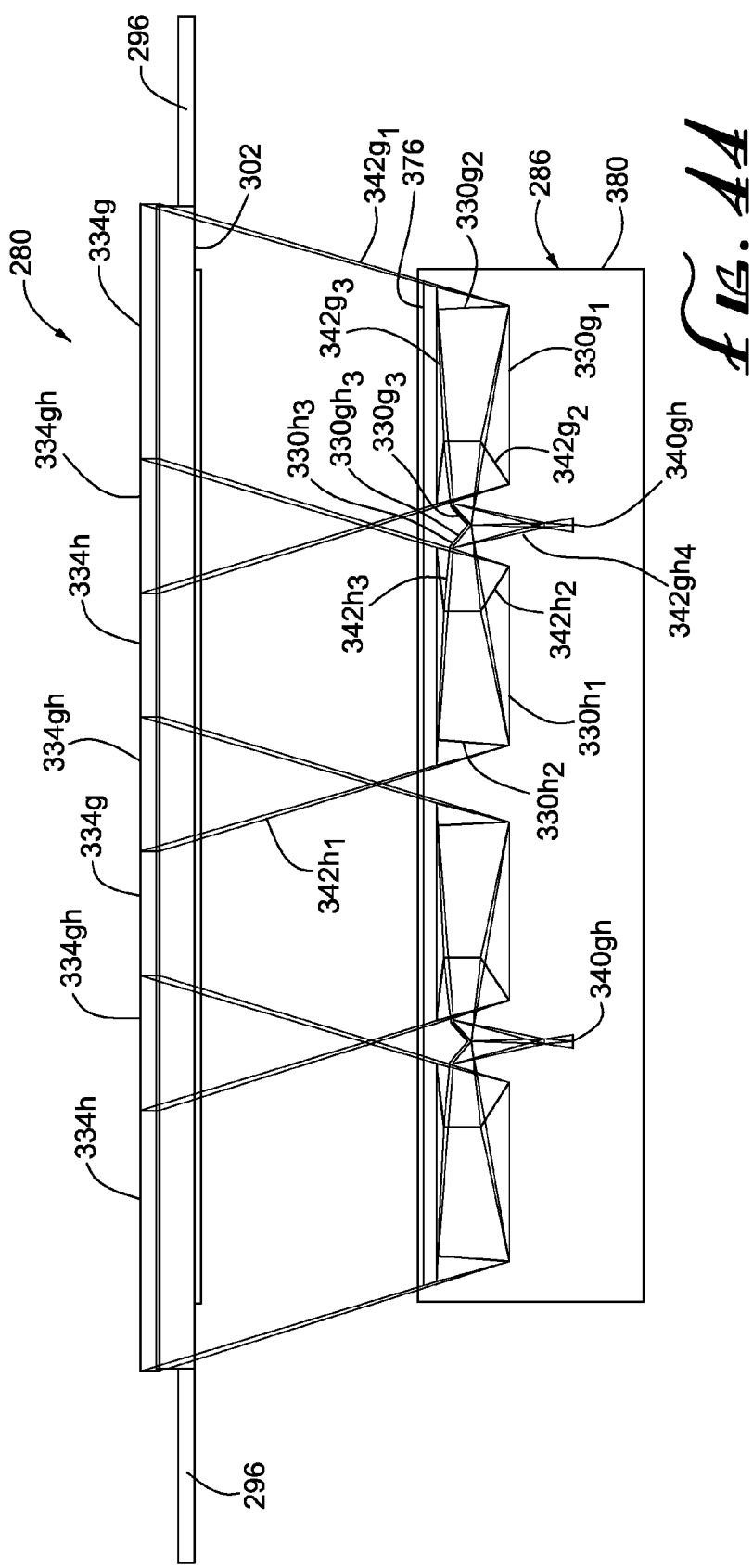
FIG. 44 is a front view of mirrors reflecting bottom perspectives of view volumes along image paths to bottom imagers of the optical code reader of FIG. 38.

FIGS. 43 and 44 are respective isometric and front views of mirrors 330$g$ and 330$h$ reflecting respective bottom perspectives of view volumes 334$g$ and 334$h$ along respective image paths 342$g$ and 342$h$ to an imager 340$gh$ of the optical code reader 280. It is noted that only portions of the view volumes 334$g$ and 334$h$ are shown. In particular, the view volumes 334$g$ and 334$h$ are truncated at the respective focal planes 335$g$ and 335$h$ so the respective distal range planes are not shown.

With reference to FIGS. 43 and 44, an image of an object in the view volume 334$g$, captured from the bottom perspective and propagated through a bottom transparent plate 376 along a first image path segment 342$g_1$, is reflected by a primary mirror 330$g_1$ along a second image path segment 342$g_2$ to a secondary mirror 330$g_2$ which reflects the image along a third image path segment 342$g_3$ to a tertiary mirror component 330$g_3$ of a compound mirror structure 330$gh_3$ which reflects the image along a fourth image path segment 342$gh_4$ to the imager 340$gh$ located in a bottom housing 380 of the bottom imaging unit 286.

On the other hand, an image of an object in the view volume 334$h$, captured from the bottom perspective and propagated through the bottom transparent plate 376 along a first image path segment 342$h_1$, is reflected by a primary mirror 330$h_1$ along a second image path segment 342$h_2$ to a secondary mirror 330$h_2$ which reflects the image along a third image path segment 342$h_3$ to a tertiary mirror component 330$h_3$ of a compound mirror structure 330$gh_3$ which reflects the image along a fourth image path segment 342$gh_4$ to the imager 340$gh$.

The imagers 340$gh$ of the imaging units 286 may each capture images from view volumes 334$g$ and 334$h$ on respective different regions of a split imaging field. The prior variations and combinations concerning split imaging fields may apply to the imagers 340$gh$ except where such variations or combinations are mutually exclusive. In some embodiments, the components along image paths 342g and 342h may be adapted or positioned to avoid overlap of view volumes 334g and 334h. However, in some embodiments, the components along image paths 342g and 342h may be adapted or positioned to intentionally overlap the view volumes 334g and 334h so that they form overlapping view volume regions 334gh. The longest dimension of the overlapping view volume regions 334gh may be chosen to be wide enough to fit the widest optical code intended for viewing so that stitching together portions of an optical code can be either avoided or facilitated.

The prior variations and combinations concerning compound mirror structures apply to the compound mirror structure 330gh$_3$ except where such variations or combinations are mutually exclusive. Each compound mirror structure 330gh$_3$ is divided into a mirror component 330g$_3$, which reflects images captured from view volume 334g, and a mirror component 330h$_3$, which reflects images captured from view volume 334h. The mirror components 330g$_3$ and 330h$_3$ are angled with respect to each other.

The orientation of the composite view volume may be adapted to capture images the leading side or trailing side of an object (not shown), as well as capture images of its bottom side. So, depending on customer preference, the imaging unit 286 can be rotated 180 degrees to preferential capture images of the leading side or trailing side. In some embodiments, one of the imagers 340gh and its associated sets of mirrors 330 are positioned so that they are oriented to be opposite of the other imager 340gh and its associated set of mirrors 330. Alternatively, if the added capture of images of both the leading and trailing sides 30 and 32 are desired, two oppositely oriented imaging units 286 can be operated next to each other (in the direction of travel 298). In such embodiments, the dual set of imaging units 286 can be adjacent or spaced and their respective composite view volumes may be oriented toward or away from each other.

V. Conclusion

The terms and descriptions used above are set forth by way of illustration only and are not meant as limitations. Those skilled in the art will recognize that many variations can be made to the details of the above-described embodiments without departing from the underlying principles of the invention. The scope of the invention should therefore be determined only by the following claims and their equivalents.

The invention claimed is:

1. An optical code reader comprising:
an imager that captures images of items bearing optical codes in a viewing volume of the optical code reader, the imager having a field of view;
a fixed mirror structure comprising a base and at least first and second highly reflective surfaces mounted or formed on the base, wherein the structure is positioned in the optical code reader in a field of view of the imager and oriented so that the at least first and second highly reflective surfaces appear in the field of view of the imager, to thereby split the field of view of the imager into at least first and second different fields of view, the first field of view being of a first region of the imager and the second field of view being of a different second region of the imager; and
a set of pattern mirrors disposed about the structure for reflecting the first and second different views from the highly reflective surfaces into the viewing volume, wherein each of the highly reflective surfaces of the structure reflects a respective view only once.

2. An optical code reader according to claim 1, the set of pattern mirrors comprising:
a first intermediate mirror positioned to reflect light from the viewing volume onto one or more of the highly reflective surfaces of the mirror structure.

3. An optical code reader according to claim 2, the set of pattern mirrors further comprising:
a second intermediate mirror positioned to reflect light from the viewing volume onto one or more of the reflective surfaces of the mirror structure.

4. An optical code reader according to claim 3, wherein the first and second intermediate mirrors are in the same optical path.

5. An optical code reader according to claim 3, wherein the first and second intermediate mirrors are in different optical paths.

6. An optical code reader according to claim 1, wherein the mirror structure is integral to at least part of the optical code reader.

7. An optical code reader according to claim 1, further comprising:
an illumination source that shines light into the viewing volume,
wherein the light from the illumination source reflects off the one or more of the highly reflective surfaces of the mirror structure to reach the viewing volume.

8. An optical code reader according to claim 1, wherein the imager is a CMOS imager.

9. An optical code reader according to claim 1, wherein at least one of the different views into the viewing volume has a field of view having a substantial nonoverlapping region with respect to other views in the viewing volume.

10. An optical code reader according to claim 1, wherein the optical code reader is a bioptic reader that captures at least one lower perspective and at least one upper perspective into the viewing volume.

11. An optical code reader according to claim 1, further comprising:
a first intermediate mirror and a second intermediate mirror, the second intermediate mirror positioned to reflect light from the viewing volume onto the first intermediate mirror which in turn reflects light from the second intermediate mirror onto one or more of the highly reflective surfaces of the mirror structure.

12. An optical code reader according to claim 1, wherein the base comprises a molded plastic piece, wherein the mirror structure comprises a monolithic compound mirror structure with the first and second highly reflective surfaces comprising reflective coatings on the molded plastic piece.

13. An optical code reader according to claim 1, wherein the first and second highly reflective surfaces being strip-shaped with respective lengthwise major axes, the field of view of the imager being split into first and second different parallel strip-shaped views.

14. A method of optical code reading, comprising the steps of:
capturing, at an imager of an optical code reader, images of items bearing optical codes in a viewing volume of the imager, the imager having a field of view;
positioning a fixed mirror structure in the field of view of the imager, the mirror structure comprising a base and at least first and second mirror surfaces mounted or formed on the base with the first and second mirror surfaces appearing in the field of view of the imager;

positioning a set of pattern mirrors about the mirror structure;

splitting the field of view of the imager into at least first and second different split views by reflecting the field of view of the imager off of the first and second mirror surfaces, the first split view being of a first region of the imager and the second split view being of a different second region of the imager, wherein each of the first and second mirror surfaces reflecting a respective split view only once; and reflecting the respective first and second split views off of one or more of the pattern mirrors and into the viewing volume.

15. A method according to claim 14 wherein the base comprises a molded plastic piece, wherein the mirror structure comprises a monolithic compound mirror structure with the first and second mirror surfaces comprising reflective coatings on the molded plastic piece.

16. A method according to claim 14 wherein the step of splitting the field of view comprises splitting the field of view of the imager into at least first and second different parallel strip-shaped split views by reflecting the field of view of the imager off of the first and second mirror surfaces, the first and second mirror surfaces being strip-shaped with respective lengthwise major axes.

\* \* \* \* \*

UNITED STATES PATENT AND TRADEMARK OFFICE
CERTIFICATE OF CORRECTION

PATENT NO.       : 8,608,076 B2
APPLICATION NO.  : 12/646794
DATED            : December 17, 2013
INVENTOR(S)      : Bryan L. Olmstead It is certified that error appears in the above-identified patent and that said Letters Patent is hereby corrected as shown below:

In the Specification

Column 2
Line 42, change "perspective usually" to --perspective – usually--.

Column 3
Line 1, before "an" delete "a".
Line 39, before "the" delete "an".

Column 5
Line 61, change "area" to --areas--.

Column 6
Line 3, change "comprises" to --comprise--.
Lines 24-25, change "comprises an" to --comprise a--.
Lines 46-47, change "according to claim 15" to --is a reader--.

Column 9
Line 58, change "820' performs" to --820''' performs--.

Column 12
Line 1, change "such as mirrors" to --such as the mirrors of--.
Line 53, change "captures" to --captured--.

Column 13
Line 6, before "for" change "line" to --lines--.

Column 14
Line 4, change "$62d_3$" to --$62d_2$--.

Signed and Sealed this
Third Day of May, 2016

Michelle K. Lee
*Director of the United States Patent and Trademark Office*

Column 15
Line 44, change "filed" to --field--.

Column 16
Line 65, before "employed" insert --be--.

Column 17
Line 65, before "employed" insert --be--.

Column 19
Line 31, before "employed" insert --be--.

Column 20
Line 40, before "employed" insert --be--.

Column 22
Line 48, after "If" delete "in".

Column 25
Line 23, after "images" insert --of--.
Line 26, change "preferential" to --preferentially--.